US010421921B2

United States Patent
Wu et al.

(10) Patent No.: US 10,421,921 B2
(45) Date of Patent: Sep. 24, 2019

(54) LUBRICANTS FROM MIXED ALPHA-OLEFIN FEEDS

(71) Applicant: ExxonMobil Chemical Patents Inc., Baytown, TX (US)

(72) Inventors: Margaret M. Wu, Skillman, NJ (US); Norman Yang, Westfield, NJ (US); Phil Surana, Somerset, NJ (US); Anura Patil, Westfield, NJ (US); Steven P. Rucker, Warren, NJ (US); Kuangnan Qian, Skillman, NJ (US); Shakeel Tirmizi, Matawan, NJ (US); Mark P. Hagemeister, Mullica Hill, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/419,659

(22) Filed: Jan. 30, 2017

(65) Prior Publication Data

US 2017/0137737 A1 May 18, 2017

Related U.S. Application Data

(62) Division of application No. 14/546,654, filed on Nov. 18, 2014, now Pat. No. 9,593,288, which is a division
(Continued)

(51) Int. Cl.
*C10M 107/10* (2006.01)
*C08F 210/00* (2006.01)
(Continued)

(52) U.S. Cl.
CPC ......... *C10M 107/10* (2013.01); *C08F 210/00* (2013.01); *C08F 210/14* (2013.01);
(Continued)

(58) Field of Classification Search
CPC ..... C10N 2230/02; C08F 10/00; C08F 210/16
(Continued)

(56) References Cited

U.S. PATENT DOCUMENTS 3,576,898 A  4/1971  Blake et al.
4,172,855 A  10/1979  Gluckstein et al.
(Continued)

FOREIGN PATENT DOCUMENTS

CA  2116070 A  8/1994
EP  0513380 B  10/1997
(Continued)

OTHER PUBLICATIONS

"Industrial Technology of Next Generation Polymer by Metallocene Catalyst," (Reference A) title page, p. 993, and publication data (published May 20, 1995), and alleged partial translation provided by third party law firm, Enclosure 2, dated Oct. 4, 2012, Hoffmann EITLE, Patent- und Rechtsanwalte, 81925 Munchen, Arabellastr. 4.
(Continued)

*Primary Examiner* — Vishal V Vasisth

(57) ABSTRACT

This invention discloses an improved process which employs mixed alpha-olefins as feed over activated metallocene catalyst systems to provide essentially random liquid polymers particularly useful in lubricant components or as functional fluids

29 Claims, 4 Drawing Sheets

Related U.S. Application Data of application No. 11/995,297, filed as application No. PCT/US2006/027591 on Jul. 14, 2006, now Pat. No. 8,921,291.

(60) Provisional application No. 60/700,603, filed on Jul. 19, 2005.

(51) Int. Cl.
*C08F 210/14* (2006.01)
*C10G 50/02* (2006.01)
*C08F 4/659* (2006.01)
*C08F 210/16* (2006.01)

(52) U.S. Cl.
CPC .......... *C10G 50/02* (2013.01); *C08F 4/65908* (2013.01); *C08F 4/65912* (2013.01); *C08F 210/16* (2013.01); *C10M 2205/0285* (2013.01); *C10N 2220/021* (2013.01); *C10N 2220/022* (2013.01); *C10N 2230/02* (2013.01)

(58) Field of Classification Search
USPC .......... 508/591; 526/170, 348, 348.6, 348.4, 526/348.3; 585/520, 521, 522
See application file for complete search history.

(56) References Cited

U.S. PATENT DOCUMENTS

| | | | |
|---|---|---|---|
| 4,587,374 A | 5/1986 | Peters | |
| 4,665,208 A | 5/1987 | Welborn, Jr. et al. | |
| 4,665,245 A | 5/1987 | Quann | |
| 4,827,073 A * | 5/1989 | Wu ........................ | C10G 50/02 502/305 |
| 4,874,734 A | 10/1989 | Kioka et al. | |
| 4,908,463 A | 3/1990 | Bottelberghe | |
| 4,924,018 A | 5/1990 | Bottelberghe | |
| 4,935,569 A | 6/1990 | Harkins et al. | |
| 4,952,540 A | 8/1990 | Kioka et al. | |
| 4,968,827 A | 11/1990 | Davis | |
| 5,041,584 A | 8/1991 | Crapo et al. | |
| 5,091,352 A | 2/1992 | Kioka et al. | |
| 5,103,031 A | 4/1992 | Smith, Jr. | |
| 5,157,137 A | 10/1992 | Sangokoya | |
| 5,185,378 A | 2/1993 | Soled et al. | |
| 5,204,419 A | 4/1993 | Tsutsui et al. | |
| 5,206,199 A | 4/1993 | Kioka et al. | |
| 5,235,081 A | 8/1993 | Sangokoya | |
| 5,248,801 A | 9/1993 | Sangokoya | |
| 5,329,032 A | 7/1994 | Tran et al. | |
| 5,391,793 A | 2/1995 | Marks et al. | |
| 5,416,229 A | 5/1995 | Tran et al. | |
| 5,643,847 A | 7/1997 | Walzer, Jr. | |
| 5,705,577 A | 1/1998 | Rossi et al. | |
| 6,339,135 B1 | 1/2002 | Kashiwamura et al. | |
| 6,444,867 B1 | 9/2002 | Samsel et al. | |
| 6,646,174 B2 | 11/2003 | Clarembeau | |
| 6,846,778 B2 | 1/2005 | Johnson et al. | |
| 6,858,767 B1 * | 2/2005 | DiMaio .................... | C08F 10/00 585/511 |
| 6,982,310 B2 * | 1/2006 | Datta ....................... | C08L 23/10 526/348 |
| 7,019,091 B2 | 3/2006 | Minami et al. | |
| 7,053,254 B2 | 5/2006 | Miller | |
| 7,129,197 B2 | 10/2006 | Song et al. | |
| 7,241,375 B2 | 7/2007 | Johnson et al. | |
| 7,344,631 B2 | 3/2008 | Bishop et al. | |
| 7,550,640 B2 | 6/2009 | Surana et al. | |
| 7,589,145 B2 | 9/2009 | Brant et al. | |
| 7,795,194 B2 | 9/2010 | Iimura et al. | |
| 7,880,047 B2 | 2/2011 | Knowles et al. | |
| 8,071,687 B2 | 12/2011 | Jiang et al. | |
| 8,227,392 B2 | 7/2012 | Wu et al. | |
| 8,389,780 B2 | 3/2013 | Knowles et al. | |
| 8,530,712 B2 | 9/2013 | Wu et al. | |
| 8,748,361 B2 | 6/2014 | Wu et al. | |
| 8,816,034 B2 | 8/2014 | Sato et al. | |
| 9,409,834 B2 | 8/2016 | Wu et al. | |
| 2001/0041817 A1 * | 11/2001 | Bagheri .................. | C08F 10/00 585/517 |
| 2002/0147286 A1 | 10/2002 | Resconi et al. | |
| 2002/0198339 A1 | 12/2002 | Dall'Occo et al. | |
| 2003/0087773 A1 | 5/2003 | Egawa et al. | |
| 2003/0114623 A1 | 6/2003 | Mitani et al. | |
| 2003/0195128 A1 | 10/2003 | Deckman et al. | |
| 2005/0049373 A1 | 3/2005 | Minami et al. | |
| 2008/0042037 A1 | 2/2008 | Orr | |
| 2008/0177121 A1 | 7/2008 | Wu et al. | |
| 2009/0005279 A1 | 1/2009 | Wu et al. | |
| 2009/0036725 A1 | 2/2009 | Wu et al. | |
| 2009/0088355 A1 | 4/2009 | Hee et al. | |
| 2009/0247442 A1 | 10/2009 | Hagemeister et al. | |
| 2010/0087349 A1 | 4/2010 | Lee et al. | |
| 2010/0317904 A1 | 12/2010 | Small et al. | |
| 2010/0323937 A1 | 12/2010 | Wu et al. | |
| 2011/0040052 A1 | 2/2011 | Bburton et al. | |
| 2011/0082061 A1 | 4/2011 | Carey et al. | |
| 2011/0092752 A1 | 4/2011 | Knowles et al. | |
| 2011/0160502 A1 | 6/2011 | Wu et al. | |
| 2012/0302481 A1 | 11/2012 | Katayama et al. | |
| 2013/0023633 A1 | 1/2013 | Holtcamp et al. | |
| 2013/0303818 A1 | 11/2013 | Inagaki et al. | |
| 2014/0087986 A1 | 3/2014 | Patil et al. | |
| 2014/0135461 A1 | 5/2014 | Kohiruimaki et al. | |
| 2014/0235909 A1 | 8/2014 | Shimizu et al. | |
| 2014/0256997 A1 | 9/2014 | Shimizu et al. | |
| 2014/0309151 A1 | 10/2014 | Shimizu et al. | |
| 2015/0099679 A1 | 4/2015 | Yang et al. | |
| 2017/0051223 A1 | 2/2017 | Han | |

FOREIGN PATENT DOCUMENTS

| | | |
|---|---|---|
| EP | 0594218 B | 3/1999 |
| EP | 1103568 A | 5/2001 |
| EP | 1661921 A | 5/2006 |
| EP | 1880986 | 1/2008 |
| EP | 1043341 B | 10/2008 |
| EP | 2738185 | 6/2014 |
| EP | 2746302 | 6/2014 |
| EP | 2470571 | 12/2014 |
| JP | H0543618 A | 2/1993 |
| JP | 2005200450 A | 7/2005 |
| JP | 5357605 | 4/2009 |
| JP | 4283120 | 6/2009 |
| JP | 2010/065072 A | 3/2010 |
| JP | 2010/070593 A | 4/2010 |
| JP | 5808292 | 6/2012 |
| JP | 2013199517 | 10/2013 |
| JP | 2013199585 | 10/2013 |
| WO | 94/10180 A | 5/1994 |
| WO | 01/21675 | 3/2001 |
| WO | 2005/121280 | 12/2005 |
| WO | 2007/011459 | 1/2007 |
| WO | 2008/010865 | 1/2008 |
| WO | 2008/042037 A | 4/2008 |
| WO | 2009/017953 A | 2/2009 |
| WO | 2009/123800 | 10/2009 |
| WO | 2009/148685 | 12/2009 |
| WO | 2011/019541 A | 2/2011 |
| WO | 2014/065984 | 5/2014 |
| WO | 2014/209712 | 12/2014 |
| WO | 2017/034659 | 3/2017 |

OTHER PUBLICATIONS

"Living Polymerization by Homogeneous Transition Metal Catalyst," (Reference B) title page, pp. 46 and 47 and page with publication data (published on May 20, 1999), and alleged partial translation provided by third party law firm, Enclosure 3, dated Oct. 4, 2012, Hoffmann.cndot.EITLE, Patent- und Rechtsanwalte, 81925 Mu{umlaut over (n)}chen, Arabellastr. 4.

(56) References Cited

OTHER PUBLICATIONS

E. Riedel, Editor, Walter de Gruvter, Berlin, NY, 1999, Modem Inorganic Chemistry, Title page and pp. 696-697, alleged English translation provided by third party law firm. Hoffman EITLE Patent-und Rechtsanwalte, 81925 Munchen, Arabellastr 4.Enclosure 1dated Oct. 4, 2012.

"New Polymer Produced by Metallocene Catalyst," (Reference C) title page, pp. 53-55 and page with publication data (published on Apr. 20, 1999), and alleged partial translation provided by third party law firm, Enclosure 4, dated Oct. 4, 2012, Hoffmann.cndot. EITLE, Patent- und Rechtsanwalte, 81925 Munchen, Arabellastr. 4.

M.M. Wu, Synthetic Lubricants and High Performance Functional Fluids, Marcel Dekker, book. Mar. 1999, pp. 195-213; Chapter 7. Alkylated Aromatics.

M. Sacchi et al., "Use Of Different Alkoxysilanes As External Donors In MgClrSupported Ziegler-Hatta Catalysts To Obtain Propene/1-Butene Copolymers With Different Microstructure," Macromolecular Chemistry and Physics, 1994, vol. 195, pp. 2805-2816.

Z. Fan et al., "Effect Of Ethoxy- And Methoxysilane Donors In Propene/1-Hexene Copolymerization With High-Yield Supported Ziegler-Hatta Catalysts," Macromolecular Chemistry and Physics, 1994, vol. 195, pp. 3889-3899.

Lappin, "Routes to Alpha-Olefins", Alpha Olefins Applications Handbook, Chapter 3, Edited by G. R. Lappin and J. D. Sauer, Marcel Dekker, Inc.,1989.

Rizvi, "Dispersants", Lubricant Additives: Chemistry and Application, Chapter 5, ed. By Leslie R. Rudnick, p. 143-170.

Sequeira, "Lubricant Base Oil Hydrogen Refining Processes" Lubricant Base Oil and Wax Processing, Chapter 6, by Avilino Sequeira, Jr., Marcel Dekker, Inc., NY, 1994, pp. 119-152.

Han, "Our mPAO platform is expanding: Introducing SpectraSyn EliteTM 300," 2016 China International Lubricants, Base Oils and Additives Conference, Langham Palace, Sep. 19, 2016.

Lewis, R. J. Ed. (1997) "Hawley's Condensed Chemical Dictionary," John Wiley & Sons, 13th ed., p. 903.

\* cited by examiner

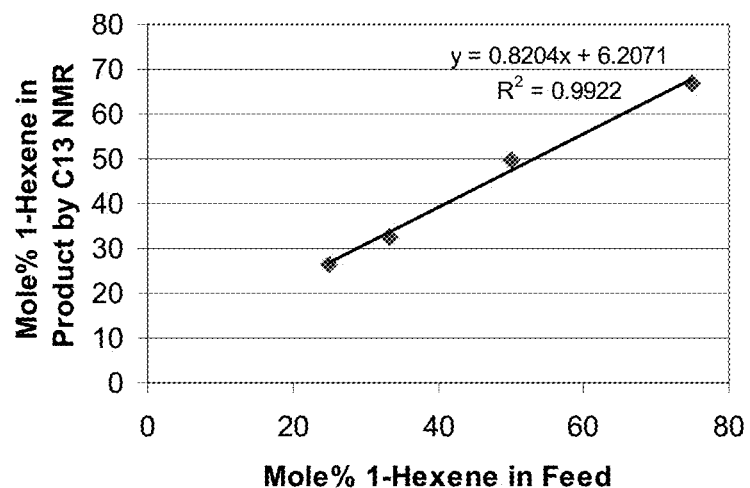
Figure 4
Figure 5
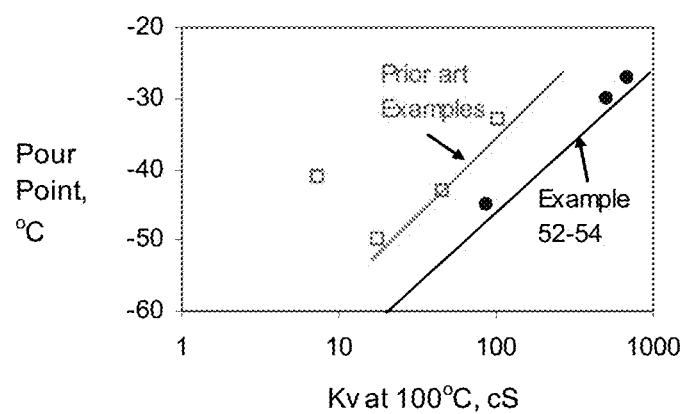

LUBRICANTS FROM MIXED ALPHA-OLEFIN FEEDS

CROSS-REFERENCE TO RELATED APPLICATIONS

This application is a DIV of application Ser. No. 14/546,654, now U.S. Pat. No. 9,593,288 filed Nov. 18, 2014 which is a DIV of application Ser. No. 11/995,297, now U.S. Pat. No. 8,921,291 filed Dec. 30, 2014 which is a 371 continuation of application PCT/US2006/027591, filed Jul. 14, 2006 which claims benefit of provisional application No. 60/700,603, filed Jul. 19, 2005.

FIELD OF THE INVENTION

The invention relates to lubricant compositions comprising PAO and/or HVI-PAO basestock made by contacting mixed feed alpha-olefins with a catalyst comprising a metallocene.

BACKGROUND OF THE INVENTION

The viscosity-temperature relationship of a lubricating oil is one of the critical criteria which must be considered when selecting a lubricant for a particular application. Viscosity Index (VI) is an empirical, unitless number which indicates the rate of change in the viscosity of an oil within a given temperature range. Fluids exhibiting a relatively large change in viscosity with temperature are said to have a low viscosity index. A low VI oil, for example, will thin out at elevated temperatures faster than a high VI oil. Usually, the high VI oil is more desirable because it has higher viscosity at higher temperature, which translates into better or thicker lubrication film and better protection of the contacting machine elements. In another aspect, as the oil operating temperature decreases, the viscosity of a high VI oil will not increase as much as the viscosity of a low VI oil. This is advantageous because the excessive high viscosity of the low VI oil will decrease the efficiency of the operating machine. Thus high VI oil has performance advantages in both high and low temperature operation. VI is determined according to ASTM method D 2270-93 [1998]. VI is related to kinematic viscosities measured at 40° C. and 100° C. using ASTM Method D 445.

PAOs comprise a class of hydrocarbons manufactured by the catalytic oligomerization (polymerization to low molecular weight products) of linear α-olefins (LAOs) typically ranging from 1-hexene to 1-octadecene, more typically from 1-octene to 1-dodecene, with 1-decene as the most common and often preferred material. Such fluids are described, for example, in U.S. Pat. No. 6,824,671 and patents referenced therein, although polymers of lower olefins such as ethylene and propylene may also be used, especially copolymers of ethylene with higher olefins, as described in U.S. Pat. No. 4,956,122 or 4,990,709 and the patents referred to therein.

High viscosity index polyalpha-olefin (HVI-PAO) prepared by, for instance, polymerization of alpha-olefins using reduced metal oxide catalysts (e.g., chromium) are described, for instance, in U.S. Pat. Nos. 4,827,064; 4,827,073; 4,990,771; 5,012,020; and 5,264,642. These HVI-PAOs are characterized by having a high viscosity index (VI) of about 130 and above, more preferably 150 and above, still more preferably 160 and above, yet still more preferably 200 and above, and one or more of the following characteristics: a branch ratio of less than −0.19, a weight average molecular weight of between 300 and 45,000, a number average molecular weight of between 300 and 18,000, a molecular weight distribution of between 1 and 5, and pour point below −15° C. Measured in carbon number, these molecules range from $C_{30}$ to $C_{1300}$. Viscosities of the HVI-PAO oligomers measured at 100° C. range from 3 centistokes ("cSt") to 15,000 cSt. These HVI-PAOs have been used as basestocks in engine and industrial lubricant formulations. See also U.S. Pat. Nos. 4,180,575; 4,827,064; 4,827,073; 4,912,272; 4,990,771; 5,012,020; 5,264,642; 6,087,307; 6,180,575; WO 03/09136; WO 2003071369A; U.S. Patent Application No. 2005/0059563; WO 00/58423; and Lubrication Engineers, 55/8, 45 (1999); and have recently been found to be useful for industrial oil and grease formulations (e.g., U.S. patent application Ser. No. 11/172,161, filed Jun. 29, 2005.

Another advantageous property of these HVI-PAOs is that, while lower molecular weight unsaturated oligomers are typically and preferably hydrogenated to produce thermally and oxidatively stable materials, higher molecular weight unsaturated HVI-PAO oligomers useful as lubricant are sufficiently thermally and oxidatively stable to be utilized without hydrogenation and, optionally, may be so employed.

As used herein, the term "polyalpha-olefin" includes PAOs and HVI-PAOs. Depending on the context, the term "PAO" may include HVI-PAOs or it may be used to distinguish non-HVI-PAOs from HVI-PAOs. Generally, when PAO is used alone, it implies the products have properties similar to the fluids made from conventional polymerization process using $BF_3$ or $AlCl_3$ or their modified versions, as described in U.S. Pat. No. 6,824,671 and references therein.

Polyalpha-olefins of different viscosity grades are known to be useful in synthetic and semi-synthetic lubricants and grease formulations. See, for instance, Chapters 19 to 27 in Rudnick et al., "Synthetic Lubricants and High-Performance Functional Fluids", 2nd Ed. Marcel Dekker, Inc., N.Y. (1999). Compared to the conventional mineral oil-based products, these PAO-based products have excellent viscometrics, high and low temperature performance. They usually provide energy efficiency and extended service life.

In the production of PAOs and HVI-PAOs, the feed is usually limited to one specific alpha-olefins, usually 1-decene. Occasionally, when 1-decene is not available in large enough quantity, small to moderate amounts of 1-octene or 1-dodecene is added to make up the quantity. It is generally thought that 1-decene is the most preferred feed (see reference "Wide-Temperature Range Synthetic Hydrocarbon Fluids" by J. A. Brennen, Ind. Eng. Chem. Prod. Res. Dev., 19, 2-6 (1980). When mixtures of feed are used, the products tend to be blocky copolymers rather than random copolymers and/or products produced at the beginning of the process are different than that produced at the end of the process, and the inhomogeneous polymer product will be characterized by poor viscosity indices (VI) and poor low temperature properties are produced. Thus, in the past, PAOs and HVI-PAOs have generally been made using pure $C_{10}$ feeds.

There are specific examples of mixed feeds being used. For instance, in U.S. Pat. No. 6,646,174, a mixture of about 10 to 40 wt. % 1-decene and about 60 to 90 wt. % 1-dodecene and are co-oligomerized in the presence of an alcohol promoter. Preferably 1-decene is added portion-wise to the single oligomerization reactor containing 1-dodecene and a pressurized atmosphere of boron trifluoride. Product is taken overhead and the various cuts are hydrogenated to give PAO characterized by a kinematic viscosity of from about 4 to about 6 at 100° C., a Noack weight loss of from about 4% to about 9%, a viscosity index of from about 130 to about 145, and a pour point in the range of from about −60° C. to about −50° C. See also U.S. Pat. Nos. 4,950,822; 6,646,174; 6,824,671, 5,382,739 and U.S. Patent Application No. 2004/0033908. All these copolymers or co-oligomers produced by conventional Friedel-Crafts catalysts usually are characterized by having extra relatively short branches, such as methyl and ethyl short side chains, even though the feed olefins do not contain these short branches. This is because the Friedel-Crafts catalyst partially isomerizes the starting alpha-olefins and the intermediates formed during the oligomerization. The presence of short chain branches is less desirable for superior lubricant properties, including VI and volatility. In contrast, the copolymers described in this invention will not have extraneous short chain branches. If the feed is propylene and 1-dodecene, the predominant side chain in the polymers will be methyl and n-$C_{10}H_{23}$ side chains. Except for the contribution of usually less than −5% of the polymer end groups initiated through the rare allylic hydrogen abstraction of the alpha-olefin monomers by the active metal centers, the oligomers will not have extra ethyl, propyl, butyl, etc. side chains that are present in non-metallocene (e.g. Friedel-Crafts) methods.

Previous patents report the use of mixed alpha-olefins as feeds to produced co-oligomers or copolymers for use as lubricant components. U.S. Pat. No. 4,827,073 reported the use of a reduced chromium oxide on silica gel as catalyst to polymerize $C_6$ to $C_{20}$ alpha-olefins. Although liquid copolymers were produced by the process, the copolymer has very different polymer composition from the monomer ratio in the feed. The reduced chromium oxide on silica gel catalyst polymerized the lower alpha-olefins, such as 1-butene or 1-hexene, at a significantly higher rate than the alpha-olefins of 1-decene, 1-dodecene or larger alpha-olefins [see comparative examples in Example section]. As a result, the copolymer tends to be more blocky or more inhomogeneous in a conventional synthesis process. Both are detrimental to the product VI and low temperature properties. Similarly, Ziegler or Ziegler-Natta type catalysts have also been reported to copolymerize mixed alpha-olefins. Examples are U.S. Pat. Nos. 4,132,663, 5,188,724 and 4,163,712. The problem with using Ziegler or Ziegler-Natta catalysts is that they can only produce polymers of very high molecular weights. As a result, the products are used as plastics and additives, but are not suitable as high performance base stocks. Furthermore, according to all literature reports, Ziegler or Ziegler-Natta catalysts usually have higher reactivities toward smaller alpha-olefins, such as propylene, 1-butene, 1-pentene or 1-hexene, than toward larger alpha-olefins, such as 1-decene, 1-dodecene, or larger 1-olefins (reference Macromolecular Chemistry and Physics, 195, 2805 (1994) or 195, 3889 (1994)). This difference in catalyst reactivity resulted in heterogeneous chemical structures for the copolymers, which are not random copolymers and have high degree of blockiness. Both characteristics are detrimental for lube properties.

It would be highly beneficial if a process could be devised whereby a homogeneous and uniform PAO and/or HVI-PAO having an excellent viscosity-temperature relationship could be produced from a wide variety of mixed feed LAOs.

The present inventors have discovered an unanticipated method of producing a uniform PAO and/or HVI-PAO product by contacting a mixed feed of LAOs of varying carbon numbers with an activated metallocene catalyst.

SUMMARY OF THE INVENTION

The invention is directed to an improved process for producing PAOs and HVI-PAOs which employs contacting a feed comprising a mixture of LAOs with an activated metallocene catalyst, optionally after hydrogenation, to produce liquid polymers with superior properties for use as lubricant components or as functional fluids.

This invention is also directed to a copolymer composition made from at least two alpha-olefins of $C_3$ to $C_{30}$ range and having monomers randomly distributed in the polymers. It is preferred that the average carbon number, as defined herein, is at least 4.1. Advantageously, ethylene and propylene, if present in the feed, are present in the amount of less than −50 wt % individually or preferably less than −50 wt % combined. The copolymers of the invention can be isotactic, atactic, syndiotactic polymers or any other form of appropriate tacticity. These copolymers have useful lubricant properties, including excellent VI, pour point, low temperature viscometrics when used alone, or as blend fluids with other lubricants or other polymers. Furthermore, these copolymers have narrow molecular weight distributions and excellent shear stability.

In an embodiment, the mixed feed LAOs comprise at least two and up to 26 different linear alpha-olefins selected from $C_3$ to $C_{30}$ linear alpha-olefins. In a preferred embodiment, the mixed feed LAO is obtained from an ethylene growth process using an aluminum catalyst or a metallocene catalyst.

In another embodiment, the alpha-olefins can be chosen from any component from a conventional LAO production facility together with another LAO available from a refinery or chemical plant, including propylene, 1-butene, 1-pentene, and the like, or with 1-hexene or 1-octene made from dedicated production facility. In another embodiment, the alpha-olefins can be chosen from the alpha-olefins produced from Fischer-Tropsch synthesis (as reported in U.S. Pat. No. 5,382,739).

The activated metallocene catalyst can be simple metallocenes, substituted metallocenes or bridged metallocene catalysts activated or promoted by, for instance, MAO or a non-coordinating anion.

It is an object of the invention to provide a convenient method of making a new PAO and/or HVI-PAO composition from a variety of feedstocks.

These and other objects, features, and advantages will become apparent as reference is made to the following detailed description, preferred embodiments, examples, and appended claims.

BRIEF DESCRIPTION OF THE DRAWINGS

In the accompanying drawings, like reference numerals are used to denote like parts throughout the several views.

FIGS. 3 and 4 show the mole fraction of an olefin component in the product versus the mole fraction of same monomer in the feed for examples according to the present invention.

FIG. 5 is a comparison of pour points between the prior art and embodiments of the invention

DETAILED DESCRIPTION

Figure 1:
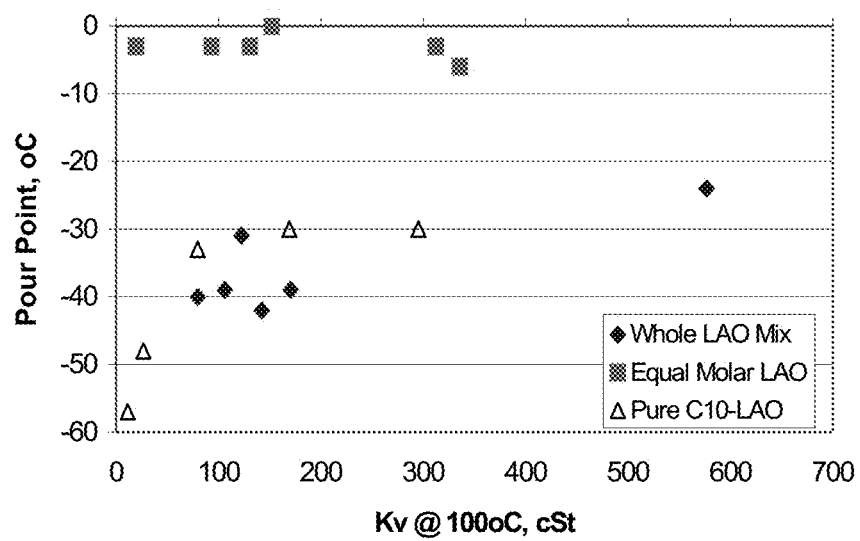
FIG. 1 illustrates the relationship of pour point versus kinematic viscosity for embodiments according to the present invention in comparison with a product produced using a pure $C_{10}$ feed.

According to the invention, a feed comprising a mixture of LAOs selected from $C_3$ to $C_{30}$ LAOs is contacted with an activated metallocene catalyst under oligomerization conditions to provide a liquid product, suitable for use in lubricant components or as functional fluids, optionally after hydrogenation. This invention is also directed to a copolymer composition made from at least two alpha-olefins of $C_3$ to $C_{30}$ range and having monomers randomly distributed in the polymers. The phrase "at least two alpha-olefins" will be understood to mean "at least two different alpha-olefins" (and similarly "at least three alpha-olefins" means "at least three different alpha-olefins", and so forth).

In preferred embodiments, the average carbon number (defined herein below) of said at least two alpha-olefins in said feed is at least 4.1. In another preferred embodiment, the amount of ethylene and propylene in said feed is less than −50 wt % individually or preferably less than −50 wt % combined. A still more preferred embodiment comprises a feed having both of the aforementioned preferred embodiments, i.e., a feed having an average carbon number of at least 4.1 and wherein the amount of ethylene and propylene is less than −50 wt % individually.

In embodiments, the product obtained is an essentially random liquid copolymer comprising the at least two alpha-olefins. By "essentially random" is meant that one of ordinary skill in the art would consider the products to be a random copolymer. Other characterizations of randomness, some of which are preferred or more preferred, are provided herein. Likewise the term "liquid" will be understood by one of ordinary skill in the art, but more preferred characterizations of the term are provided herein. In describing the products as "comprising" a certain number of alpha-olefins (at least two different alpha-olefins), one of ordinary skill in the art in possession of the present disclosure would understand that what is being described in the polymerization (or oligomerization) product incorporating said certain number of alpha-olefin monomers. In other words, it is the product obtained by polymerizing or oligomerizing said certain number of alpha-olefin monomers.

The descriptions herein follow the Periodic Table of the Elements as set out in Chemical and Engineering News, 63(5), 27 (1985).

LAO Feed

By "mixture of LAOs" is meant that at least two different linear alpha-olefins are present in the feed and up to 28 different linear alpha-olefins are present in the feed. It is a surprising discovery of the present invention that the rate of incorporation of monomers into the polymer backbone is substantially the same regardless of the carbon number of the linear alpha-olefin, and it is further a surprising discovery that the incorporation of monomers in the polymer chain is essentially random. This allows for a tremendous advantage in selecting the feed composition to achieve a preselected target product. This also allows the advantage of producing a new copolymer composition with a substantially random monomer distribution, resulting in superior viscometric properties at both high and low temperature range.

In embodiments where the feed is selected from $C_3$ to $C_{30}$ LAOs, the feed will comprise anywhere from 2 to 28 different LAOs. Thus, the feed may comprise at least two, or at least three, or at least four, or at least five, or at least six, or at least seven, or at least eight, and so on, different feeds. The embodiments may be further characterized by having no single LAO present in an amount greater than −80 wt %, 60 wt %, 50 wt %, or 49 wt %, or 40 wt %, or 33 wt %, or 30 wt %, or 25 wt %, or 20 wt %.

The amounts of LAO present in a feed will be specified herein as percent by weight of the entire amount of LAO in the feed, unless otherwise specified. Thus, it will be recognized that the feed may also comprise an inert (with respect to the oligomerization reaction in question) material, such as a carrier, a solvent, or other olefin components present that is not an LAO. Examples are propane, n-butane, iso-butane, cis- or trans-2-butenes, iso-butenes, and the like, that may be present with propylene or with 1-butene feed. Other examples are the impurity internal olefins or vinylidene olefins that are present in the LAO feed.

It is preferred that the amount of ethylene in said feed be at least less than 50 wt % and generally much less than that, e.g., less than 5 wt %, more preferably less than −4 wt % or less than −3 wt % or less than −2 wt %, or less than −1 wt %. In preferred embodiment, the amount of both ethylene and propylene, on an individual basis, should be less than −50 wt % and more preferably the combination of ethylene and propylene should be less than −50 wt %, more preferably less than 40 wt %, or 30 wt %, or 20 wt %, or 10 wt %, or 5 wt %.

In other embodiments, feeds may be advantageously selected from $C_3$ to $C_{30}$ LAOs, $C_4$ to $C_{24}$ LAOs, $C_5$ to $C_{24}$, $C_4$ to $C_{16}$ LAOs, $C_5$ to $C_{18}$, $C_5$ to $C_{16}$, $C_6$ to $C_{20}$ LAOs, $C_4$ to $C_{14}$ LAOs, $C_5$ to $C_{16}$, $C_5$ to $C_{16}$, $C_6$ to $C_{16}$ LAOs, $C_6$ to $C_{18}$ LAOs, $C_6$ to $C_{14}$ LAOs, among other possible LAO feed sources, such as any lower limit listed herein to any upper limit listed herein. In other embodiments, the feed will comprise at least one monomer selected from propylene, 1-butene, 1-pentene, 1-hexene to 1-heptene and at least one monomer selected from $C_{12}$-$C_{18}$ alpha-olefins. Optionally one monomer is selected from $C_8$ and $C_{10}$ alpha-olefins. A preferred embodiment is a feed comprising 1-hexene and 1-dodecene, 1-tetradecene, and mixtures thereof. Another preferred embodiment is a feed comprising 1-butene and 1-dodecene, 1-tetradecene, and mixtures thereof. Another preferred embodiment is a feed comprising 1-hexene, 1-decene, 1-dodecene and 1-tetradecene, and mixtures thereof. Another preferred embodiment is a feed comprising 1-hexene and 1-octene, 1-dodecene and 1-tetradecene, and mixtures thereof. Another preferred embodiment is a feed comprising 1-butene and 1-hexene and 1-dodecene, 1-tetradecene, and mixtures thereof.

A particularly advantaged feedstock from the standpoint of supply and availability is 1-hexene. There are many source of 1-hexene. They are available from conventional LAO processes, and have recently been produced intentionally in high yield and cheaply from ethylene. Pure 1-Hexene is now available commercially from Fischer-Tropsch processes. Because of these diverse sources, there is advantage in using 1-hexene as one of the feeds. The presence of 1-hexene in the LAO feed from 0 to 95% is suitable. In a preferred embodiment, 1-hexene is present in the feed in the amount of about 1 wt % or 10 wt % to about 85 wt % or less, 80 wt % or less, 75 wt % or less, 67 wt % or less, 60 wt % or less, 50 wt % or less, 40 wt % or less, 33 wt % or less, 30 wt % or less, 20 wt % or less, or 15 wt % or less as preferred embodiments. The same is true for 1-octene, which can be produced selectively from 1-heptene isolated from Fischer-Tropsch synthesis, or from butadiene as described in WO 9210450. Other alpha-olefins such as propylene or 1-butene or combinations thereof are also very advantageous because propylene and 1-butene are readily available from refinery or from petrochemical plants. The source of propylene can be in pure form (as in chemical grade propylene or as in polymer grade propylene) or in PP stream (propane-propylene stream) or other appropriate forms. The source of 1-butene can be in pure form (as in chemical grade 1-butene or as in polymer grade 1-butene) or in "BB stream" (butane-butene stream, such as Raffinate-1 or Raffinate-2 stream, as discussed, for instance, in U.S. Pat. No. 5,859,159), or other appropriate form. 1-Pentene can also be used as one of the advantaged feeds in the mixed feed. This 1-pentene can be isolated from naphtha steam cracking unit, from other refinery sources, or from a Fischer-Tropsch synthesis process. Similar to 1-hexene, in embodiments the amount of propylene, 1-butene or 1-pentene can vary from 1 to 95% in the mixed feed, depending on the needs of the product properties.

The source of the LAO is advantageously from ethylene growth processes, as described in U.S. Pat. Nos. 2,889,385; 4,935,569 (and numerous references cited therein); U.S. Pat. No. 6,444,867; and in Chapter 3 of Lappin and Sauer, Alpha-olefins Applications Handbook, Marcel Dekker, Inc., NY 1989. The LAO made from this ethylene growth process contains only even-number olefins. LAO containing both even- and odd-number olefins can also be made from steam cracking or thermal cracking of wax, such as petroleum wax, Fischer-Tropsch wax, or any other readily available hydrocarbon wax. LAO can also be made in a Fischer-Tropsch synthesis process, as described in U.S. Pat. No. 5,185,378 or 6,673,845 and references therein. LAO made directly from syngas synthesis processes, which can produce significant amounts of $C_3$-$C_{15}$ alpha-olefins, containing both even- and odd-number olefins.

In an embodiment, it is advantageous to use a high quality feed with minimal inert material. However, LAO containing other inert components, including saturated hydrocarbons, internal or vinylidene olefins or aromatic diluents can also be used as feed. In this case, the LAO would be reacted to give polymer and inert components will be passed through the reactor unaffected. The polymerization process is also a separation process.

Another advantaged feedstock comprises 1-butene. In certain embodiments, a mixed feed comprising from 1 wt % to about 80 wt %, preferably 5 wt % to about 75 wt %, more preferably about 25 wt % to about 75 wt % is advantageous, particularly wherein the average carbon number of said feed is at least 4.1. It is particularly advantageous when the feed also comprises at least 20 wt % or 25 wt % to about 80 wt % or 75 wt % of at least one alpha-olefin selected from $C_8$ to $C_{24}$, $C_{10}$ to $C_{24}$, $C_{12}$ to $C_{24}$, preferably $C_{14}$ to $C_{18}$ alpha-olefins.

It is preferred that the average carbon number of the feed is at least 4.1. While the upper limit of average carbon number is not a critical characteristic of the feed (and will be more naturally limited by the characterization of the product as an "essentially random liquid polymer"), a useful upper limit may be given as $C_{20}$-$C_{24}$ alpha-olefins, $C_{18}$ or $C_{16}$ or $C_{14}$, or other preferred upper limits given herein below. Average carbon number, as used herein, refers to the average carbon number of the $C_3$ to $C_{30}$ alpha-olefins in the feed. Another preferred embodiment is to select a mixed feed, which may be a mixed feed as described in any one of the aforementioned embodiments or as otherwise described herein, having an average carbon number of between about 4.1 carbon atoms and 14 carbon atoms, and more preferably from greater than –5 carbon atoms to less than 12 carbon atoms, and more preferably from greater than –5.5 carbon atoms to less than –11 carbon atoms. The average value of the carbon number ("average carbon number") is defined as the total sum of the mole fraction of each alpha-olefin times the carbon number in the alpha-olefins ($C_{av}=\Sigma$(mole fraction)$_i \times$(number of carbons)$_i$). There are many possible combinations to achieve this preferred average carbon numbers of the LAO feeds. Examples of the possible combinations are summarized in Table A. Note that in Table A, "eq. mo" feed comprises equimolar amounts of even-numbered alpha-olefins from $C_6$ to $C_{18}$. All of the average carbon numbers listed in Table A are preferred feeds, and preferred feeds also include a range of average carbon numbers from any lower amount listed in Table A to any higher amount listed in Table A.

A particular advantage of the present invention is that it allows for the production of a product that closely mirrors the properties of an oligomerization process using a single feed of 1-decene without actually using an appreciable amount of 1-decene or the commonly used 1-decene-equivalent,

TABLE A

Wt % Olefins in Feed

| | Av. Cx* | C3 | C4 | C5 | C6 | C7 | C8 | C9 | C10 | C11 | C12 | C13 | C14 | C15 | C16 | C17 | C18 | C19 | C20 | C21 | C22 | C23 | C24 | Total |
|---|---|---|---|---|---|---|---|---|---|---|---|---|---|---|---|---|---|---|---|---|---|---|---|---|
| C3-C23 | 9.7 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 0.0 | 100 |
| | 9.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 100 |
| | 10.5 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 0.0 | 9.1 | 100 |
| | 9.9 | 7.1 | 0.0 | 7.1 | 0.0 | 7.1 | 0.0 | 7.1 | 0.0 | 7.1 | 0.0 | 7.1 | 0.0 | 7.1 | 0.0 | 7.1 | 0.0 | 7.1 | 0.0 | 7.1 | 0.0 | 7.1 | 7.1 | 100 |
| C6-C18 | 10.7 | 0.0 | 0.0 | 0.0 | 0.0 | 0.0 | 7.7 | 0.0 | 7.7 | 0.0 | 7.7 | 0.0 | 7.7 | 0.0 | 7.7 | 0.0 | 7.7 | 0.0 | 0.0 | 0.0 | 0.0 | 0.0 | 0.0 | 100 |
| | 10.5 | 0.0 | 0.0 | 0.0 | 14.3 | 0.0 | 14.3 | 0.0 | 14.3 | 0.0 | 14.3 | 0.0 | 14.3 | 0.0 | 14.3 | 0.0 | 14.3 | 0.0 | 0.0 | 0.0 | 0.0 | 0.0 | 0.0 | 100 |
| C8-C12 | 9.7 | 0.0 | 0.0 | 0.0 | 0.0 | 0.0 | 33.3 | 0.0 | 33.3 | 0.0 | 33.3 | 0.0 | 0.0 | 0.0 | 0.0 | 0.0 | 0.0 | 0.0 | 0.0 | 0.0 | 0.0 | 0.0 | 0.0 | 100 |
| C6-C14 | 9.2 | 0.0 | 0.0 | 0.0 | 20.0 | 0.0 | 20.0 | 0.0 | 20.0 | 0.0 | 20.0 | 0.0 | 20.0 | 0.0 | 0.0 | 0.0 | 0.0 | 0.0 | 0.0 | 0.0 | 0.0 | 0.0 | 0.0 | 100 |
| C6-C16 | 9.9 | 0.0 | 0.0 | 0.0 | 16.7 | 0.0 | 16.7 | 0.0 | 16.7 | 0.0 | 16.7 | 0.0 | 16.7 | 0.0 | 16.7 | 0.0 | 0.0 | 0.0 | 0.0 | 0.0 | 0.0 | 0.0 | 0.0 | 100 |
| C6-C18 | 10.5 | 0.0 | 0.0 | 0.0 | 14.3 | 0.0 | 14.3 | 0.0 | 14.3 | 0.0 | 14.3 | 0.0 | 14.3 | 0.0 | 14.3 | 0.0 | 14.3 | 0.0 | 0.0 | 0.0 | 0.0 | 0.0 | 0.0 | 100 |
| C3 + C14 | 4.1 | 66.7 | 0.0 | 0.0 | 0.0 | 0.0 | 0.0 | 0.0 | 0.0 | 0.0 | 0.0 | 0.0 | 33.3 | 0.0 | 0.0 | 0.0 | 0.0 | 0.0 | 0.0 | 0.0 | 0.0 | 0.0 | 0.0 | 100 |
| | 6.3 | 33.3 | 0.0 | 0.0 | 0.0 | 0.0 | 0.0 | 0.0 | 0.0 | 0.0 | 0.0 | 0.0 | 66.7 | 0.0 | 0.0 | 0.0 | 0.0 | 0.0 | 0.0 | 0.0 | 0.0 | 0.0 | 0.0 | 100 |
| | 7.3 | 25.0 | 0.0 | 0.0 | 0.0 | 0.0 | 0.0 | 0.0 | 0.0 | 0.0 | 0.0 | 0.0 | 75.0 | 0.0 | 0.0 | 0.0 | 0.0 | 0.0 | 0.0 | 0.0 | 0.0 | 0.0 | 0.0 | 100 |
| | 9.2 | 14.3 | 0.0 | 0.0 | 0.0 | 0.0 | 0.0 | 0.0 | 0.0 | 0.0 | 0.0 | 0.0 | 85.7 | 0.0 | 0.0 | 0.0 | 0.0 | 0.0 | 0.0 | 0.0 | 0.0 | 0.0 | 0.0 | 100 |
| | 10.5 | 9.1 | 0.0 | 0.0 | 0.0 | 0.0 | 0.0 | 0.0 | 0.0 | 0.0 | 0.0 | 0.0 | 90.9 | 0.0 | 0.0 | 0.0 | 0.0 | 0.0 | 0.0 | 0.0 | 0.0 | 0.0 | 0.0 | 100 |
| C4 + C8 | 4.3 | 0.0 | 85.7 | 0.0 | 0.0 | 0.0 | 14.3 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 100 |
| | 5.3 | 0.0 | 50.0 | 0.0 | 0.0 | 0.0 | 50.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 100 |
| C4 + C10 | 5.7 | 0.0 | 50.0 | 0.0 | 0.0 | 0.0 | 0.0 | 0.0 | 50.0 | 0.0 | 0.0 | 0.0 | 0.0 | 0.0 | 0.0 | 0.0 | 0.0 | 0.0 | 0.0 | 0.0 | 0.0 | 0.0 | 0.0 | 100 |
| C4 + C12 | 4.5 | 0.0 | 83.3 | 0.0 | 0.0 | 0.0 | 0.0 | 0.0 | 0.0 | 0.0 | 16.7 | 0.0 | 0.0 | 0.0 | 0.0 | 0.0 | 0.0 | 0.0 | 0.0 | 0.0 | 0.0 | 0.0 | 0.0 | 100 |
| | 6.0 | 0.0 | 50.0 | 0.0 | 0.0 | 0.0 | 0.0 | 0.0 | 0.0 | 0.0 | 50.0 | 0.0 | 0.0 | 0.0 | 0.0 | 0.0 | 0.0 | 0.0 | 0.0 | 0.0 | 0.0 | 0.0 | 0.0 | 100 |
| | 8.6 | 0.0 | 20.0 | 0.0 | 0.0 | 0.0 | 0.0 | 0.0 | 0.0 | 0.0 | 80.0 | 0.0 | 0.0 | 0.0 | 0.0 | 0.0 | 0.0 | 0.0 | 0.0 | 0.0 | 0.0 | 0.0 | 0.0 | 100 |
| | 9.8 | 0.0 | 11.1 | 0.0 | 0.0 | 0.0 | 0.0 | 0.0 | 0.0 | 0.0 | 88.9 | 0.0 | 0.0 | 0.0 | 0.0 | 0.0 | 0.0 | 0.0 | 0.0 | 0.0 | 0.0 | 0.0 | 0.0 | 100 |
| | 10.4 | 0.0 | 7.7 | 0.0 | 0.0 | 0.0 | 0.0 | 0.0 | 0.0 | 0.0 | 92.3 | 0.0 | 0.0 | 0.0 | 0.0 | 0.0 | 0.0 | 0.0 | 0.0 | 0.0 | 0.0 | 0.0 | 0.0 | 100 |
| | 10.7 | 0.0 | 5.9 | 0.0 | 0.0 | 0.0 | 0.0 | 0.0 | 0.0 | 0.0 | 94.1 | 0.0 | 0.0 | 0.0 | 0.0 | 0.0 | 0.0 | 0.0 | 0.0 | 0.0 | 0.0 | 0.0 | 0.0 | 100 |
| C4 + C14 | 4.7 | 0.0 | 80.0 | 0.0 | 0.0 | 0.0 | 0.0 | 0.0 | 0.0 | 0.0 | 0.0 | 0.0 | 20.0 | 0.0 | 0.0 | 0.0 | 0.0 | 0.0 | 0.0 | 0.0 | 0.0 | 0.0 | 0.0 | 100 |
| | 6.2 | 0.0 | 50.0 | 0.0 | 0.0 | 0.0 | 0.0 | 0.0 | 0.0 | 0.0 | 0.0 | 0.0 | 50.0 | 0.0 | 0.0 | 0.0 | 0.0 | 0.0 | 0.0 | 0.0 | 0.0 | 0.0 | 0.0 | 100 |
| | 7.6 | 0.0 | 33.3 | 0.0 | 0.0 | 0.0 | 0.0 | 0.0 | 0.0 | 0.0 | 0.0 | 0.0 | 66.7 | 0.0 | 0.0 | 0.0 | 0.0 | 0.0 | 0.0 | 0.0 | 0.0 | 0.0 | 0.0 | 100 |
| | 9.3 | 0.0 | 20.0 | 0.0 | 0.0 | 0.0 | 0.0 | 0.0 | 0.0 | 0.0 | 0.0 | 0.0 | 80.0 | 0.0 | 0.0 | 0.0 | 0.0 | 0.0 | 0.0 | 0.0 | 0.0 | 0.0 | 0.0 | 100 |
| | 7.6 | 0.0 | 33.3 | 0.0 | 0.0 | 0.0 | 0.0 | 0.0 | 0.0 | 0.0 | 0.0 | 0.0 | 66.7 | 0.0 | 0.0 | 0.0 | 0.0 | 0.0 | 0.0 | 0.0 | 0.0 | 0.0 | 0.0 | 100 |
| | 11.0 | 0.0 | 11.1 | 0.0 | 0.0 | 0.0 | 0.0 | 0.0 | 0.0 | 0.0 | 0.0 | 0.0 | 88.9 | 0.0 | 0.0 | 0.0 | 0.0 | 0.0 | 0.0 | 0.0 | 0.0 | 0.0 | 0.0 | 100 |
| | 12.2 | 0.0 | 5.9 | 0.0 | 0.0 | 0.0 | 0.0 | 0.0 | 0.0 | 0.0 | 0.0 | 0.0 | 94.1 | 0.0 | 0.0 | 0.0 | 0.0 | 0.0 | 0.0 | 0.0 | 0.0 | 0.0 | 0.0 | 100 |
| C4 + C16 | 8.0 | 0.0 | 33.3 | 0.0 | 0.0 | 0.0 | 0.0 | 0.0 | 0.0 | 0.0 | 0.0 | 0.0 | 0.0 | 0.0 | 66.7 | 0.0 | 0.0 | 0.0 | 0.0 | 0.0 | 0.0 | 0.0 | 0.0 | 100 |
| | 10.0 | 0.0 | 20.0 | 0.0 | 0.0 | 0.0 | 0.0 | 0.0 | 0.0 | 0.0 | 0.0 | 0.0 | 0.0 | 0.0 | 80.0 | 0.0 | 0.0 | 0.0 | 0.0 | 0.0 | 0.0 | 0.0 | 0.0 | 100 |
| C4 + C18 | 6.5 | 0.0 | 50.0 | 0.0 | 0.0 | 0.0 | 0.0 | 0.0 | 0.0 | 0.0 | 0.0 | 0.0 | 0.0 | 0.0 | 0.0 | 0.0 | 50.0 | 0.0 | 0.0 | 0.0 | 0.0 | 0.0 | 0.0 | 100 |
| | 9.6 | 0.0 | 25.0 | 0.0 | 0.0 | 0.0 | 0.0 | 0.0 | 0.0 | 0.0 | 0.0 | 0.0 | 0.0 | 0.0 | 0.0 | 0.0 | 75.0 | 0.0 | 0.0 | 0.0 | 0.0 | 0.0 | 0.0 | 100 |
| | 12.0 | 0.0 | 14.3 | 0.0 | 0.0 | 0.0 | 0.0 | 0.0 | 0.0 | 0.0 | 0.0 | 0.0 | 0.0 | 0.0 | 0.0 | 0.0 | 85.7 | 0.0 | 0.0 | 0.0 | 0.0 | 0.0 | 0.0 | 100 |
| C3,4,12 | 4.5 | 33.3 | 33.3 | 0.0 | 0.0 | 0.0 | 0.0 | 0.0 | 0.0 | 0.0 | 33.3 | 0.0 | 0.0 | 0.0 | 0.0 | 0.0 | 0.0 | 0.0 | 0.0 | 0.0 | 0.0 | 0.0 | 0.0 | 100 |
| | 6.5 | 16.7 | 16.7 | 0.0 | 0.0 | 0.0 | 0.0 | 0.0 | 0.0 | 0.0 | 66.7 | 0.0 | 0.0 | 0.0 | 0.0 | 0.0 | 0.0 | 0.0 | 0.0 | 0.0 | 0.0 | 0.0 | 0.0 | 100 |
| | 8.0 | 10.0 | 10.0 | 0.0 | 0.0 | 0.0 | 0.0 | 0.0 | 0.0 | 0.0 | 80.0 | 0.0 | 0.0 | 0.0 | 0.0 | 0.0 | 0.0 | 0.0 | 0.0 | 0.0 | 0.0 | 0.0 | 0.0 | 100 |
| | 9.4 | 5.6 | 5.6 | 0.0 | 0.0 | 0.0 | 0.0 | 0.0 | 0.0 | 0.0 | 88.9 | 0.0 | 0.0 | 0.0 | 0.0 | 0.0 | 0.0 | 0.0 | 0.0 | 0.0 | 0.0 | 0.0 | 0.0 | 100 |
| C3,4,14 | 4.0 | 40.0 | 40.0 | 0.0 | 0.0 | 0.0 | 0.0 | 0.0 | 0.0 | 0.0 | 0.0 | 0.0 | 20.0 | 0.0 | 0.0 | 0.0 | 0.0 | 0.0 | 0.0 | 0.0 | 0.0 | 0.0 | 0.0 | 100 |
| | 4.6 | 33.3 | 33.3 | 0.0 | 0.0 | 0.0 | 0.0 | 0.0 | 0.0 | 0.0 | 0.0 | 0.0 | 33.3 | 0.0 | 0.0 | 0.0 | 0.0 | 0.0 | 0.0 | 0.0 | 0.0 | 0.0 | 0.0 | 100 |
| | 6.9 | 16.7 | 16.7 | 0.0 | 0.0 | 0.0 | 0.0 | 0.0 | 0.0 | 0.0 | 0.0 | 0.0 | 66.7 | 0.0 | 0.0 | 0.0 | 0.0 | 0.0 | 0.0 | 0.0 | 0.0 | 0.0 | 0.0 | 100 |
| | 9.7 | 7.1 | 7.1 | 0.0 | 0.0 | 0.0 | 0.0 | 0.0 | 0.0 | 0.0 | 0.0 | 0.0 | 85.7 | 0.0 | 0.0 | 0.0 | 0.0 | 0.0 | 0.0 | 0.0 | 0.0 | 0.0 | 0.0 | 100 |
| | 9.8 | 6.7 | 6.7 | 0.0 | 0.0 | 0.0 | 0.0 | 0.0 | 0.0 | 0.0 | 6.7 | 0.0 | 80.0 | 0.0 | 0.0 | 0.0 | 0.0 | 0.0 | 0.0 | 0.0 | 0.0 | 0.0 | 0.0 | 100 |
| C3,4,12,14 | 4.7 | 25.0 | 25.0 | 25.0 | 0.0 | 0.0 | 0.0 | 0.0 | 0.0 | 0.0 | 25.0 | 0.0 | 25.0 | 0.0 | 0.0 | 0.0 | 0.0 | 0.0 | 0.0 | 0.0 | 0.0 | 0.0 | 0.0 | 100 |
| C3,4,5,14 | 6.5 | 14.3 | 14.3 | 14.3 | 0.0 | 0.0 | 0.0 | 0.0 | 0.0 | 0.0 | 0.0 | 0.0 | 57.1 | 0.0 | 0.0 | 0.0 | 0.0 | 0.0 | 0.0 | 0.0 | 0.0 | 0.0 | 0.0 | 100 |

TABLE A-continued

| | Av. Cx* | C3 | C4 | C5 | C6 | C7 | C8 | C9 | C10 | C11 | C12 | C13 | C14 | C15 | C16 | C17 | C18 | C19 | C20 | C21 | C22 | C23 | C24 | Total |
|---|---|---|---|---|---|---|---|---|---|---|---|---|---|---|---|---|---|---|---|---|---|---|---|---|
| | 9.1 | 6.7 | 6.7 | 6.7 | 0.0 | 0.0 | 0.0 | 0.0 | 0.0 | 0.0 | 0.0 | 0.0 | 80.0 | 0.0 | 0.0 | 0.0 | 0.0 | 0.0 | 0.0 | 0.0 | 0.0 | 0.0 | 0.0 | 100 |
| | 10.8 | 3.7 | 3.7 | 3.7 | 0.0 | 0.0 | 0.0 | 0.0 | 0.0 | 0.0 | 0.0 | 0.0 | 88.9 | 0.0 | 0.0 | 0.0 | 0.0 | 0.0 | 0.0 | 0.0 | 0.0 | 0.0 | 0.0 | 100 |
| C3,4,5,12,14 | 10.8 | 3.6 | 3.6 | 3.6 | 0.0 | 0.0 | 0.0 | 0.0 | 0.0 | 0.0 | 3.6 | 0.0 | 85.7 | 0.0 | 0.0 | 0.0 | 0.0 | 0.0 | 0.0 | 0.0 | 0.0 | 0.0 | 0.0 | 100 |
| C4,5,6,14 | 5.8 | 0.0 | 25.0 | 25.0 | 25.0 | 0.0 | 0.0 | 0.0 | 0.0 | 0.0 | 0.0 | 0.0 | 25.0 | 0.0 | 0.0 | 0.0 | 0.0 | 0.0 | 0.0 | 0.0 | 0.0 | 0.0 | 0.0 | 100 |
| | 7.8 | 0.0 | 14.3 | 14.3 | 14.3 | 0.0 | 0.0 | 0.0 | 0.0 | 0.0 | 0.0 | 0.0 | 57.1 | 0.0 | 0.0 | 0.0 | 0.0 | 0.0 | 0.0 | 0.0 | 0.0 | 0.0 | 0.0 | 100 |
| | 10.2 | 0.0 | 6.7 | 6.7 | 6.7 | 0.0 | 0.0 | 0.0 | 0.0 | 0.0 | 0.0 | 0.0 | 80.0 | 0.0 | 0.0 | 0.0 | 0.0 | 0.0 | 0.0 | 0.0 | 0.0 | 0.0 | 0.0 | 100 |
| | 11.6 | 0.0 | 3.7 | 3.7 | 3.7 | 0.0 | 0.0 | 0.0 | 0.0 | 0.0 | 0.0 | 0.0 | 88.9 | 0.0 | 0.0 | 0.0 | 0.0 | 0.0 | 0.0 | 0.0 | 0.0 | 0.0 | 0.0 | 100 |
| C5,6,8,10,12,14,16 | 7.5 | 0.0 | 0.0 | 9.1 | 45.5 | 0.0 | 9.1 | 0.0 | 9.1 | 0.0 | 9.1 | 0.0 | 9.1 | 0.0 | 9.1 | 0.0 | 0.0 | 0.0 | 0.0 | 0.0 | 0.0 | 0.0 | 0.0 | 100 |
| | 8.7 | 0.0 | 0.0 | 14.3 | 14.3 | 0.0 | 14.3 | 0.0 | 14.3 | 0.0 | 14.3 | 0.0 | 14.3 | 0.0 | 14.3 | 0.0 | 0.0 | 0.0 | 0.0 | 0.0 | 0.0 | 0.0 | 0.0 | 100 |
| C6,12 | 8.0 | 0.0 | 0.0 | 0.0 | 50.0 | 0.0 | 0.0 | 0.0 | 0.0 | 0.0 | 50.0 | 0.0 | 0.0 | 0.0 | 0.0 | 0.0 | 0.0 | 0.0 | 0.0 | 0.0 | 0.0 | 0.0 | 0.0 | 100 |
| | 9.0 | 0.0 | 0.0 | 0.0 | 33.3 | 0.0 | 0.0 | 0.0 | 0.0 | 0.0 | 66.7 | 0.0 | 0.0 | 0.0 | 0.0 | 0.0 | 0.0 | 0.0 | 0.0 | 0.0 | 0.0 | 0.0 | 0.0 | 100 |
| | 10.0 | 0.0 | 0.0 | 0.0 | 20.0 | 0.0 | 0.0 | 0.0 | 0.0 | 0.0 | 80.0 | 0.0 | 0.0 | 0.0 | 0.0 | 0.0 | 0.0 | 0.0 | 0.0 | 0.0 | 0.0 | 0.0 | 0.0 | 100 |
| | 10.8 | 0.0 | 0.0 | 0.0 | 11.1 | 0.0 | 0.0 | 0.0 | 0.0 | 0.0 | 88.9 | 0.0 | 0.0 | 0.0 | 0.0 | 0.0 | 0.0 | 0.0 | 0.0 | 0.0 | 0.0 | 0.0 | 0.0 | 100 |
| | 11.1 | 0.0 | 0.0 | 0.0 | 7.7 | 0.0 | 0.0 | 0.0 | 0.0 | 0.0 | 92.3 | 0.0 | 0.0 | 0.0 | 0.0 | 0.0 | 0.0 | 0.0 | 0.0 | 0.0 | 0.0 | 0.0 | 0.0 | 100 |
| C6,14 | 6.4 | 0.0 | 0.0 | 0.0 | 88.9 | 0.0 | 0.0 | 0.0 | 0.0 | 0.0 | 0.0 | 0.0 | 11.1 | 0.0 | 0.0 | 0.0 | 0.0 | 0.0 | 0.0 | 0.0 | 0.0 | 0.0 | 0.0 | 100 |
| | 8.4 | 0.0 | 0.0 | 0.0 | 50.0 | 0.0 | 0.0 | 0.0 | 0.0 | 0.0 | 0.0 | 0.0 | 50.0 | 0.0 | 0.0 | 0.0 | 0.0 | 0.0 | 0.0 | 0.0 | 0.0 | 0.0 | 0.0 | 100 |
| | 9.7 | 0.0 | 0.0 | 0.0 | 33.3 | 0.0 | 0.0 | 0.0 | 0.0 | 0.0 | 0.0 | 0.0 | 66.7 | 0.0 | 0.0 | 0.0 | 0.0 | 0.0 | 0.0 | 0.0 | 0.0 | 0.0 | 0.0 | 100 |
| | 11.1 | 0.0 | 0.0 | 0.0 | 20.0 | 0.0 | 0.0 | 0.0 | 0.0 | 0.0 | 0.0 | 0.0 | 80.0 | 0.0 | 0.0 | 0.0 | 0.0 | 0.0 | 0.0 | 0.0 | 0.0 | 0.0 | 0.0 | 100 |
| | 12.2 | 0.0 | 0.0 | 0.0 | 11.1 | 0.0 | 0.0 | 0.0 | 0.0 | 0.0 | 0.0 | 0.0 | 88.9 | 0.0 | 0.0 | 0.0 | 0.0 | 0.0 | 0.0 | 0.0 | 0.0 | 0.0 | 0.0 | 100 |
| | 12.7 | 0.0 | 0.0 | 0.0 | 7.7 | 0.0 | 0.0 | 0.0 | 0.0 | 0.0 | 0.0 | 0.0 | 92.3 | 0.0 | 0.0 | 0.0 | 0.0 | 0.0 | 0.0 | 0.0 | 0.0 | 0.0 | 0.0 | 100 |
| C6,12,14 | 7.1 | 0.0 | 0.0 | 0.0 | 71.4 | 0.0 | 0.0 | 0.0 | 0.0 | 0.0 | 14.3 | 0.0 | 14.3 | 0.0 | 0.0 | 0.0 | 0.0 | 0.0 | 0.0 | 0.0 | 0.0 | 0.0 | 0.0 | 100 |
| | 9.3 | 0.0 | 0.0 | 0.0 | 33.3 | 0.0 | 0.0 | 0.0 | 0.0 | 0.0 | 33.3 | 0.0 | 33.3 | 0.0 | 0.0 | 0.0 | 0.0 | 0.0 | 0.0 | 0.0 | 0.0 | 0.0 | 0.0 | 100 |
| | 10.5 | 0.0 | 0.0 | 0.0 | 20.0 | 0.0 | 0.0 | 0.0 | 0.0 | 0.0 | 40.0 | 0.0 | 40.0 | 0.0 | 0.0 | 0.0 | 0.0 | 0.0 | 0.0 | 0.0 | 0.0 | 0.0 | 0.0 | 100 |
| | 11.5 | 0.0 | 0.0 | 0.0 | 11.1 | 0.0 | 0.0 | 0.0 | 0.0 | 0.0 | 44.4 | 0.0 | 44.4 | 0.0 | 0.0 | 0.0 | 0.0 | 0.0 | 0.0 | 0.0 | 0.0 | 0.0 | 0.0 | 100 |
| | 12.1 | 0.0 | 0.0 | 0.0 | 5.9 | 0.0 | 0.0 | 0.0 | 0.0 | 0.0 | 47.1 | 0.0 | 47.1 | 0.0 | 0.0 | 0.0 | 0.0 | 0.0 | 0.0 | 0.0 | 0.0 | 0.0 | 0.0 | 100 |
| | 12.4 | 0.0 | 0.0 | 0.0 | 4.0 | 0.0 | 0.0 | 0.0 | 0.0 | 0.0 | 48.0 | 0.0 | 48.0 | 0.0 | 0.0 | 0.0 | 0.0 | 0.0 | 0.0 | 0.0 | 0.0 | 0.0 | 0.0 | 100 |
| | 11.3 | 0.0 | 0.0 | 0.0 | 7.1 | 0.0 | 0.0 | 0.0 | 0.0 | 0.0 | 85.7 | 0.0 | 7.1 | 0.0 | 0.0 | 0.0 | 0.0 | 0.0 | 0.0 | 0.0 | 0.0 | 0.0 | 0.0 | 100 |
| | 11.3 | 0.0 | 0.0 | 0.0 | 9.1 | 0.0 | 0.0 | 0.0 | 0.0 | 0.0 | 72.7 | 0.0 | 18.2 | 0.0 | 0.0 | 0.0 | 0.0 | 0.0 | 0.0 | 0.0 | 0.0 | 0.0 | 0.0 | 100 |
| | 11.5 | 0.0 | 0.0 | 0.0 | 11.1 | 0.0 | 0.0 | 0.0 | 0.0 | 0.0 | 44.4 | 0.0 | 44.4 | 0.0 | 0.0 | 0.0 | 0.0 | 0.0 | 0.0 | 0.0 | 0.0 | 0.0 | 0.0 | 100 |
| | 12.2 | 0.0 | 0.0 | 0.0 | 9.1 | 0.0 | 0.0 | 0.0 | 0.0 | 0.0 | 18.2 | 0.0 | 72.7 | 0.0 | 0.0 | 0.0 | 0.0 | 0.0 | 0.0 | 0.0 | 0.0 | 0.0 | 0.0 | 100 |
| | 12.6 | 0.0 | 0.0 | 0.0 | 7.1 | 0.0 | 0.0 | 0.0 | 0.0 | 0.0 | 7.1 | 0.0 | 85.7 | 0.0 | 0.0 | 0.0 | 0.0 | 0.0 | 0.0 | 0.0 | 0.0 | 0.0 | 0.0 | 100 |
| C6,10,12,14 | 9.5 | 0.0 | 0.0 | 0.0 | 25.0 | 0.0 | 0.0 | 0.0 | 25.0 | 0.0 | 25.0 | 0.0 | 25.0 | 0.0 | 0.0 | 0.0 | 0.0 | 0.0 | 0.0 | 0.0 | 0.0 | 0.0 | 0.0 | 100 |
| | 10.4 | 0.0 | 0.0 | 0.0 | 14.3 | 0.0 | 0.0 | 0.0 | 28.6 | 0.0 | 28.6 | 0.0 | 28.6 | 0.0 | 0.0 | 0.0 | 0.0 | 0.0 | 0.0 | 0.0 | 0.0 | 0.0 | 0.0 | 100 |
| | 11.0 | 0.0 | 0.0 | 0.0 | 7.7 | 0.0 | 0.0 | 0.0 | 30.8 | 0.0 | 30.8 | 0.0 | 30.8 | 0.0 | 0.0 | 0.0 | 0.0 | 0.0 | 0.0 | 0.0 | 0.0 | 0.0 | 0.0 | 100 |
| | 11.3 | 0.0 | 0.0 | 0.0 | 4.0 | 0.0 | 0.0 | 0.0 | 32.0 | 0.0 | 32.0 | 0.0 | 32.0 | 0.0 | 0.0 | 0.0 | 0.0 | 0.0 | 0.0 | 0.0 | 0.0 | 0.0 | 0.0 | 100 |
| | 7.6 | 0.0 | 0.0 | 0.0 | 57.1 | 0.0 | 0.0 | 0.0 | 14.3 | 0.0 | 14.3 | 0.0 | 14.3 | 0.0 | 0.0 | 0.0 | 0.0 | 0.0 | 0.0 | 0.0 | 0.0 | 0.0 | 0.0 | 100 |
| | 7.2 | 0.0 | 0.0 | 0.0 | 66.7 | 0.0 | 0.0 | 0.0 | 11.1 | 0.0 | 11.1 | 0.0 | 11.1 | 0.0 | 0.0 | 0.0 | 0.0 | 0.0 | 0.0 | 0.0 | 0.0 | 0.0 | 0.0 | 100 |
| | 6.7 | 0.0 | 0.0 | 0.0 | 80.0 | 0.0 | 0.0 | 0.0 | 6.7 | 0.0 | 6.7 | 0.0 | 6.7 | 0.0 | 0.0 | 0.0 | 0.0 | 0.0 | 0.0 | 0.0 | 0.0 | 0.0 | 0.0 | 100 |
| | 7.0 | 0.0 | 0.0 | 0.0 | 75.0 | 0.0 | 0.0 | 0.0 | 0.0 | 0.0 | 6.3 | 0.0 | 18.8 | 0.0 | 0.0 | 0.0 | 0.0 | 0.0 | 0.0 | 0.0 | 0.0 | 0.0 | 0.0 | 100 |
| | 9.7 | 0.0 | 0.0 | 0.0 | 27.3 | 0.0 | 0.0 | 0.0 | 9.1 | 0.0 | 27.3 | 0.0 | 36.4 | 0.0 | 0.0 | 0.0 | 0.0 | 0.0 | 0.0 | 0.0 | 0.0 | 0.0 | 0.0 | 100 |
| | 10.4 | 0.0 | 0.0 | 0.0 | 25.0 | 0.0 | 0.0 | 0.0 | 0.0 | 0.0 | 25.0 | 0.0 | 25.0 | 0.0 | 25.0 | 0.0 | 0.0 | 0.0 | 0.0 | 0.0 | 0.0 | 0.0 | 0.0 | 100 |
| | 8.2 | 0.0 | 0.0 | 0.0 | 50.0 | 0.0 | 0.0 | 0.0 | 0.0 | 0.0 | 25.0 | 0.0 | 25.0 | 0.0 | 0.0 | 0.0 | 0.0 | 0.0 | 0.0 | 0.0 | 0.0 | 0.0 | 0.0 | 100 |
| | 7.4 | 0.0 | 0.0 | 0.0 | 57.1 | 0.0 | 0.0 | 0.0 | 28.6 | 0.0 | 7.1 | 0.0 | 7.1 | 0.0 | 0.0 | 0.0 | 0.0 | 0.0 | 0.0 | 0.0 | 0.0 | 0.0 | 0.0 | 100 |
| eq mo | 12.0 | 0.0 | 0.0 | 0.0 | 0.0 | 0.0 | 9.5 | 0.0 | 11.9 | 0.0 | 14.3 | 0.0 | 16.7 | 0.0 | 19.1 | 0.0 | 21.4 | 0.0 | 0.0 | 0.0 | 0.0 | 0.0 | 0.0 | 100 |
| C2 growth | 9.3 | 0.0 | 0.0 | 0.0 | 18.4 | 0.0 | 22.3 | 0.0 | 21.6 | 0.0 | 16.8 | 0.0 | 10.4 | 0.0 | 6.4 | 0.0 | 4.0 | 0.0 | 0.0 | 0.0 | 0.0 | 0.0 | 0.0 | 100 |
| wax crack | 10.4 | 0.0 | 0.0 | 5.1 | 6.1 | 6.1 | 7.2 | 7.7 | 8.0 | 7.8 | 6.1 | 7.1 | 5.9 | 7.1 | 5.6 | 5.9 | 5.0 | 5.1 | 4.1 | 0.0 | 0.0 | 0.0 | 0.0 | 100 |
| wax crack | 10.0 | 0.0 | 0.0 | 5.6 | 6.8 | 6.8 | 7.9 | 8.5 | 8.8 | 8.6 | 6.8 | 7.8 | 6.5 | 7.8 | 6.2 | 6.5 | 5.5 | 0.0 | 0.0 | 0.0 | 0.0 | 0.0 | 0.0 | 100 |

TABLE A-continued

| | | | | | | | | | | | Wt % Olefins in Feed | | | | | | | | | | | | | |
|---|---|---|---|---|---|---|---|---|---|---|---|---|---|---|---|---|---|---|---|---|---|---|---|---|
| | Av. Cx* | C3 | C4 | C5 | C6 | C7 | C8 | C9 | C10 | C11 | C12 | C13 | C14 | C15 | C16 | C17 | C18 | C19 | C20 | C21 | C22 | C23 | C24 | Total |
| wax crack | 12.5 | 0.0 | 0.0 | 0.0 | 0.0 | 0.0 | 0.0 | 11.6 | 12.1 | 11.7 | 9.3 | 10.7 | 9.0 | 10.7 | 8.5 | 9.0 | 7.6 | 0.0 | 0.0 | 0.0 | 0.0 | 0.0 | 0.0 | 100 |
| wax crack | 11.4 | 0.0 | 0.0 | 0.0 | 0.0 | 0.0 | 0.0 | 16.1 | 16.7 | 16.3 | 12.9 | 14.8 | 12.4 | 6.4 | 4.3 | 0.0 | 0.0 | 0.0 | 0.0 | 0.0 | 0.0 | 0.0 | 0.0 | 100 |
| wax crack | 10.9 | 0.0 | 0.0 | 0.0 | 0.0 | 0.0 | 0.0 | 19.8 | 20.6 | 20.1 | 15.8 | 13.2 | 10.6 | 0.0 | 0.0 | 0.0 | 0.0 | 0.0 | 0.0 | 0.0 | 0.0 | 0.0 | 0.0 | 100 | which often contains about equal molar of 1-octene and 1-dodecene. Thus, in an embodiment, the feed used in the present invention does not contain 1-decene, or contains 1-decene in an amount less than about 1 wt %, or less than about 5 wt %, or less than about 10 wt %, or less than about 20 wt %, or less than −30%, or less than −50%, or less than −60%, or less than −70%, and also an embodiment wherein the feed from one of these preferred embodiments not having an appreciable amount of 1-decene is used to produce a product having substantially similar properties as a product produced using a feed comprising substantially all 1-decene, or 90 wt % 1-decene. Preferred embodiments include feeds where any one of 1-octene, 1-decene, and 1-dodecene is less then 70%, 50 wt %, or 40 wt %, or 33 wt %, or 30 wt %, or 25 wt %, or 20 wt %, or 10 wt %, or 5 wt %, and/or wherein the total of 1-octene, 1-decene, and 1-dodecene is present in the aforementioned amounts.

One of the advantages of the present invention is that a feed may be taken directly from another process without laborious, time-consuming, and/or expensive isolation of one or more monomers. Thus, for example, a preferred embodiment is a feed used directly, with minimum isolation, from an ethylene growth process. Usually, LAO processes produce $C_6$ to $C_{20}$ LAO with small amounts of $C_{20+}$ LAO. In typical production processes, each individual $C_6$ to $C_{18}$ LAO is isolated from the crude mixture by careful fractionation. Usually each LAO has it unique application. This fractionation step adds cost and complexicity to the LAO production. In the present invention, the whole range of $C_4$ to $C_{20+}$ LAO directly from the oligomerization process can be used as feed, with only a separation of the light gases. There is no need to separate each individual fraction. Or, a wide range of LAO from $C_6$ to $C_{20}$ distilled in one fraction to separate it from the heavy $C_{20+}$ bottom can be used as feed in this invention. Or, a wide range of LAO from $C_6$ to $C_{18}$ distilled in one fraction from the remaining heavy LAOs can be used as feed. And so forth for any range LAO desired. This whole range or wide range LAO which requires no or minimum or simple isolation is a superior feed for this invention. To be able to use this whole range or wide range LAO offers economic advantage and furthermore, the product properties are superior.

Under certain reaction conditions, ethylene may be used as a "growth reagent" to produce alpha-olefins which are low molecular weight polymers (oligomers) of the growth reagent. Such reactions are described, for instance, in U.S. Pat. Nos. 2,889,385; 4,935,569 (and numerous references cited therein); U.S. Pat. No. 6,444,867; and in Chapter 3 of Lappin and Sauer, Alpha-olefins Applications Handbook, Marcel Dekker, Inc., NY 1989. The entire mixture of olefins produced by one of such processes, comprising, for example, nine different alpha-olefin oligomers of ethylene having from 4 to 20 carbon atoms, may be used directly in the process of the present invention with minimum isolation of the bulk of the alpha-olefins but without the necessity of separating the each individual oligomer. Mixtures of linear alpha-olefins (LAO) produced by other processes such as steam/thermal cracking of petroleum-based slack wax or more desirably from the steam/thermal cracking of wax derived from Fischer-Tropsch (FT) synthesis as described in the paper "Gas-to-Liquids Technology Provides New Hope for Remote Fields" published in Lubricant World, October 2000, page 30. By properly selecting the cracking conditions, alpha-olefins ranging from $C_5$ to $C_{18}$ can be produced in high yields, as described in U.S. Pat. Nos. 5,136,118; 5,146,002; and 5,208,403. In all these cracking processes, the wax derived from GTL process is the most desirable feed because of its high purity, lack of sulfur, nitrogen or other heteroatoms, and its low aromatics, naphthenics, and branched paraffins, content.

Mixtures of LAOs can also be produced directly from Fischer-Tropsch synthesis using special catalysts, usually cobalt or iron based FT catalysts, in combination with a synthesis gas with a low $H_2/CO$ ratio. The mixture of alpha-olefins with only even carbon numbers or with both odd and even carbon numbers can be used with minimum separation as feed for this invention, or can be separated into different fractions. Fractions with no other special use can be used as feed in this invention process to yield high quality synthetic fluids. This approach provides a method to optimize total LAO value. Examples of the feed compositions are summarized in Table A. In many cases, the preferred feeds are chosen from $C_3$- to $C_7$ alpha-olefins in combination with another olefin or olefins chosen from $C_{12}$ to $C_{20}$ alpha-olefins. This approach leaves out the $C_8$ and $C_{10}$ LAOs or uses only minimum amounts of them. The $C_8$ and $C_{10}$ LAOs are usually in high demand from other applications, such as for use as co-monomers for polyethylene plastic synthesis or used in $BF_3$ or $AlCl_3$-based oligomerization processes, which prefer 1-decene as feed. Or if $C_8$ and $C_{10}$ alpha-olefins are available, then they can be added as part of the feed.

In addition to LAO used in this process, other alpha-olefins containing branches that are at least two carbons away from the olefinic double bonds can also be used as one of the mixture components. Examples of these alpha-olefins include 4-methyl-1-pentene, or other slightly branched alpha-olefins produced from Fischer-Tropsch synthesis process or from wax-cracking process. These slightly branched alpha-olefins can be used together with the LAOs described above as feeds.

Polymerization Catalyst System

This improved process employs a catalyst system comprising a metallocene compound (Formula 1, below) together with an activator such as a non-coordinating anion (NCA) activator (Formula 2, below, is one example) or methylaluminoxane (MAO) (Formula 3, below).

Formula 1

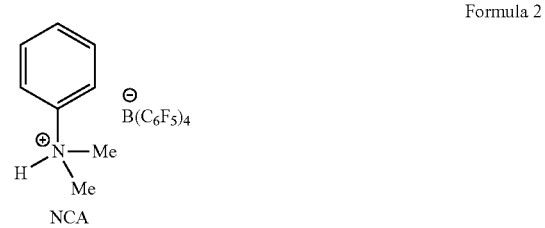

Formula 2

Formula 3

The term "catalyst system" is defined herein to mean a catalyst precursor/activator pair, such as a metallocene/activator pair. When "catalyst system" is used to describe such a pair before activation, it means the unactivated catalyst (precatalyst) together with an activator and, optionally, a co-activator (such as a trialkyl aluminum compound). When it is used to describe such a pair after activation, it means the activated catalyst and the activator or other charge-balancing moiety. Furthermore, this activated "catalyst system" may optionally comprise the co-activator and/or other charge-balancing moiety.

The metallocene is selected from one or more compounds according to Formula 1, above. In Formula 1, M is selected from Group 4 transition metals, preferably zirconium (Zr), hafnium (Hf) and titanium (Ti), L1 and L2 are independently selected from cyclopentadienyl ("Cp"), indenyl, and fluorenyl, which may be substituted or unsubstituted, and which may be partially hydrogenated, A is an optional bridging group which if present, in preferred embodiments is selected from dialkylsilyl, dialkylmethyl, ethenyl (—CH$_2$—CH$_2$—), alkylethenyl (—CR$_2$—CR$_2$—), where alkyl can be independently hydrogen radical, C$_1$ to C$_{16}$ alkyl radical or phenyl, tolyl, xylyl radical and the like, and wherein each of the two X groups, X$^a$ and X$^b$, are independently selected from halides, OR (R is an alkyl group, preferably selected from C$_1$ to C$_5$ straight or branched chain alkyl groups), hydrogen, C$_1$ to C$_{16}$ alkyl or aryl groups, haloalkyl, and the like. Usually relatively more highly substituted metallocenes give higher catalyst productivity and wider product viscosity ranges and are thus often more preferred.

In using the terms "substituted or unsubstituted cyclopentadienyl ligand", "substituted or unsubstituted indenyl ligand", and "substituted or unsubstituted tetrahydroindenyl ligand", "substituted or unsubstituted fluorenyl ligand", and "substituted or unsubstituted tetrahydrofluorenyl or octahydrofluorenyl ligand" the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands or heterotetrahydoindenyl ligands, each of which can additional be substituted or unsubstituted.

For purposes of this invention and the claims thereto the terms "hydrocarbyl radical," "hydrocarbyl" and hydrocarbyl group" are used interchangeably throughout this document. Likewise the terms "group", "radical" and "substituent" are also used interchangeably in this document. For purposes of this disclosure, "hydrocarbyl radical" is defined to be C$_1$-C$_{100}$ radicals, that may be linear, branched, or cyclic, and when cyclic, aromatic or non-aromatic, and include substituted hydrocarbyl radicals, halocarbyl radicals, and substituted halocarbyl radicals, silylcarbyl radicals, and germylcarbyl radicals as these terms are defined below.

Substituted hydrocarbyl radicals are radicals in which at least one hydrogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. CF$_3$).

Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include SiH$_3$, SiH$_2$R*, SiHR*$_2$, SiR*$_3$, SiH$_2$(OR*), SiH(OR*)$_2$, Si(OR*)$_3$, SiH$_2$(NR*$_2$), SiH(NR*$_2$)$_2$, Si(NR*$_2$)$_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include GeH$_3$, GeH$_2$R*, GeHR*$_2$, GeR*$_3$, GeH$_2$(OR*), GeH(OR*)$_2$, Ge(OR*)$_3$, GeH$_2$(NR*$_2$), GeH(NR*$_2$)$_2$, Ge(NR*$_2$)$_3$, and the like where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which the heteroatom functionality is bonded directly to the indicated atom or atoms. They include heteroatoms of groups 1-17 of the Periodic Table either alone or connected to other elements by covalent or other interactions such as ionic, van der Waals forces, or hydrogen bonding. Examples of functional heteroatom containing groups include carboxylic acid, acid halide, carboxylic ester, carboxylic salt, carboxylic anhydride, aldehyde and their chalcogen (Group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, phosphines, phosphates, other phosphorus compounds, silanes, boranes, borates, alanes, aluminates. Functional groups may also be taken broadly to include organic polymer supports or inorganic support material such as alumina, and silica. Preferred examples of polar groups include NR*$_2$, OR*, SeR*, TeR*, PR*$_2$, AsR*$_2$, SbR*$_2$, SR*, BR*$_2$, SnR*$_3$, PbR*$_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Examples of cyclopentadienyl and indenyl ligands are illustrated below as anionic ligands. The ring numbering scheme is also illustrated.

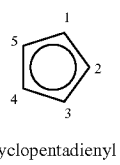
Cyclopentadienyl

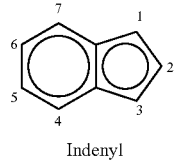
Indenyl

A similar numbering and nomenclature scheme is used for heteroindenyl as illustrated below where Z and Q independently represent the heteroatoms O, S, Se, or Te, or heteroatom groups, NR', PR', AsR', or SbR' where R' is hydrogen, or a hydrocarbyl, substituted hydrocarbyl, halocarbyl, substituted halocarbyl, silylcarbyl, or germylcarbyl substituent. The number scheme shown below is for heteroindenyl ligands that are bridged to another ligand via a bridging group.

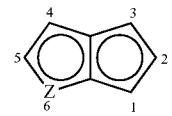

Examples include:
Cyclopenta[b]thienyl (Z = S)
Cyclopenta[b]furanyl (Z = O)
Cyclopenta[b]selenophenyl (Z = Se)
Cyclopenta[b]tellurophenyl (Z = Te)
6-Methyl-cyclopenta[b]pyrrolyl (Z = N—Me)
6-Methyl-cyclopenta[b]phospholyl (Z = P—Me)
6-Methyl-cyclopenta[b]arsolyl (Z = As—Me)
6-Methyl-cyclopenta[b]stibolyl (Z = Sb—Me)

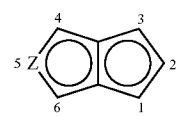

Examples include:
Cyclopenta[c]thienyl (Z = S)
Cyclopenta[c]furanyl (Z = O)
Cyclopenta[c]selenophenyl (Z = Se)
Cyclopenta[c]tellurophenyl (Z = Te)
5-Methyl-cyclopenta[c]pyrrolyl (Z = N—Me)
5-Methyl-cyclopenta[c]phospholyl (Z = P—Me)
5-Methyl-cyclopenta[c]arsolyl (Z = As—Me)
5-Methyl-cyclopenta[c]stibolyl (Z = Sb—Me)

A similar numbering and nomenclature scheme is used for heterocyclopentadienyl rings as illustrated below where G and J independently represent the heteroatoms N, P, As, Sb or B. For these ligands when bridged to another ligand via a bridging group, the one position is usually chosen to be the ring carbon position where the ligand is bonded to the bridging group, hence a numbering scheme is not illustrated below.

Examples include:
Azacyclopentadiene (G = N)
Phosphacyclopentadiene (G = P)
Stibacyclopentadiene (G = Sb)
Arsacyclopentadiene (G = As)
Boracyclopentadiene (G = B)

Depending on the position of the bridging ligand, the numbering for the following ligands will change; 1,3 and 1,2 are only used in this case to illustrate the position of the heteroatoms relative to one another.

Examples include:
1,3-Diazacyclopentadiene (G = J = N)
1,3-Diphosphacyclopentadiene (G = J = P)
1,3-Distibacyclopentadiene (G = J = Sb)
1,3-Diarsacyclopentadiene (G = J = As)
1,3-Diboracyclopentadiene (G = J = B)
1,3-Azaphosphacyclopentadiene (G = N; J = P)
1,3-Azastibacyclopentadiene (G = N; J = Sb)
1,3-Azarsacyclopentadiene (G = N; J = As)
1,3-Azaboracyclopentadiene (G = N; J = B)
1,3-Arsaphosphacyclopentadiene (G = As; J = P)
1,3-Arsastibacyclopentadiene (G = As; J = Sb)
1,3-Arsaboracyclopentadiene (G = As; J = B)
1,3-Boraphosphacyclopentadiene (G = B; J = P)
1,3-Borastibacyclopentadiene (G = B; J = Sb)
1,3-Phosphastibacyclopentadiene (G = P; J = Sb)

Examples include:
1,2-Diazacyclopentadiene (G = J = N)
1,2-Diphosphacyclopentadiene (G = J = P)
1,2-Distibacyclopentadiene (G = J = Sb)
1,2-Diarsacyclopentadiene (G = J = As)
1,2-Diboracyclopentadiene (G = J = B)
1,2-Azaphosphacyclopentadiene (G = N; J = P)
1,2-Azastibacyclopentadiene (G = N; J = Sb)
1,2-Azarsacyclopentadiene (G = N; J = As)
1,2-Azaboracyclopentadiene (G = N; J = B)
1,2-Arsaphosphacyclopentadiene (G = As; J = P)
1,2-Arsastibacyclopentadiene (G = As; J = Sb)
1,2-Arsaboracyclopentadiene (G = As; J = B)
1,2-Boraphosphacyclopentadiene (G = B; J = P)
1,2-Borastibacyclopentadiene (G = B; J = Sb)
1,2-Phosphastibacyclopentadiene (G = P; J = Sb)

A "ring heteroatom" is a heteroatom that is within a cyclic ring structure. A "heteroatom substituent" is heteroatom containing group that is directly bonded to a ring structure through the heteroatom. A "bridging heteroatom substituent" is a heteroatom or heteroatom group that is directly bonded to two different ring structures through the heteroatom. The terms "ring heteroatom", "heteroatom substituent", and "bridging heteroatom substituent" are illustrated below where Z and R' are as defined above. It should be noted that a "heteroatom substituent" can be a "bridging heteroatom substituent" when R' is additionally defined as the ligand "A".

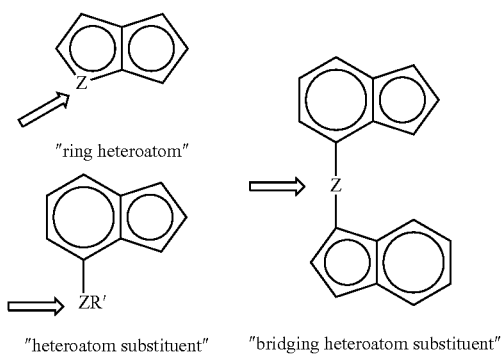

A "ring carbon atom" is a carbon atom that is part of a cyclic ring structure. By this definition, an indenyl ligand has nine ring carbon atoms; a cyclopentadienyl ligand has five ring carbon atoms. Transition metal compounds have symmetry elements and belong to symmetry groups. These elements and groups are well established and can be referenced from Chemical Applications of Group Theory (2nd Edition) by F. Albert Cotton, Wiley-Interscience, 1971. Pseudo-symmetry, such as a pseudo $C_2$-axis of symmetry refers to the same symmetry operation, however, the substituents on the ligand frame do not need to be identical, but of similar size and steric bulk. Substituents of similar size are typically within 4 atoms of each other, and of similar shape. For example, methyl, ethyl, n-propyl, n-butyl and iso-butyl substituents (e.g. $C_1$-$C_4$ primary bonded substituents) would be considered of similar size and steric bulk. Likewise, isopropyl, sec-butyl, 1-methylbutyl, 1-ethylbutyl and 1-methylpentyl substituents (e.g. $C_3$-$C_6$ secondary bonded substituents) would be considered of similar size and steric bulk. Tert-butyl, 1,1-dimethylpropyl, 1,1-dimethylbutyl, 1,1-dimethylpentyl and 1-ethyl-1-methylpropyl (e.g. $C_4$-$C_7$ tertiary bonded substituents) would be considered of similar size and steric bulk. Phenyl, tolyl, xylyl, and mesityl substituents ($C_6$-$C_9$ aryl substituents) would be considered of similar size and steric bulk. Additionally, the bridging substituents of a compound with a pseudo $C_2$-axis of symmetry do not have to be similar at all since they are far removed from the active site of the catalyst. Therefore, a compound with a pseudo $C_2$-axis of symmetry could have for example, a $Me_2Si$, MeEtSi or MePhSi bridging ligand, and still be considered to have a pseudo $C_2$-axis of symmetry given the appropriate remaining ligand structure.

For purposes of this disclosure, the term oligomer refers to compositions having 2-75 mer units and the term polymer refers to compositions having 76 or more mer units. A mer is defined as a unit of an oligomer or polymer that originally corresponded to the olefin(s) used in the oligomerization or polymerization reaction. For example, the mer of polydecene would be decene.

The metallocene compounds (pre-catalysts), useful herein are preferably cyclopentadienyl derivatives of titanium, zirconium and hafnium. In general, useful titanocenes, zirconocenes and hafnocenes may be represented by the following formulae 4 and 5:

$$(Cp\text{-}A'\text{-}Cp^*)MX^aX^b \qquad (4)$$

$$(CpCp^*)MX^aX^b \qquad (5)$$

wherein:
M is the metal center, and is a Group 4 metal preferably Titanium, zirconium or hafnium, preferably zirconium or hafnium; Cp and Cp* are the same or different cyclopentadienyl rings substituted with from zero to four or five substituent groups S", each substituent group S" being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent S" groups are joined to form a substituted or unsubstituted, saturated, partially unsaturated, or aromatic cyclic or polycyclic substituent;
A' is a bridging group;
$X^a$ and $X^b$ are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or when Lewis-acid activators, such as methylaluminoxane or tri-alkylaluminum or trialkylboron, etc., which are capable of donating a hydrocarbyl ligand as described above to the transition metal component, are used, both X may, independently, be a halogen, alkoxide, aryloxide, amide, phosphide or other univalent anionic ligand or both X can also be joined to form a anionic chelating ligand.

In a preferred embodiment the metallocene is racemic which means in a preferred embodiment, that the compounds represented by formula (4) have no plane of symmetry containing the metal center, M; and have a $C_2$-axis of symmetry or pseudo $C_2$-axis of symmetry through the metal center. Preferably in the racemic metallocenes represented by formula (1) A' is selected from $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'$ $CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R'_2CSiR'_2CR'_2$, $R'_2SiCR'_2SiR'_2$, $R'C=CR'$ $SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C$—$BR'$, $R'_2C$—$BR'$—$CR'_2$, $R'N$, $R'P$, $O$, $S$, $Se$, $R'_2C$—$O$—$CR'_2$, $R'_2CR'_2C$—$O$—$CR'_2CR'_2$, $R'_2C$—$O$—$CR'_2CR'_2$, $R'_2C$—$O$—$CR'=CR'$, $R'_2C$—$S$—$CR'_2$, $R'_2CR'_2C$—$S$—$CR'_2CR'_2$, $R'_2C$—$S$—$CR'_2CR'_2$, $R'_2C$—$S$—$CR'=CR'$, $R'_2C$—$Se$—$CR'_2$, $R'_2CR'_2C$—$Se$—$CR'_2CR'_2$, $R'_2C$—$Se$—$CR'_2CR'_2$, $R'_2C$—$Se$—$CR'=CR'$, $R'_2C$—$N=CR'$, $R'_2C$—$NR'$—$CR'_2$, $R'_2C$—$NR'$—$CR'_2CR'_2$, $R'_2C$—$NR'$—$CR'=CR'$, $R'_2CR'_2C$—$NR'$—$CR'_2CR'_2$, $R'_2C$—$P=CR'$, and $R'_2C$—$PR'$—$CR'_2$ and when Cp is different than Cp*, R' is a $C_1$-$C_5$-containing hydrocarbyl, substituted hydrocarbyl, halocarbyl, substituted halocarbyl, silylcarbyl or germylcarbyl substituent, and when Cp is the same as Cp*, R' is a $C_1$-$C_{20}$-containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated, cyclic or polycyclic substituent. Similarly, $C_1$ metallocenes can also be used for this invention. All these catalysts usually produce polyalpha-olefins with high degree of isotacticity or highly isotactic polymers. See J. Am. Chem. Soc. 1988, 110, 6225 for a review of the effect of catalyst structure on polymer tacticity. In addition to catalyst structures, the degree of isotacticity depends on other factors, such as catalyst purity, ligand types, reaction conditions, etc. The polymers with various degrees of tacticity are useful as synthetic lube base stocks or functional fluids.

In another preferred embodiment the metallocene is the meso form which means that the compounds represented by formula (4) have plane of symmetry containing the metal center, M. In other words, the metallocenes containing a $C_{2v}$ symmetry are also suitable for this application. This class of catalysts usually produces atactic polyalpha-olefins. In many cases, metallocene catalysts without any bridging between the cyclopentadienyl ligands, as in formula (5), also produce atactic polyalpha-olefins. In another preferred embodiment, the metallocenes with $C_s$ symmetry or minor variations thereof can also be used for this invention. These types of metallocenes when activated usually produced syndiotactic polyalpha-olefins. In the present invention, the polyalpha-olefins can be made from at least two alpha-olefins mixture using any one class of the catalysts to produce isotactic, atactic or syndiotactic polymer or combinations of these different tacticities in varying amounts. The PAO products made from mixed alpha-olefin feeds and with predominantly isotactic, atactic or syndiotactic compositions or combinations of these different tacticities in varying amounts all have superior VI and low temperature properties. Using mixed alpha-olefins as feeds is more advantageous than using pure olefins, especially in improving low temperature viscosities. Other appropriate forms of catalysts which may produce combinations of these different tacticities, in a block or semi-block manner are also suitable for this invention.

Another important characteristic of these metallocene catalysts is that they copolymerize the two or more alpha-olefins at comparable reaction rates. Metallocene catalysts differ from conventional Ziegler-Natta or supported metal oxide on silica gel catalysts. These conventional catalysts usually polymerize smaller olefins, e.g., $C_3$ or $C_4$, much faster than the larger LAOs, such as $C_{12}$, $C_{14}$, etc. This is not the case for the metallocene catalysts of the present invention, where the reactivities of $C_3$ and $C_{18}$ alpha-olefins are relatively similar. Because of this uniform reactivity toward all the alpha-olefin feeds, the co- or terpolymer products by metallocene are random. This randomness of monomer distribution is important for imparting the resultant polymer with the desired lube basestock properties discussed earlier.

Table B depicts representative constituent moieties for the metallocene components of formulas 4 and 5. The list is for illustrative purposes only and should not be construed to be limiting in any way. A number of final components may be formed by permuting all possible combinations of the constituent moieties with each other. When hydrocarbyl radicals including alkyl, alkenyl, alkynyl, cycloalkyl, cycloalkenyl, cycloalkynyl and aromatic radicals are disclosed in this application the term includes all isomers. For example, butyl includes n-butyl, 2-methylpropyl, 1-methylpropyl, tert-butyl, and cyclobutyl; pentyl includes n-pentyl, 1-methylbutyl, 2-methylbutyl, 3-methylbutyl, 1-ethylpropyl, neopentyl, cyclopentyl and methylcyclobutyl; butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl. This includes when a radical is bonded to another group, for example, propylcyclopentadienyl include n-propylcyclopentadienyl, isopropylcyclopentadienyl and cyclopropylcyclopentadienyl. In general, the ligands or groups illustrated in Table B include all isomeric forms. For example, dimethylcyclopentadienyl includes 1,2-dimethylcyclopentadienyl and 1,3-dimethylcyclopentadienyl; methylindenyl includes 1-methylindenyl, 2-methylindenyl, 3-methylindenyl, 4-methylindenyl, 5-methylindenyl, 6-methylindenyl and 7-methylindenyl; methylethylphenyl includes ortho-methylethylphenyl, meta-methylethylphenyl and para-methylethylphenyl. Examples of specific invention catalyst precursors take the following formula where some components are listed in Table B. To illustrate members of the transition metal component, select any combination of the species listed in Tables B. For nomenclature purposes, for the bridging group, A', the words "silyl" and "silylene" are used interchangeably, and represent a diradical species. For the bridging group A', "ethylene" refers to a 1,2-ethylene linkage and is distinguished from ethene-1,1-diyl. Thus, for the bridging group A', "ethylene" and "1,2-ethylene" are used interchangeably. For compounds having a bridging group, A', the bridge position on the cyclopentadienyl-type ring is always considered the 1-position. The numbering scheme previous defined for the indenyl ring is used to indicate the bridge position; if a number is not specified, it is assumed that the bridge to the indenyl ligand is in the one position.

TABLE B

| A' | Cp, Cp* |
|---|---|
| dimethylsilylene | cyclopentadienyl |
| diethylsilylene | methylcyclopentadienyl |
| dipropylsilylene | dimethylcyclopentadienyl |
| dibutylsilylene | trimethylcyclopentadienyl |
| dipentylsilylene | tetramethylcyclopentadienyl |
| dihexylsilylene | ethylcyclopentadienyl |
| diheptylsilylene | diethylcyclopentadienyl |
| dioctylsilylene | propylcyclopentadienyl |
| dinonylsilylene | dipropylcyclopentadienyl |
| didecylsilylene | butylcyclopentadienyl |
| diundecylsilylene | dibutylcyclopentadienyl |
| didodecylsilylene | pentylcyclopentadienyl |
| ditridecylsilylene | dipentylcyclopentadienyl |
| ditetradecylsilylene | hexylcyclopentadienyl |
| dipentadecylsilylene | dihexylcyclopentadienyl |
| dihexadecylsilylene | heptylcyclopentadienyl |
| diheptadecylsilylene | diheptylcyclopentadienyl |
| dioctadecylsilylene | octylcyclopentadienyl |
| dinonadecylsilylene | dioctylcyclopentadienyl |
| dieicosylsilylene | nonylcyclopentadienyl |
| diheneicosylsilylene | dinonylcyclopentadienyl |
| didocosylsilylene | decylcyclopentadienyl |
| ditricosylsilylene | didecylcyclopentadienyl |
| ditetracosylsilylene | undecylcyclopentadienyl |
| dipentacosylsilylene | dodecylcyclopentadienyl |
| dihexacosylsilylene | tridecylcyclopentadienyl |
| diheptacosylsilylene | tetradecylcyclopentadienyl |
| dioctacosylsilylene | pentadecylcyclopentadienyl |
| dinonacosylsilylene | hexadecylcyclopentadienyl |
| ditriacontylsilylene | heptadecylcyclopentadienyl |
| dicyclohexylsilylene | octadecylcyclopentadienyl |
| dicyclopentylsilylene | nonadecylcyclopentadienyl |
| dicycloheptylsilylene | eicosylcyclopentadienyl |
| dicyclooctylsilylene | heneicosylcyclopentadienyl |
| dicyclodecylsilylene | docosylcyclopentadienyl |
| dicyclododecylsilylene | tricosylcyclopentadienyl |
| dinapthylsilylene | tetracosylcyclopentadienyl |
| diphenylsilylene | pentacosylcyclopentadienyl |
| ditolylsilylene | hexacosylcyclopentadienyl |
| dibenzylsilylene | heptacosylcyclopentadienyl |
| diphenethylsilylene | octacosylcyclopentadienyl |
| di(butylphenethyl)silylene | nonacosylcyclopentadienyl |
| methylethylsilylene | triacontylcyclopentadienyl |
| methylpropylsilylene | cyclohexylcyclopentadienyl |
| methylbutylsilylene | phenylcyclopentadienyl |
| methylhexylsilylene | diphenylcyclopentadienyl |
| methylphenylsilylene | triphenylcyclopentadienyl |
| ethylphenylsilylene | tetraphenylcyclopentadienyl |
| ethylpropylsilylene | tolylcyclopentadienyl |
| ethylbutylsilylene | benzylcyclopentadienyl |
| propylphenylsilylene | phenethylcyclopentadienyl |
| dimethylgermylene | cyclohexylmethylcyclopentadienyl |
| diethylgermylene | napthylcyclopentadienyl |
| diphenylgermylene | methylphenylcyclopentadienyl |
| methylphenylgermylene | methyltolylcyclopentadienyl |
| cyclotetramethylenesilylene | methylethylcyclopentadienyl |
| cyclopentamethylenesilylene | methylpropylcyclopentadienyl |
| cyclotrimethylenesilylene | methylbutylcyclopentadienyl |
| cyclohexylazanediyl | methylpentylcyclopentadienyl |
| butylazanediyl | methylhexylcyclopentadienyl |
| methylazanediyl | methylheptylcyclpentadienyl |
| phenylazanediyl | methyloctylcyclopentadienyl |
| perfluorophenylazanediyl | methylnonylcyclopentadienyl |
| methylphosphanediyl | methyldecylcyclopentadienyl |
| ethylphosphanediyl | vinylcyclopentadienyl |
| propylphosphanediyl | propenylcyclopentadienyl |
| butylphosphanediyl | butenylcyclopentadienyl |
| cyclohexylphosphanediyl | Tetrahydroindenyl |
| phenylphosphanediyl | indenyl |
| methylboranediyl | methylindenyl |
| phenylboranediyl | dimethylindenyl |
| methylene | trimethylindenyl |
| dimethylmethylene | tetramethylindenyl |
| diethylmethylene | pentamethylindenyl |
| dibutylmethylene | methylpropylindenyl |
| dipropylmethylene | dimethylpropylindenyl |
| diphenylmethylene | methyldipropylindenyl |
| ditolylmethylene | methylethylindenyl |
| di(butylphenyl)methylene | methylbutylindenyl |

TABLE B-continued

| | |
|---|---|
| di(trimethylsilylphenyl)methylene | ethylindenyl |
| di(triethylsilylphenyl)methylene | propylindenyl |
| dibenzylmethylene | butylindenyl |
| cyclotetramethylenemethylene | pentylindenyl |
| cyclopentamethylenemethylene | hexylindenyl |
| ethylene | heptylindenyl |
| methylethylene | octylindenyl |
| dimethylethylene | nonylindenyl |
| trimethylethylene | decylindenyl |
| tetramethylethylene | phenylindenyl |
| cyclopentylene | (fluorophenyl)indenyl |
| cyclohexylene | (methylphenyl)indenyl |
| cycloheptylene | biphenylindenyl |
| cyclooctylene | (bis(trifluoromethyl)phenyl)indenyl |
| propanediyl | napthylindenyl |
| methylpropanediyl | phenanthrylindenyl |
| dimethylpropanediyl | benzylindenyl |
| trimethylpropanediyl | benzindenyl |
| tetramethylpropanediyl | cyclohexylindenyl |
| pentamethylpropanediyl | methylphenylindenyl |
| hexamethylpropanediyl | ethylphenylindenyl |
| tetramethyldisiloxylene | propylphenylindenyl |
| vinylene | methylnapthylindenyl |
| ethene-1,1-diyl | ethylnapthylindenyl |
| divinylsilylene | Propylnapthylindenyl |
| dipropenylsilylene | (methylphenyl)indenyl |
| dibutenylsilylene | (dimethylphenyl)indenyl |
| methylvinylsilylene | (ethylphenyl)indenyl |
| methylpropenylsilylene | (diethylphenyl)indenyl |
| methylbutenylsilylene | (propylphenyl)indenyl |
| dimethylsilylmethylene | (dipropylphenyl)indenyl |
| diphenylsilylmethylene | methyltetrahydroindenyl |
| dimethylsilylethylene | ethyltetrahydroindenyl |
| diphenylsilylethylene | propyltetrahydroindenyl |
| dimethylsilylpropylene | butyltetrahydroindenyl |
| diphenylsilylpropylene | phenyltetrahydroindenyl |
| dimethylstannylene | (diphenylmethyl)cyclopentadienyl |
| diphenylstannylene | dimethyltetrahydroindenyl |
| | trimethylsilylcyclopentadienyl |
| | triethylsilylcyclopentadienyl |
| $X_1$ or $X_2$ | trimethylgermylcyclopentadienyl |
| chloride | trifluromethylcyclopentadienyl |
| bromide | cyclopenta[b]thienyl |
| iodide | cyclopenta[b]furanyl |
| fluoride | cyclopenta[b]selenophenyl |
| hydride | cyclopenta[b]tellurophenyl |
| methyl | cyclopenta[b]pyrrolyl |
| ethyl | cyclopenta[b]phospholyl |
| propyl | cyclopenta[b]arsolyl |
| butyl | cyclopenta[b]stibolyl |
| pentyl | methylcyclopenta[b]thienyl |
| hexyl | methylcyclopenta[b]furanyl |
| heptyl | methylcyclopenta[b]selenophenyl |
| octyl | methylcyclopenta[b]tellurophenyl |
| nonyl | methylcyclopenta[b]pyrrolyl |
| decyl | methylcyclopenta[b]phosphoryl |
| undecyl | methylcyclopenta[b]arsolyl |
| dodecyl | methylcyclopenta[b]stibolyl |
| tridecyl | dimethylcyclopenta[b]thienyl |
| tetradecyl | dimethylcyclopenta[b]furanyl |
| pentadecyl | dimethylcyclopenta[b]pyrrolyl |
| hexadecyl | dimethylcyclopenta[b]phosphoryl |
| heptadecyl | trimethylcyclopenta[b]thienyl |
| octadecyl | trimethylcyclopenta[b]furanyl |
| nonadecyl | trimethylcyclopenta[b]pyrrolyl |
| eicosyl | trimethylcyclopenta[b]phosphoryl |
| heneicosyl | ethylcyclopenta[b]thienyl |
| docosyl | ethylcyclopenta[b]furanyl |
| tricosyl | ethylcyclopenta[b]pyrrolyl |
| tetracosyl | ethylcyclopenta[b]phosphoryl |
| pentacosyl | diethylcyclopenta[b]thienyl |
| hexacosyl | diethylcyclopenta[b]furanyl |
| heptacosyl | diethylcyclopenta[b]pyrrolyl |
| octacosyl | diethylcyclopenta[b]phosphoryl |
| nonacosyl | triethylcyclopenta[b]thienyl |
| triacontyl | triethylcyclopenta[b]furanyl |
| phenyl | triethylcyclopenta[b]pyrrolyl |
| benzyl | triethylcyclopenta[b]phosphoryl |
| phenethyl | propylcyclopenta[b]thienyl |
| tolyl | propylcyclopenta[b]furanyl |

TABLE B-continued

| | |
|---|---|
| methoxy | propylcyclopenta[b]pyrrolyl |
| ethoxy | propylcyclopenta[b]phosphoryl |
| propoxy | dipropylcyclopenta[b]thienyl |
| butoxy | dipropylcyclopenta[b]furanyl |
| dimethylamido | dipropylcyclopenta[b]pyrrolyl |
| diethylamido | dipropylcyclopenta[b]phosphory |
| methylethylamido | tripropylcyclopenta[b]thienyl |
| phenoxy | tripropylcyclopenta[b]furanyl |
| benzoxy | tripropylcyclopenta[b]pyrrolyl |
| allyl | tripropylcyclopenta[b]phosphoryl |
| | butylcyclopenta[b]thienyl |
| | butylcyclopenta[b]furanyl |
| $X_1$ and $X_2$ together | butylcyclopenta[b]pyrrolyl |
| methylidene | butylcyclopenta[b]phosphoryl |
| ethylidene | dibutylcyclopenta[b]thienyl |
| propylidene | dibutylcyclopenta[b]furanyl |
| tetramethylene | dibutylcyclopenta[b]pyrrolyl |
| pentamethylene | dibutylcyclopenta[b]phosphoryl-phospholyl |
| hexamethylene | tributylcyclopenta[b]thienyl |
| ethylenedihydroxy | tributylcyclopenta[b]furanyl |
| butadiene | tributylcyclopenta[b]pyrrolyl |
| methylbutadiene | tributylcyclopenta[b]phospholyl phospholyl |
| dimethylbutadiene | ethylmethylcyclopenta[b]thienyl |
| pentadiene | ethylmethylcyclopenta[b]furanyl |
| methylpentadiene | ethylmethylcyclopenta[b]pyrrolyl |
| dimethylpentadiene | ethylmethylcyclopenta[b]phosphoryl |
| hexadiene | methylpropylcyclopenta[b]thienyl |
| methylhexadiene | methylpropylcyclopenta[b]furanyl |
| dimethylhexadiene | methylpropylcyclopenta[b]pyrrolyl |
| | methylpropylcyclopenta[b]phosphoryl |
| | butylmethylcyclopenta[b]thienyl |
| M | butylmethylcyclopenta[b]furanyl |
| titanium | butylmethylcyclopenta[b]pyrrolyl |
| zirconium | butylmethylcyclopenta[b]phosphoryl |
| hafnium | cyclopenta[c]thienyl |
| | cyclopenta[c]furanyl |
| | cyclopenta[c]selenophenyl |
| | cyclopenta[c]tellurophenyl |
| | cyclopenta[c]pyrrolyl |
| | cyclopenta[c]phosphoryl |
| | cyclopenta[c]arsolyl |
| | cyclopenta[c]stibolyl |
| | methylcyclopenta[c]thienyl |
| | methylcyclopenta[c]furanyl |
| | methylcyclopenta[c]selenophenyl |
| | methylcyclopenta[c]tellurophenyl |
| | methylcyclopenta[c]pyrrolyl |
| | methylcyclopenta[c]phosphoryl |
| | methylcyclopenta[c]arsolyl |
| | methylcyclopenta[c]stibolyl |
| | dimethylcyclopenta[c]thienyl |
| | dimethylcyclopenta[c]furanyl |
| | dimethylcyclopenta[c]pyrrolyl |
| | dimethylcyclopenta[c]phosphoryl |
| | trimethylcyclopenta[c]thienyl |
| | trimethylcyclopenta[c]furanyl |
| | trimethylcyclopenta[c]pyrrolyl |
| | trimethylcyclopenta[c]phosphoryl |
| | ethylcyclopenta[c]thienyl |
| | ethylcyclopenta[c]furanyl |
| | ethylcyclopenta[c]pyrrolyl |
| | ethylcyclopenta[c]phosphoryl |
| | diethylcyclopenta[c]thienyl |
| | diethylcyclopenta[c]furanyl |
| | diethylcyclopenta[c]pyrrolyl |
| | diethylcyclopenta[c]phosphoryl |
| | triethylcyclopenta[c]thienyl |
| | triethylcyclopenta[c]furanyl |
| | triethylcyclopenta[c]pyrrolyl |
| | triethylcyclopenta[c]phosphoryl |
| | propylcyclopenta[c]thienyl |
| | propylcyclopenta[c]furanyl |
| | propylcyclopenta[c]pyrrolyl |
| | propylcyclopenta[c]phosphoryl |
| | dipropylcyclopenta[c]thienyl |
| | dipropylcyclopenta[c]furanyl |
| | dipropylcyclopenta[c]pyrrolyl |
| | dipropylcyclopenta[c]phosphoryl |

TABLE B-continued tripropylcyclopenta[c]thienyl
tripropylcyclopenta[c]furanyl
tripropylcyclopenta[c]pyrrolyl
tripropylcyclopenta[c]phosphoryl-phosphorylphospholyl
butylcyclopenta[c]thienyl
butylcyclopenta[c]furanyl
butylcyclopenta[c]pyrrolyl
butylcyclopenta[c]phosphoryl
dibutylcyclopenta[c]thienyl
dibutylcyclopenta[c]furanyl
dibutylcyclopenta[c]pyrrolyl
dibutylcyclopenta[c]phosphoryl
tributylcyclopenta[c]thienyl
tributylcyclopenta[c]furanyl
tributylcyclopenta[c]pyrrolyl
tributylcyclopenta[c]phosphoryl
ethylmethylcyclopenta[c]thienyl
ethylmethylcyclopenta[c]furanyl
ethylmethylcyclopenta[c]pyrrolyl
ethylmethylcyclopenta[c]phosphoryl
methylpropylcyclopenta[c]thienyl
methylpropylcyclopenta[c]furanyl
methylpropylcyclopenta[c]pyrrolyl
methylpropylcyclopenta[c]phosphoryl
butylmethylcyclopenta[c]thienyl
butylmethylcyclopenta[c]furanyl
butylmethylcyclopenta[c]pyrrolyl
butylmethylcyclopenta[c]phosphoryl In a preferred embodiment of the invention, Cp is the same as Cp* and is a substituted or unsubstituted cyclopentadienyl, indenyl or tetrahydroindenyl ligand or fluorenyl. In another preferred embodiment of the invention, Cp is different from Cp* and is a substituted or unsubstituted cyclopentadienyl, indenyl or tetrahydroindenyl ligand or fluorenyl.

Preferred metallocene compounds (pre-catalysts) which, according to the present invention, provide catalyst systems, which are specific to the production of poly-α-olefins having high catalyst productivity and convert $C_3$ to $C_{30}$ alpha-olefins with comparable reactivities. These compounds can have any one of the symmetry groups classified as $C_2$, pseudo-$C_2$, $C_{2v}$, or $C_s$ symmetry, and include the racemic and meso versions of: bis(indenyl)zirconium dichloride, bis(indenyl)zirconium dimethyl, bis(methylindenyl)zirconium dichloride, bis(methylindenyl)zirconium dimethyl, bis (dimethylindenyl)zirconium dichloride, bis(dimethylindenyl)zirconium dimethyl, bis(alkyllindenyl)zirconium dichloride, bis(alkylindenyl)zirconium dimethyl, bis(dialkylindenyl)zirconium dichloride, bis(dialkylindenyl)zirconium dimethyl, dimethylsilylbis(indenyl) zirconium dichloride, dimethylsilylbis(indenyl) zirconium dimethyl, diphenylsilylbis(indenyl) zirconium dichloride, diphenylsilylbis(indenyl) zirconium dimethyl, methylphenylsilylbis(indenyl) zirconium dichloride, methylphenylsilylbis(indenyl) zirconium dimethyl, ethylenebis(indenyl) zirconium dichloride, ethylenebis(indenyl) zirconium dimethyl, methylenebis(indenyl) zirconium dichloride, methylenebis(indenyl) zirconium dimethyl, dimethylsilylbis(indenyl) hafnium dichloride, dimethylsilylbis(indenyl) hafnium dimethyl, diphenylsilylbis(indenyl) hafnium dichloride, diphenylsilylbis(indenyl) hafnium dimethyl, methylphenylsilylbis(indenyl) hafnium dichloride, methylphenylsilylbis(indenyl) hafnium dimethyl, ethylenebis(indenyl) hafnium dichloride, ethylenebis(indenyl) hafnium dimethyl, methylenebis(indenyl) hafnium dichloride, methylenebis(indenyl) hafnium dimethyl, dimethylsilylbis(tetrahydroindenyl) zirconium dichloride, dimethylsilylbis(tetrahydroindenyl) zirconium dimethyl, diphenylsilylbis(tetrahydroindenyl) zirconium dichloride, diphenylsilylbis(tetrahydroindenyl) zirconium dimethyl, methylphenylsilylbis(tetrahydroindenyl) zirconium dichloride, methylphenylsilylbis(tetrahydroindenyl) zirconium dimethyl, ethylenebis(tetrahydroindenyl) zirconium dichloride, ethylenebis(tetrahydroindenyl) zirconium dimethyl, methylenebis(tetrahydroindenyl) zirconium dichloride, methylenebis(tetrahydroindenyl) zirconium dimethyl, dimethylsilylbis(tetrahydroindenyl) hafnium dichloride, dimethylsilylbis(tetrahydroindenyl) hafnium dimethyl, diphenylsilylbis(tetrahydroindenyl) hafnium dichloride, diphenylsilylbis(tetrahydroindenyl) hafnium dimethyl, methylphenylsilylbis(tetrahydroindenyl) hafnium dichloride, methylphenylsilylbis(tetrahydroindenyl) hafnium dimethyl, ethylenebis(tetrahydroindenyl) hafnium dichloride, ethylenebis(tetrahydroindenyl) hafnium dimethyl, methylenebis(tetrahydroindenyl) hafnium dichloride, methylenebis (tetrahydroindenyl) hafnium dimethyl, dimethylsilylbis(4,7-dimethylindenyl) zirconium dichloride, dimethylsilylbis(4,7-dimethylindenyl) zirconium dimethyl, diphenylsilylbis(4,7-dimethylindenyl) zirconium dichloride, diphenylsilylbis(4,7-dimethylindenyl) zirconium dimethyl, methylphenylsilylbis(4,7-dimethylindenyl) zirconium dichloride, methylphenylsilylbis(4,7-dimethylindenyl) zirconium dimethyl, ethylenebis(4,7-dimethylindenyl) zirconium dichloride, ethylenebis(4,7-dimethylindenyl) zirconium dimethyl, methylenebis(4,7-dimethylindenyl) zirconium dichloride, methylenebis(4,7-dimethylindenyl) zirconium dimethyl, dimethylsilylbis(4,7-dimethylindenyl) hafnium dichloride, dimethylsilylbis(4,7-dimethylindenyl) hafnium dimethyl, diphenylsilylbis(4,7-dimethylindenyl) hafnium dichloride, diphenylsilylbis(4,7-dimethylindenyl) hafnium dimethyl, methylphenylsilylbis(4,7-dimethylindenyl) hafnium dichloride, methylphenylsilylbis(4,7-dimethylindenyl) hafnium dimethyl, ethylenebis(4,7-dimethylindenyl) hafnium dichloride, ethylenebis(4,7-dimethylindenyl) hafnium dimethyl, methylenebis(4,7-dimethylindenyl) hafnium dichloride, methylenebis(4,7-dimethylindenyl) hafnium dimethyl, dimethylsilylbis(2-methyl-4-napthylindenyl) zirconium dichloride, dimethylsilylbis(2-methyl-4-napthylindenyl) zirconium dimethyl, diphenylsilylbis(2-methyl-4-napthylindenyl) zirconium dichloride, dimethylsilylbis(2, 3-dimethylcyclopentadienyl) zirconium dichloride, dimethylsilylbis(2,3-dimethyl cyclopentadienyl) zirconium dimethyl, diphenylsilylbis(2,3-dimethylcyclopentadienyl) zirconium dichloride, diphenylsilylbis(2,3-dimethylcyclopentadienyl) zirconium dimethyl, methylphenylsilylbis(2,3-dimethylcyclopentadienyl) zirconium dichloride, methylphenylsilylbis(2,3-dimethylcyclopentadienyl) zirconium dimethyl, ethylenebis(2,3-dimethylcyclopentadienyl) zirconium dichloride, ethylenebis(2,3-dimethylcyclopentadienyl) zirconium dimethyl, methylenebis(2,3-dimethylcyclopentadienyl) zirconium dichloride, methylenebis(2,3-dimethylcyclopentadienyl) zirconium dimethyl, dimethylsilylbis(2,3-dimethylcyclopentadienyl) hafnium dichloride, dimethylsilylbis(2,3 dimethylcyclopentadienyl) hafnium dimethyl, diphenylsilylbis(2,3-dimethylcyclopentadienyl) hafnium dichloride, diphenylsilylbis(2,3-dimethylcyclopentadienyl) hafnium dimethyl, methylphenylsilylbis(2,3-dimethylcyclopentadienyl) hafnium dichloride, methylphenylsilylbis(2, 3-dimethylcyclopentadienyl) hafnium dimethyl, ethylenebis(2,3-dimethylcyclopentadienyl) hafnium dichloride, ethylenebis(2,3-dimethylcyclopentadienyl) hafnium dimethyl, methylenebis(2,3-dimethylcyclopentadienyl) hafnium dichloride, methylenebis(2, 3-dimethylcyclopentadienyl) hafnium dimethyl, dimethylsilylbis(3-trimethylsilylcyclopentadienyl) zirconium dichloride, dimethylsilylbis(3-trimethylsilylcyclopentadienyl) zirconium dimethyl, diphenylsilylbis(3-trimethylsilylcyclopentadienyl) zirconium dichloride, diphenylsilylbis(3-trimethylsilylcyclopentadienyl) zirconium dimethyl, methylphenylsilylbis(3-trimethylsilylcyclopentadienyl) zirconium dichloride, methylphenylsilylbis(3-trimethylsilylcyclopentadienyl) zirconium dimethyl, ethylenebis(3-trimethylsilylcyclopentadienyl) zirconium dichloride, ethylenebis(3-trimethylsilylcyclopentadienyl) zirconium dimethyl, methylenebis(3-trimethylsilylcyclopentadienyl) zirconium dichloride, methylenebis(3-trimethylsilylcyclopentadienyl) zirconium dimethyl, dimethylsilylbis(3-trimethylsilylcyclopentadienyl) hafnium dichloride, dimethylsilylbis(3-trimethylsilylcyclopentadienyl) hafnium dimethyl, diphenylsilylbis(3-trimethylsilylcyclopentadienyl) hafnium dichloride, diphenylsilylbis(3-trimethylsilylcyclopentadienyl) hafnium dimethyl, methylphenylsilylbis(3-trimethylsilylcyclopentadienyl) hafnium dichloride, methylphenylsilylbis(3-trimethylsilylcyclopentadienyl) hafnium dimethyl, ethylenebis(3-trimethylsilylcyclopentadienyl) hafnium dichloride, ethylenebis(3-trimethylsilylcyclopentadienyl) hafnium dimethyl, methylenebis(3-trimethylsilylcyclopentadienyl) hafnium dichloride, and methylenebis(3-trimethylsilylcyclopentadienyl) hafnium dimethyl. Another set of preferred metallocene catalysts include substituted unbridged bis($R_1,R_2,R_3,R_4,R_5$-cyclopentadienyl) zirconium dichlorides or dimethyls where the $R_1$ to $R_5$ groups can be same or different and can be independently chosen from H, $C_1$ to $C_{20}$ hydrocarbyl radicals. These metallocenes when activated with MAO or NCA cocatalysts and optionally with co-activators have high catalyst productivity and more importantly have comparable reactivity for all alpha-olefins with $C_3$ to $C_{30}$ range. Specific examples are bis(alkylcyclopentadienyl) zirconium dichlorides (alkyl=$C_1$ to $C_{20}$-alkyl group, specially, methyl, ethyl, n-propyl, n-butyl, n-pentyl, n-hexyl, etc. and iso-propyl, isobutyl, t-butyl groups, etc.), bis(1,2-dimethylcyclopentadienyl) zirconium dichloride, bis(1,3-dimethylcyclopentadienyl) zirconium dichloride, bis(1-methyl-3-n-propyl cyclopentadienyl) zirconium dichloride, bis(1-methyl-3-ethylcyclopentadienyl) zirconium dichloride, bis(1-methyl-3-n-propyl cyclopentadienyl) zirconium dichloride, bis(1-methyl-2-n-butyl cyclopentadienyl) zirconium dichloride, bis(1-methyl-2-n-propyl cyclopentadienyl) zirconium dichloride, bis(1-methyl-2-ethylcyclopentadienyl) zirconium dichloride, bis(1,2,3-trimethyl cyclopentadienyl) zirconium dichloride, bis(1,2,4-trimethylcyclopentadienyl) zirconium di chloride, bis(1,2-dimethyl-4-ethylcyclopentadienyl) zirconium dichloride, bis(1,2-dimethyl-4-n-propylcyclopentadienyl) zirconium dichloride, bis(1,2-dimethyl-4-n-butyl cyclopentadienyl) zirconium dichloride, bis(tetramethylcyclopentadienyl) zirconium dichloride, bis(pentamethylcyclopentadienyl) zirconium dichloride, etc.

Particularly preferred species are the racemic and meso versions of: dimethylsilylbis(indenyl) zirconium dichloride, dimethylsilylbis(indenyl) zirconium dimethyl, ethylenebis(indenyl) zirconium dichloride, ethylenebis(indenyl) zirconium dimethyl, dimethylsilylbis(tetrahydorindenyl) zirconium dichloride, dimethylsilylbis(tetrahydorindenyl) zirconium dimethyl, ethylenebis(tetrahydorindenyl) zirconium dichloride, ethylenebis(tetrahydorindenyl) zirconium dimethyl, dimethylsilylbis(4,7-dimethylindenyl) zirconium dichloride, dimethylsilylbis(4,7-dimethylindenyl) zirconium dimethyl, ethylenebis(4,7-dimethylindenyl) zirconium dichloride, ethylenebis(4,7-dimethylindenyl) zirconium dimethyl, dimethylsilylbis(indenyl) hafnium dichloride, dimethylsilylbis(indenyl) hafnium dimethyl, ethylenebis(indenyl) hafnium dichloride, ethylenebis(indenyl) hafnium dimethyl, dimethylsilylbis(tetrahydorindenyl) hafnium dichloride, dimethylsilylbis(tetrahydorindenyl) hafnium dimethyl, ethylenebis(tetrahydorindenyl) hafnium dichloride, ethylenebis(tetrahydorindenyl) hafnium dimethyl, dimethylsilylbis(4,7-dimethylindenyl) hafnium dichloride, dimethylsilylbis(4,7-dimethylindenyl) hafnium dimethyl, ethylenebis(4,7-dimethylindenyl) hafnium dichloride, and ethylenebis(4,7-dimethylindenyl) hafnium dimethyl. Other preferred catalysts include diphenylmethylidene(cyclopentadienyl)(9-fluorenyl)zirconium dichloride, iso-propylidene(cyclopentadienyl)(9-fluorenyl)zirconium dichloride, iso-propylidene(3-methylcyclopentadienyl)(9-fluorenyl) zirconium dichloride, ethylenebis(9-fluorenyl)zirconium dichloride, dimethylsilylbis(9-fluorenyl)zirconium dichloride, dimethyl silyl(cyclopentadienyl)(9-fluorenyl)zirconium dichloride, diphenyl silyl(cyclopentadienyl)(9-fluorenyl)zirconium dichloride, their analogs of dimethyls or the analogs of hafnium metallocenes.

The metallocene compounds, when activated by a per se commonly known activator such as methyl aluminoxane, form active catalysts for the polymerization or oligomerization of olefins. Activators that may be used include aluminoxanes such as methyl aluminoxane (or MAO, shown in Formula II, above), modified methyl aluminoxane, ethyl aluminoxane, iso-butyl aluminoxane and the like, Lewis acid activators including triphenyl boron, tris-perfluorophenyl boron, tris-perfluorophenyl aluminum and the like, ionic activators including dimethylanilinium tetrakis perfluorophenyl borate, triphenyl carbonium tetrakis perfluorophenyl borate, dimethylanilinium tetrakis perfluorophenyl aluminate, and the like, and non-coordinating anions such as shown in Formula III.

A co-activator is a compound capable of alkylating the transition metal complex, such that when used in combination with an activator, an active catalyst is formed. Co-activators include aluminoxanes such as methyl aluminoxane, modified aluminoxanes such as modified methyl aluminoxane, and aluminum alkyls such trimethyl aluminum, tri-isobutyl aluminum, triethyl aluminum, and tri-isopropyl aluminum, tri-n-hexyl aluminum, tri-n-octyl aluminum, tri-n-decyl aluminum or tri-n-dodecyl aluminum. Co-activators are typically used in combination with Lewis acid activators and ionic activators when the pre-catalyst is not a dihydrocarbyl or dihydride complex. Sometimes co-activators are also used as scavengers to deactivate impurities in feed or reactors.

The aluminoxane component useful as an activator typically is preferably an oligomeric aluminum compound represented by the general formula $(R^x—Al—O)_n$, which is a cyclic compound, or $R^x(R^x—Al—O)_nAlR^x_2$, which is a linear compound. The most common aluminoxane is a mixture of the cyclic and linear compounds. In the general aluminoxane formula, $R^x$ is independently a $C_1$-$C_{20}$ alkyl radical, for example, methyl, ethyl, propyl, butyl, pentyl, isomers thereof, and the like, and "n" is an integer from 1-50. Most preferably, $R^x$ is methyl and "n" is at least 4. Methyl aluminoxane and modified methyl aluminoxanes are most preferred. For further descriptions see, EP 0 279 586, EP 0 594 218, EP 0 561 476, WO94/10180 and U.S. Pat. Nos. 4,665,208, 4,874,734, 4,908,463, 4,924,018, 4,952,540, 4,968,827, 5,041,584, 5,091,352, 5,103,031, 5,157,137, 5,204,419, 5,206,199, 5,235,081, 5,248,801, 5,329,032, 5,391,793, and 5,416,229.

When an aluminoxane or modified aluminoxane is used, the catalyst-precursor-to-activator molar ratio (based on the metals, e.g., Zr or Hf to Al) is from about 1:3000 to 10:1; alternatively, 1:2000 to 10:1; alternatively 1:1000 to 10:1; alternatively, 1:500 to 1:1; alternatively 1:300 to 1:1; alternatively 1:250 to 1:1, alternatively 1:200 to 1:1; alternatively 1:100 to 1:1; alternatively 1:50 to 1:1; alternatively 1:10 to 1:1. When the activator is an aluminoxane (modified or unmodified), some embodiments select the maximum amount of activator at a 5000-fold molar excess over the catalyst precursor (per metal catalytic site). The preferred minimum activator-to-catalyst-precursor ratio is 1:1 molar ratio.

Ionic activators (which in embodiments may be used in combination with a co-activator) may be used in the practice of this invention. Ionic activators, sometimes referred to as non-coordinating anion (NCA) activators, usually refer to those activators that have distinctive ionic character in their active states, even though these activators are neutral chemical compounds. They are exemplified by Formula 2, above, which a preferred ionic activator; Preferably, discrete ionic activators such as $[Me_2PhNH][B(C_6F_5)_4]$, $[R_3NH][B(C_6F_5)_4]$, $[R_2NH_2][B(C_6F_5)_4]$, $[RNH_3][B(C_6F_5)_4]$, $[R_4N][B(C_6F_5)_4]$, $[Ph_3C][B(C_6F_5)_4]$, $[Me_2PhNH][B((C_6H_3-3,5-(CF_3)_2))_4]$, $[Ph_3C][B((C_6H_3-3,5-(CF_3)_2))^4]$, $[NH_4][B(C_6H_5)_4]$ or Lewis acidic activators such as $B(C_6F_5)_3$ or $B(C_6H_5)_3$ can be used, where Ph is phenyl and Me is methyl, R=$C_1$ to $C_{16}$ alkyl groups. Preferred co-activators, when used, are aluminoxanes such as methyl aluminoxane, modified aluminoxanes such as modified methyl aluminoxane, and aluminum alkyls such as tri-isobutyl aluminum, and trimethyl aluminum, triethyl aluminum, and tri-isopropyl aluminum, tri-n-hexyl aluminum, tri-n-octyl aluminum, tri-n-decyl aluminum or tri-n-dodecyl aluminum. The preferred ionic activators are N,N-dimethyl anilinium tetrakis(pentafluorophenyl)borate, tetra-methyl anilinium tetrakis(pentafluorophenyl)borate, tetradecylanilinium tetrakis(pentafluorophenyl)borate, tetrahexadecylanilinium tetrakis(pentafluorophenyl)borate, $[Ph_3C][B(C_6F_5)_4]$, $B(C_6F_5)_3$.

It is within the scope of this invention to use an ionizing or stoichiometric activator, neutral or ionic, such as tri(n-butyl) ammonium tetrakis(pentafluorophenyl) borate, a tris (perfluorophenyl) boron metalloid precursor or a tris(perfluoronaphthyl) boron metalloid precursor, polyhalogenated heteroborane anions (e.g., WO 98/43983), boric acid (e.g., U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono- or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is tris(perfluorophenyl) boron or tris(perfluoronaphthyl) boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos.

5,153,157, 5,198,401, 5,066,741, 5,206,197, 5,241,025, 5,384,299 and 5,502,124 and U.S. patent application Ser. No. 08/285,380, filed Aug. 3, 1994.

Ionic catalysts can be prepared by reacting a transition metal compound with an activator, such as $B(C_6F_6)_3$, which upon reaction with the hydrolyzable ligand (X') of the transition metal compound forms an anion, such as ([B$(C_6F_5)_3$(X')]$^-$), which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Brønsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic, diolefinic, and acetylenically unsaturated substrates or other neutral Lewis bases such as ethers, nitriles and the like. Two classes of compatible non-coordinating anions have been disclosed in EP-277,003 and EP 277,004 published 1988: 1) anionic coordination complexes comprising a plurality of lipophilic radicals covalently coordinated to, and shielding, a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

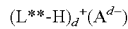

$$(L^{**}\text{-H})_d^+(A^{d-})$$

wherein L** is an neutral Lewis base;
H is hydrogen;
(L**-H)$^+$ is a Brønsted acid
A$^{d-}$ is a non-coordinating anion having the charge d–
d is an integer from 1 to 3.

The cation component, (L-H)$_d^+$ may include Brønsted acids such as protons or protonated Lewis bases or reducible Lewis acids capable of protonating or abstracting a moiety, such as an alkyl or aryl, from the precatalyst after alkylation. The activating cation (L-H)$_d^+$ may be a Brønsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers and tetrahydrothiophene, and mixtures thereof. The activating cation (L**-H)$_d^+$ may also be a moiety such as silver, tropylium, carbeniums, ferroceniums and mixtures, preferably carboniums and ferroceniums; most preferably triphenyl carbonium.

The anion component A$^{d-}$ include those having the formula [M$^{k+}$Q$_n$]$^{d-}$ wherein k is an integer from 1 to 3; n is an integer from 2-6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ also include diboron compounds as disclosed in U.S. Pat. No. 5,447,895, which is fully incorporated herein by reference.

Illustrative, but not limiting examples of boron compounds which may be used as an activating cocatalyst in combination with a co-activator in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2, 4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, and dialkyl ammonium salts such as: di-(iso-propyl)ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl) borate, tropylium tetraphenylborate, triphenylcarbenium tetraphenylborate, triphenylphosphonium tetraphenylborate, tri ethyl silylium tetraphenylborate, benzene(diazonium)tetraphenylborate, tropylium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene (diazonium) tetrakis(pentafluorophenyl)borate, tropylium tetrakis-(2,3, 4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, tri ethyl silylium tetrakis-(2,3,4, 6-tetrafluorophenyl)borate, benzene(diazonium) tetrakis-(2,3,4,6-tetrafluorophenyl)borate, tropylium tetrakis(perfluoronaphthyl)borate, triphenylcarbenium tetrakis(perfluoronaphthyl)borate, triphenylphosphonium tetrakis(perfluoronaphthyl)borate, tri ethyl silylium tetrakis(perfluoronaphthyl)borate, benzene(diazonium) tetrakis(perfluoronaphthyl)borate, tropylium tetrakis (perfluorobiphenyl)borate, triphenylcarbenium tetrakis(perfluorobiphenyl)borate, triphenylphosphonium tetrakis (perfluorobiphenyl)borate, tri ethyl silylium tetrakis (perfluorobiphenyl)borate, benzene(diazonium) tetrakis (perfluorobiphenyl)borate, tropylium tetrakis(3,5-bis(trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethyl silylium tetrakis(3,5-bis(trifluoromethyl) phenyl)borate, and benzene(diazonium) tetrakis(3,5-bis(trifluoromethyl)phenyl)borate.

Most preferably, the ionic stoichiometric activator (L**-H)$_d^+$(A$^{d-}$) is N,N-dimethylanilinium tetrakis(perfluorophenyl)borate, N,N-dimethylanilinium tetrakis(perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

The catalyst precursors can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst precursor.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Preferred non-coordinating anions useful in accordance with this invention are those that are compatible, stabilize the transition metal complex cation in the sense of balancing its ionic charge at +1, yet retain sufficient lability to permit displacement by an ethylenically or acetylenically unsaturated monomer during polymerization. These types of cocatalysts are sometimes used with scavengers. They have the general compositions of $R_1$, $R_2$, $R_3$—Al where $R_1$, $R_2$ and $R_3$ can be H or any of $C_1$ to $C_{20}$ hydrocarbyl radicals. Examples of the trialkylaluminum compounds include but are not limited to tri-iso-butyl aluminum, tri-n-octyl aluminum, tri-n-hexyl aluminum, triethylaluminum or trimethylaluminum, tri-n-decyl aluminum, tri-n-dodecyl aluminum.

Invention processes also can employ cocatalyst compounds or activator compounds that are initially neutral Lewis acids but form a cationic metal complex and a noncoordinating anion, or a zwitterionic complex upon reaction with the alkylated transition metal compounds. The alkylated metallocene compound is formed from the reaction of the catalyst pre-cursor and the co-activator. For example, tris(pentafluorophenyl) boron or aluminum act to abstract a hydrocarbyl ligand to yield an invention cationic transition metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Additional neutral Lewis acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, 1391-1434 (2000).

When the cations of noncoordinating anion precursors are Brønsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric NCA-type activator is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylaluminoxane, modified methylaluminoxane, mixtures of methylaluminoxane with dimethylanilinium tetrakis(pentafluorophenyl)borate or tris (pentafluorophenyl)boron, and mixtures of trialkyl aluminum, preferable any one of tri-isobutyl aluminum, triethyl aluminum, tri-n-alkyl aluminum or trimethyl aluminum or their combination, with dimethylanilinium tetrakis (pentafluorophenyl)borate or tris(pentafluorophenyl)boron or their analogs.

In some embodiments, scavenging compounds are used with stoichiometric activators. Typical aluminum or boron alkyl components useful as scavengers are represented by the general formula $R^xJZ_2$ where J is aluminum or boron, $R^x$ is as previously defined above, and each Z is independently $R^x$ or a different univalent anionic ligand such as halogen (Cl, Br, I), alkoxide (OR') and the like. $R^x$ is a H or any radical chosen from the $C_1$ to $C_{20}$ hydrocarbyl radicals. Most preferred aluminum alkyls include triethylaluminum, diethylaluminum chloride, tri-iso-butylaluminum, tri-n-octylaluminum. tri-n-hexylaluminum, trimethylaluminum and the like. Preferred boron alkyls include triethylboron. Scavenging compounds may also be aluminoxanes and modified aluminoxanes including methylaluminoxane and modified methylaluminoxane. The scavenger can be the same or different from the co-activator used for the catalyst system.

An active catalyst solution can be prepared by dissolving metallocene, activator including methylaluminoxane or NCA, co-activator and/or scavenger in proper pre-purified solvent individually. Then combine all the component solutions in any one of the following orders to give active catalyst solution. Method (a)—add metallocene solution to co-activator and/or scavenger solution, followed by addition of activator. Method (b)—combine metallocene solution with activator solution and add this mixture into co-activator and/or scavenger solution. Method (c)—add activator solution to co-activator and/or scavenger solution, followed by metallocene solution. Sometimes, co-activator and/or scavenger solution can be added in two separate stages in method (a) to (c).

Sometimes, preparation of stock solutions is not necessary. All components are mixed directly into proper pre-purified solvent. One method [method (d)] to prepare catalyst solution is to first add co-activator and/or scavenger to solvent, followed by addition of metallocene solution or solid, followed by activator solution or solid. Another method [method (e)] is to first add metallocene solution or solid to solvent, followed by co-activator and/or scavenger, followed by activator. Another method [method (f)] is to first add co-activator and/or scavenger solution or liquid to solvent, followed metallocene solution or solid, followed by activator solution or solid. Another method [method (g)] is to first add co-activator and/or scavenger solution or liquid to solvent, followed activator solution or solid, followed by metallocene solution or solid. All these methods produce active catalyst solutions. Usually, method (a) and method (d) are the most preferred methods. All solvents used in the catalyst preparation are pre-purified by passing through purifiers, which include molecular sieves and/or activated de-oxygenation catalysts. Sometimes, a small amount of co-activator and/or scavenger tri-alkylaluminum or aluminoxane is added to all the solvents to remove impurities.

In a preferred embodiment, the catalyst system includes a support. The solubility of invention catalyst precursors allows for the ready preparation of supported catalysts. To prepare uniform supported catalysts, the catalyst precursor preferably dissolves in the chosen solvent. The term "uniform supported catalyst" means that the catalyst precursor, the activator and or the activated catalyst approach uniform distribution upon the support's accessible surface area, including the interior pore surfaces of porous supports. Some embodiments of supported catalysts prefer uniform supported catalysts; other embodiments show no such preference.

Useful supported catalyst systems may be prepared by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously.

By one method, the activator, dissolved in an appropriate solvent such as toluene may be stirred with the support material for 1 minute to 10 hours. The total solution volume may be greater than the pore volume of the support, but some embodiments limit the total solution volume below that needed to form a gel or slurry (about 90% to 400%, preferably about 100-200% of the pore volume). The mixture is optionally heated from 30-200° C. during this time. The catalyst precursor may be added to this mixture as a solid, if a suitable solvent is employed in the previous step, or as a solution. Or alternatively, this mixture can be filtered, and the resulting solid mixed with a catalyst precursor solution. Similarly, the mixture may be vacuum-dried and mixed with a catalyst precursor solution. The resulting catalyst mixture is then stirred for 1 minute to 10 hours, and the supported catalyst is filtered from the solution and the solvent removed, either by vacuum-drying or evaporation alone.

Alternatively, the catalyst precursor and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The catalyst precursor may also be supported absent the activator; in that case, the activator (and co-activator if needed) is added to a slurry process's liquid phase. For example, a solution of catalyst precursor may be mixed with a support material for a period of about 1 minute to 10 hours. The resulting precatalyst mixture may be filtered from the solution and dried under vacuum, or evaporation alone removes the solvent. The total catalyst-precursor-solution volume may be greater than the support's pore volume, but some embodiments limit the total solution volume below that needed to form a gel or slurry (about 90% to 400%, preferably about 100-200% of the pore volume).

Additionally, two or more different catalyst precursors may be placed on the same support using any of the support methods disclosed above. Likewise, two or more activators or an activator and co-activator may be placed on the same support.

Suitable solid particle supports are typically comprised of polymeric or refractory oxide materials, each being preferably porous. Any support material that has an average particle size greater than −10 μm is suitable for use in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as an activator component. But additional activator may also be used. In some cases, a special family of solid support commonly known as MCM-41 can also be used. MCM-41 is a new class of unique crystalline support and can be prepared with tunable pore size and tunable acidity when modified with a second component. A detailed description of this class of material and their modification can be found in U.S. Pat. No. 5,264,203.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the invention, see for example the descriptions in WO 95/15815 and U.S. Pat. No. 5,427,991. The methods disclosed may be used with the catalyst compounds, activators or catalyst systems of this invention to adsorb or absorb them on the polymeric supports, particularly if made up of porous particles, or may be chemically bound through functional groups bound to or in the polymer chains.

Useful catalyst carriers may have a surface area of from 10-700 $m^2/g$, and or a pore volume of 0.1-4.0 cc/g and or an average particle size of 10-500 µm. Some embodiments select a surface area of 50-500 $m^2/g$, and or a pore volume of 0.5-3.5 cc/g, and or an average particle size of 20-200 µm. Other embodiments select a surface area of 100-400 $m^2/g$, and or a pore volume of 0.8-3.0 cc/g, and or an average particle size of 30-100 µm. Carriers of this invention typically have a pore size of 10-1000 angstroms, alternatively 50-500 angstroms, or 75-350 angstroms.

The metallocenes and or the metallocene/activator combinations are generally deposited on the support at a loading level of 10-100 micromoles of catalyst precursor per gram of solid support; alternately 20-80 micromoles of catalyst precursor per gram of solid support; or 40-60 micromoles of catalyst precursor per gram of support. But greater or lesser values may be used provided that the total amount of solid catalyst precursor does not exceed the support's pore volume.

The metallocenes and or the metallocene/activator combinations can be supported for bulk, or slurry polymerization, or a fixed bed reactor or otherwise as needed. Numerous support methods are known for catalysts in the olefin polymerization art, particularly aluminoxane-activated catalysts; all are suitable for use herein. See, for example, U.S. Pat. Nos. 5,057,475 and 5,227,440. An example of supported ionic catalysts appears in WO 94/03056. U.S. Pat. No. 5,643,847 and WO 96/04319A which describe a particularly effective method. Both polymers and inorganic oxides may serve as supports, see U.S. Pat. Nos. 5,422,325, 5,427,991, 5,498,582 and 5,466,649, and international publications WO 93/11172 and WO 94/07928.

In another preferred embodiment, the metallocene and or activator (with or without a support) are combined with an alkyl aluminum compound, preferably a trialkyl aluminum compound, prior to entering the reactor. Preferably the alkyl aluminum compound is represented by the formula: $R_3Al$, where each R is independently a $C_1$ to $C_{20}$ alkyl group, preferably the R groups are independently selected from the group consisting of methyl, ethyl, propyl, isopropyl, butyl, isobutyl, n-butyl, pentyl, isopentyl, n-pentyl, hexyl, isohexyl, n-hexyl, heptyl, octyl, isocotyl, n-octyl, nonyl, isononyl, n-nonyl, decyl, isodecyl, n-cecyl, undecyl, isoundecyl, n-undecyl, dodecyl, isododecyl, and n-dodecyl, preferably isobutyl, n-octyl, n-hexyl, and n-dodecyl. Preferably the alkyl aluminum compound is selected from tri-isobutyl aluminum, tri n-octyl aluminum, tri-n-hexyl aluminum, and tri-n-dodecyl aluminum.

Polymerization Process

Many polymerization/oligomerization processes and reactor types used for metallocene-catalyzed polymerization or oligomerization such as solution, slurry, or bulk polymerization or oligomerization processes can be used in this invention. In another embodiment, if a solid or supported catalyst is used, a slurry or continuous fixed bed or plug flow process is suitable. In a preferred embodiment, the monomers are contacted with the metallocene compound and the activator in the solution phase, bulk phase, or slurry phase, preferably in a continuous stirred tank reactor, continuous tubular reactor, a semi-continuous reactor, or a batch reactor. In a preferred embodiment, the temperature in any reactor used herein is from −10° C. to 250° C., preferably from 30° C. to 220° C., preferably from 50° C. to 180° C., preferably from 60° C. to 170° C. In a preferred embodiment, the pressure in any reactor used herein is from 0.1 to 100 atmospheres, preferably from 0.5 to 75 atmospheres, preferably from 1 to 50 atmospheres. In another embodiment, the monomers, metallocene and activator are contacted for a residence time of from 1 second to 100 hours, preferably 30 seconds to 50 hours, preferably 2 minutes to 6 hours, preferably 1 minute to 4 hours. In another embodiment solvent or diluent is present in the reactor and is preferably selected from the group consisting of butanes, pentanes, hexanes, heptanes, octanes, nonanes, decanes, undecanes, dodecanes, tridecanes, tetradecanes, pentadecanes, hexadecanes, benzene, toluene, o-xylenes, m-xylenes, p-xylenes, ethylbenzene, isopropylbenzene, and n-butylbenzene, preferably toluene and or xylenes and or ethylbenzene, Norpar™ or Isopar™ solvent. These solvents or diluents may be pre-treated in same manners as the feed olefins.

Typically in the processes of this invention, one or more transition metal compounds, one or more activators, and one or more feeds according to the present invention are contacted to produce polymer or oligomer. These catalysts may be supported and as such will be particularly useful in the known slurry, solution, or bulk operating modes conducted in single, series, or parallel reactors. If the catalyst or activator or co-activator is a soluble compound, the reaction can be carried out in a solution mode. Even if one of the components is not completely soluble in the reaction medium or in the feed solution, either at the beginning of the reaction or during or at the later stage of the reaction, a solution or slurry type operation is still applicable. In any case, the catalyst components in solvents, such as toluene or other conveniently available aromatic solvents, or in aliphatic solvent, or in the feed alpha-olefin stream are fed into the reactor under inert atmosphere (usually nitrogen or argon blanketed atmosphere) to allow the reaction to take place. In this process, the feed alpha-olefins can be charged individually or pre-mixed in a mixture, or one stream contains mixture of feed olefins and another stream contains one olefin feed, such as in the case when one of the feed olefins is gaseous or liquefied gas propylene or 1-butene or mixed butene stream. The reaction can be run in a batch mode where all the components are added into a reactor and allowed to react to a pre-designed degree of conversion, either partial conversion or full conversion. Then the catalyst is deactivated by any possible means, such as exposure to air, water, or by addition of alcohols or solvents containing deactivator agents. The reaction can also be carried out in a semi-continuous operation, where feeds and catalyst components are continuously and simultaneously added to the reactor so to maintain a constant ratio of catalyst system and feed olefins. When all feeds and catalyst components are added, the reaction is allowed to proceed to a pre-determined stage. Then the reaction is discontinued in the same manner as described in the batch operation. The reaction can also be carried out in a continuous operation, where feeds and catalyst are continuously and simultaneously added to the reactor so to maintain a constant ratio of catalyst system and feed olefins. The reaction product is continuously withdrawn from the reactor, as in a typical continuous stirred tank reactor (CSTR) operation. The residence times of the reactants are controlled by a pre-determined degree of conversion. The withdrawn product is then typically quenched in the separate reactor in a similar manner as other operation. In a preferred embodiment, any of the processes to prepare PAO's described herein are continuous processes. Preferably the continuous process comprises the steps of a) continuously introducing a feed stream comprising at least 10 mole % of the one or more $C_3$ to $C_{24}$ alpha-olefins into a reactor, b) continuously introducing the metallocene compound and the activator into the reactor, and c) continuously withdrawing the polyalpha-olefin from the reactor. In another embodiment, the continuous process comprises the step of maintaining a partial pressure of hydrogen in the reactor of 200 psi (1379 kPa) or less, based upon the total pressure of the reactor, preferably 150 psi (1034 kPa) or less, preferably 100 psi (690 kPa) or less, preferably 50 psi (345 kPa) or less, preferably 25 psi (173 kPa) or less, preferably 10 psi (69 kPa) or less.

One or more reactors in series or in parallel may be used in the present invention. The transition metal compound, activator and when required, co-activator, may be delivered as a solution or slurry in a solvent or in the alpha-olefin feed stream, either separately to the reactor, activated in-line just prior to the reactor, or preactivated and pumped as an activated solution or slurry to the reactor. Polymerizations/oligomerizations are carried out in either single reactor operation, in which monomer, or several monomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the precatalyst is activated in the reactor in the presence of olefin. In another embodiment, the precatalyst such as the dichloride form of the metallocenes is pre-treated with alkylalumum reagents, especially, triisobutylaluminum, tri-n-hexylaluminum or tri-n-octylaluminum, followed by charging into the reactor containing other catalyst component and the feed olefins, or followed by pre-activation with the other catalyst component to give the fully activated catalyst, which is then fed into the reactor containing feed olefins. In another alternative, the pre-catalyst metallocene is mixed with the activator and/or the co-activator and this activated catalyst is then charged into reactor, together with feed olefin stream containing some scavenger or co-activator. In another alternative, the whole or part of the co-activator is pre-mixed with the feed olefins and charged into the reactor at the same time as the other catalyst solution containing metallocene and activators and/or co-activator. The catalyst compositions can be used individually or can be mixed with other known polymerization catalysts to prepare polymer or oligomer blends. Monomer and catalyst selection allows polymer or oligomer blend preparation under conditions analogous to those using individual catalysts. Polymers having increased MWD are available from polymers made with mixed catalyst systems can thus be achieved.

Generally, when using metallocene catalysts, it is important to pre-treat the feed components to remove any impurities in olefins, solvents, or diluents or the inert gases (nitrogen or argon) used to blanket the reactor. The feed pre-treatment is usually conducted by passing the liquid or gaseous feed stream over at least one bed of activated molecular sieves, such as 13x, 5 A, 4 A, 3 A molecular sieve. Sometimes, two beds of the same or different molecular sieves are used. Sometimes, a special oxygenate removal catalyst bed is also employed. Such oxygenate removal catalysts include various reduced copper oxide catalyst or reduced copper chromite catalyst. After careful pre-treatment of feed olefins, solvents, diluents and after careful precaution to keep the catalyst component stream(s) and reactor free of any impurities, as would be recognized by one of ordinary skill in the art, the reaction should proceed well. In a preferred embodiment, particularly in the case where the metallocene catalyst is immobilized on a support, the complete catalyst system will additionally comprise one or more scavenging compounds. Here, the term scavenging compound means a compound that removes polar impurities from the reaction environment. These impurities adversely affect catalyst activity and stability. Typically, purifying steps are used before introducing reaction components to a reaction vessel. But such steps will rarely allow polymerization or oligomerization without using some scavenging compounds. Normally, the polymerization process will still use at least small amounts of scavenging compounds.

Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, tri-iso-butyl aluminum, diisobutylaluminum hydride, methyl aluminoxane, iso-butyl aluminoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When aluminoxane is used as the activator, any excess over that needed for activation will scavenge impurities and additional scavenging compounds may be unnecessary. Aluminoxanes also may be added in scavenging quantities with other activators, e.g., methylaluminoxane, $[Me_2HNPh]^+[B(pfp)_4]^-$ or $B(pfp)_3$, where pfp is perfluorophenyl ($C_6F_5$) Me is methyl and Ph is phenyl.

The process according to the invention may also be accomplished in a homogeneous solution processes. Generally this involves polymerization or oligomerization in a continuous reactor in which the polymer formed and the starting feed according to the invention and catalyst materials according to the invention are agitated to reduce or avoid concentration or temperature gradients. Temperature control in the reactor is generally obtained by balancing the heat of polymerization and with reactor cooling by reactor jackets or cooling coils or a cooled side-stream of reactant to cool the contents of the reactor, auto refrigeration, pre-chilled feeds, vaporization of liquid medium (diluent, monomers or solvent) or combinations of all the above methods. Adiabatic reactors with pre-chilled feeds may also be used. The reactor temperature depends on the catalyst used and the product desired. Higher temperatures tend to give lower molecular weights and lower temperatures tend to give higher molecular weights, however this is not a hard and fast rule. In general, the reactor temperature preferably can vary between about 0° C. and about 300° C., more preferably from about 10° C. to about 250° C., and most preferably from about 25° C. to about 230° C. Usually, it is important to control the reaction temperature as pre-determined. In order to produce fluids with narrow molecular distribution, such as to promote the highest possible shear stability, it is useful to control the reaction temperature to obtain minimum of temperature fluctuation in the reactor or over the course of the reaction time. If multiple reactors are used in series or in parallel, it is useful to keep the temperature constant in a pre-determined value to minimize any broadening of molecular weight distribution. In order to produce fluids with broad molecular weight distribution, one can adjust the reaction temperature swing or fluctuation, or as in series operation, the second reactor temperature is preferably higher than the first reactor temperature. In parallel reactor operation, the temperatures of the two reactors are independent. Or one can use two types of metallocene catalysts.

While reaction conditions may generally be determined by one of ordinary skill in the art in possession of the present disclosure, typical conditions will now be discussed.

The pressure in any reactor used herein can vary typically from about 0.1 atmosphere to 100 atmosphere (1.5 psi to 1500 psi), preferably from 0.5 bar to 75 atm (8 psi-1125 psi), most preferably from 1.0 to 50 atm (15 psi to 750 psi). The reaction pressure is usually higher than atmospheric pressure when light olefins with high vapor pressures, such as propylene or butenes, are used as one of the feed olefins. The reaction can be carried out under the atmosphere of nitrogen or with some hydrogen. Sometimes a small amount of hydrogen is added to the reactor to improve the catalyst productivity. The amount of hydrogen is preferred to keep at such a level to improve catalyst productivity, but not induce any hydrogenation of olefins, especially the feed alpha-olefins because the conversion of alpha-olefins into saturated paraffins is very detrimental to the efficiency of the process. The amount of hydrogen partial pressure is preferred to be kept low, less than −100 psi, preferably less than −50 psi, preferably less than −25 psi, preferably less than −10 psi, preferably less than −5 psi, preferably less than −1 psi. In a particularly preferred embodiment in any of the process described herein the concentration of hydrogen in the reactant phase is less than −100 ppm, preferably less than −50 ppm, preferably less than −10 ppm, preferably less than −1 ppm. In a particularly preferred embodiment in any of the process described herein the concentration of hydrogen in the reactor is kept at a partial pressure of 200 psi (1379 kPa) or less, based upon the total pressure of the reactor, preferably 150 psi (1034 kPa) or less, preferably 100 psi (690 kPa) or less, preferably 50 psi (345 kPa) or less, preferably 10 psi (69 kPa) or less.

The reaction time or reactor residence time is usually dependent on the type of catalyst used, the amount of catalyst system used, and the desired conversion level. Different metallocenes have different activity. Usually, higher degree of alkyl substitution on the cyclopentadienyl ring, or bridging improves catalyst productivity. Catalysts such as 1,2,3,4-tetramethylcyclopentadienylzirconium dichloride or 1,2,4-tri methylcyclopentadienylzirconium dichloride, or pentamethylcyclopentadienyl zirconium dichloride or their dialkyl analogs have desirable high productivity and stability than unsubstituted metallocenes. Certain bridged and bridged with substitution catalysts, such as the di-halides or dialkyls of dimethylsilylbis[cyclopentadienyl]zirconium, dimethylsilylbis[indenyl]zirconium or dimethylsilylbis[tetrahydro-indenyl]zirconium, dimethylsilylbis[1-methylindenyl]zirconium, ethylidenebis[indenyl] zirconium, ethylidenebis[tetrahydroindenyl]zirconium, ethylidenebis[1-methylindenyl]zirconium, or their hafnium analogs, etc. Usually the amount of catalyst components used is determinative. A high catalyst loading tends to gives high conversion at short reaction time. However, high catalyst usage makes the production process uneconomical and difficult to manage the reaction heat or to control the reaction temperature. Therefore, it is useful to choose a catalyst with maximum catalyst productivity to minimize the amount of metallocene and the amount of activators needed. When the catalyst system is metallocene plus methylaluminoxane, the range of methylaluminoxane used is typically in the range of 0.01 milligram (mg) to 500 mg/g of alpha-olefin feed. A more preferred range is from 0.02 mg to 10 mg/g of alpha-olefin feed. Furthermore, the molar ratios of the aluminum to metallocene (Al/M molar ration) range from 2 to 4000, preferably 10 to 2000, more preferably 50 to 1000, and most preferably 100 to 500. When the catalyst system is metallocene plus a Lewis acid or an ionic promoter with NCA component, the metallocene use is typically in the range of 0.01 microgram to 500 micrograms of metallocene component/gram of alpha-olefin feed. Usually the preferred range is from 0.1 microgram to 100 microgram of metallocene component per gram of alpha-olefin feed. Furthermore, the molar ratio of the NCA activator to metallocene is in the range from 0.1 to 10, preferably 0.5 to 5, more preferably 0.5 to 3. If a co-activator of alkylaluminum compound is used, the molar ratio of the Al to metallocene is in the range from 1 to 1000, preferably 2 to 500, more preferably 4 to 400, even more preferably 4 to 100, or most preferably 10 to 50.

Typically, the highest possible conversion (close to 100%) of feed alpha-olefin in the shortest possible reaction time is preferred. However, in CSTR operation, it is sometimes optimal to run the reaction at slightly less than 100% conversion. There are also occasions when partial conversion is more desirable, namely when the narrowest possible MWD of the product is desirable because partial conversion can avoid a MWD broadening effect. Typically, the conversions of the total feed olefins are in the range of 20% to 100%, more desirably in the range of 50% to 100%, and most desirably in the range of 80 to 99%. If the reaction is conducted to less than −100% conversion of the alpha-olefin, the unreacted starting material after separation from other product and solvents/diluents can be recycled to increase the total process efficiency. When the catalyst system is metallocene and MAO, the catalyst productivity is usually in the range of 20 to 50,000 gram total product per gram of MAO, preferably greater than −100 gram total product per gram of MAO, most preferably greater than −500 gram total product per gram of MAO. When the catalyst is metallocene and a Lewis acid or an ionic promoter with NCA component, the catalyst productivity is typically 1000 to 10,000,000 gram total product per gram of metallocene catalyst, preferably 10,000 gram, more preferably 50,000 gram of total product per gram of metallocene catalyst. The catalyst productivity is in the same range for grams of total product per grams of Lewis acid or ionic promoter with NCA component.

Desirable residence times for any process described herein may likewise be determined by one of ordinary skill in the art in possession of the present disclosure, and will typically range from 1 minute to 20 hours, or more typically 5 minutes to 10 hours.

Each of these processes may also be employed in single reactor, parallel or series reactor configurations. The liquid processes comprise contacting olefin monomers with the above described catalyst system, preferably in a suitable diluent, solvent, recycle, or mixture thereof, and allowing the reaction to occur for a sufficient time to produce the desired polymers or oligomers. Hydrocarbon solvents both aliphatic and aromatic are suitable. Aromatics such as benzene, toluene, xylenes, ethylbenzene, propylbenzene, cumene, t-butylbenzene are suitable. Alkanes, such as hexane, heptane, pentane, isopentane, and octane, Norpar™ fluids or Isopar fluids from ExxonMobil Chemical Company in Houston, Tex. are also suitable. Generally, toluene is most suitable to dissolve catalyst components. Norpar fluids or Isopar fluids or hexanes (or mixtures thereof) are preferred as reaction diluents. Oftentimes, a mixture of toluene and Norpar fluids or Isopar fluids is used as diluent or solvent.

The process can be carried out in a continuous stirred tank reactor, batch reactor, or plug flow reactor, or more than one reactor operated in series or parallel. These reactors may have or may not have internal cooling and the monomer feed may or may not be refrigerated. See, for instance, U.S. Pat. No. 5,705,577 for typical process conditions.

When a solid supported catalyst is used for the conversion, a slurry polymerization/oligomerization process generally operates in the similar temperature, pressure and residence time range as described previously. In a slurry polymerization or oligomerization, a suspension of solid catalyst, promoters, monomer and comonomers are added. The suspension including diluent is intermittently or continuously removed from the reactor. The catalyst is then separated from the product by filtration, centrifugation, or settlement. The fluid is then distilled to remove solvent, any unreacted components, and light product. A portion or all of the solvent and unreacted component or light components can be recycled for reuse.

If the catalyst used is un-supported, solution catalyst, when the reaction is complete as in the batch mode, or when the product is withdrawn from the reactor as in a CSTR, the product may still contain soluble or suspended catalyst components. These components are preferably deactivated and/or removed. Any of the usual catalyst deactivation methods or aqueous wash methods can be used to remove the catalyst component. Typically, the reaction is deactivated by addition of stoichiometric amount or excess of air, moisture, alcohol, isopropanol, etc. The mixture is then washed with dilute sodium hydroxide or with water to remove catalyst components. The residual organic layer is then subjected to distillation to remove solvent, which can be recycled for reuse. The distillation can further remove any light reaction product from $C_{18}$ and less. These light components can be used as diluent for further reaction. Or they can be used as olefinic raw material for other chemical synthesis, as these light olefin product have vinylidene unsaturation, most suitable for further functionalization to convert in high performance fluids. Or these light olefin products can be hydrogenated to be used as high quality paraffinic solvents.

Polymerization or oligomerization in absence of hydrogen is also advantageous to provide polymers or oligomers with high degree of unsaturated double bonds. These double bonds can be easily converted into functionalized fluids with multiple performance features. Examples for converting these polymers with molecular weight greater than ~300 can be found in the preparation of ashless dispersants, by reacting the polymers with maleic anhydride to give PAO-succinic anhydride which can then reacted with amines, alcohols, polyether alcohols to convert into dispersants. Examples for such conversion can be found in the book "Lubricant Additives: Chemistry and Application," ed. by Leslie R. Rudnick, p. 143-170.

In a typical process to produce high performance fluids from mixed LAO over metallocene catalyst system, the polymerization step usually produces some light ends with less than $C_{24}$ carbons. The amount of the light fraction usually depends on the reaction temperature, catalyst used, residence time, and the desired fluid viscosity or molecular weight. Usually, a lower viscosity process produces higher amount of light fraction and high viscosity (>10 cSt) process produces almost exclusively >$C_{24}$ fraction, with little or no light fractions. For example, the light fraction can range from 0.1 wt % to 30 wt % of total product for a 150 cSt fluid to 6 cSt fluid, respectively, from mixed LAO. It is usually more desirable to produce the least amount of light fraction. The amount of light fraction can be minimized by careful control of the process temperature, residence time, stable and homogeneous catalyst, etc.

Polymerization can also be carried out in the presence of hydrogen. The advantages of polymerization in the presence of $H_2$ are increased catalyst productivity and reduced degree of unsaturation, which under proper conditions can be so low that no further hydrogenation step is needed. When the reaction is carried out in the presence of hydrogen, hydrogen pressure is advantageously kept low to achieve highest productivity. High hydrogen pressure will have the disadvantage of hydrogenating the alpha-olefins into alkanes, thus reducing the total product yields. Typically, hydrogen partial pressure should be kept below 200 psi, preferably below 50 psi more preferably below 30 psi or most preferably below 20 psi. In a static, batch operation, the molar ratio of olefins to hydrogen is advantageously kept below 5, preferably below 10, more preferably below 20, or most preferably below 50. One of ordinary skill in the art in possession of the present disclosure can determine the appropriate hydrogen level without more than routine experimentation.

The polyalpha-olefins produced from the above polymerization process using a mixed alpha-olefins as feed contain unsaturated double bond, sometimes rich in vinylidene contents with some 1,2-disubstituted olefins. These unsaturated polymers are most suitable for further functionalization reaction. Examples of such functionalization are alkylation with aromatics compounds, such as benzene, toluene, xylene, naphthalene, phenol or alkylphenols. The polymer olefins can also react with maleic anhydride to give poly-alpha-olefin succinic anhydride, which can be further converted with amines or alcohols to corresponding succinimide or succinate esters. These imides and esters are superior dispersants. Because of the use of PAO as the hydrocarbon moiety, the finished dispersant will have much better viscometrics than the conventional dispersants made from polyisobutylene.

In an embodiment, the product of the process according to the invention, comprising polyalpha-olefins, is hydrogenated. In particular the polyalpha-olefin product is preferably treated to reduce heteroatom catalyst components to less than ~600 ppm, and then contacted with hydrogen and a hydrogenation catalyst to produce a polyalpha-olefin having a bromine number less than ~1.8. Usually, the bromine number is below 1.8. Lower bromine number is more desirable, as it indicates an improved thermal/oxidative stability. In a preferred embodiment, the treated polyalpha-olefin comprises 100 ppm of heteroatom catalyst components or less, preferably 10 ppm of heteroatom catalyst components or less. Preferably the hydrogenation catalyst is selected from the group consisting of supported Group 7, 8, 9, and 10 metals, preferably the hydrogenation catalyst selected from the group consisting of one or more of Ni, Pd, Pt, Co, Rh, Fe, Ru, Os, Cr, Mo, and W, supported on silica, alumina, clay, titania, zirconia, or mixed metal oxide supports. A preferred hydrogenation catalyst is nickel supported on kieselguhr, or platinum or palladium supported on alumina, or cobalt-molydenum supported on alumina. Usually, a high nickel content catalyst, such as 60% Ni on Keiselguhr catalyst is used, or a supported catalyst with high amount of Co—Mo loading.

In a preferred embodiment the polyalpha-olefin product is contacted with hydrogen and a hydrogenation catalyst at a temperature from 25 to 350° C., preferably 100 to 300° C. In another preferred embodiment the polyalpha-olefin is contacted with hydrogen and a hydrogenation catalyst for a time period from 5 minutes to 100 hours, preferably from 5 minutes to 24 hours. In another preferred embodiment the polyalpha-olefin is contacted with hydrogen and a hydrogenation catalyst at a hydrogen pressure of from 25 psi to 2500 psi, preferably from 100 to 2000 psi. In another preferred embodiment the hydrogenation process reduces the number of mm triad groups in a polyalpha-olefin by 1 to 80%. Hydrogenation of PAO's per se is well-known. See, for instance, U.S. Pat. No. 5,573,657 and "Lubricant Base Oil Hydrogen Refining Processes" (page 119 to 152) in Lubricant Base Oil and Wax Processing, by Avilino Sequeira, Jr., Marcel Dekker, Inc., NY, 1994.

The hydrogenation process can be accomplished in a slurry reactor in a batch operation or in a continuous stirred tank reactor (CSTR), where the catalyst concentration is 0.001 wt % to 20 wt % of the PAO (or HVI-PAO) product, or preferably 0.01 to 10 wt % of the product. Hydrogen and feed are added continuously to the reactor to allow for a certain residence time, usually 5 minutes to 10 hours, to allow complete hydrogenation of the unsaturated olefins and to allow proper conversion. The amount of catalyst added is usually in slight excess, to compensate for the catalyst deactivation. The catalyst and hydrogenated PAO and/or HVI-PAO are continuously withdrawn from the reactor. The product mixture was then filtered, centrifuged or settled to remove the solid hydrogenation catalyst. The catalyst can be regenerated and reused. The hydrogenated PAO can be used as is or further distilled or fractionated to the right component if necessary. In some cases, when the hydrogenation catalyst show no catalyst deactivation over long term operation, the stir tank hydrogenation process can be carried out in a manner where a fixed amount of catalyst is maintained in the reactor, usually 0.1 wt % to 10% of the total reactant, and only hydrogen and PAO feed are continuously added at certain feed rate and only hydrogenated PAO was withdrawn from the reactor.

The hydrogenation process can also be accomplished by a fixed bed process, in which the solid catalyst is packed inside a tubular reactor and heated to reactor temperature. Hydrogen and PAO and/or HVI-PAO feed can be fed through the reactor simultaneously from the top or bottom or countercurrently to maximize the contact between hydrogen, PAO/HVI-PAO and catalyst, and to allow best heat management. The feed rate of the PAO and hydrogen are adjusted to give proper residence to allow complete hydrogenation of the unsaturated olefins in the feed and to allow desirable conversion of mm triads in the process. The hydrogenated PAO fluid can be used as is or further distilled or fractionated to give the right component, if necessary.

Polymer Product Composition.

This invention provides a liquid polyalpha-olefin composition which in embodiments may be characterized as comprising at least two types of branches with average branch length of at least 2.1, ranging from 2.1 to 12, preferably 3 to 11, more preferably 4 to 10, more preferably 4.5 to 9.5, more preferably 5 to 9, more preferably 5.5 to 8.5, more preferably 6 to 8, and most preferably 7 to 8. The product is a liquid. For the purposes of this invention, a "liquid" is defined to be a fluid that has no distinct melting point above 0° C., preferably no distinct melting point above −20° C., and has a kinematic viscosity at 100° C. of 3000 cSt or less, preferably 1000 cSt or less and/or a kinematic viscosity at 40° C. of 35,000 cSt or less, preferably 10,000 cSt or less.

The polymers may be further characterized as having a random monomer distribution along the polymer backbone. This randomness can be characterized by either nuclear magnetic resonance spectroscopy (NMR) or mass spectrometry (MS) methods or by gas chromatagraphic (GC) analysis of light oligomer fractions.

In MS, the degree of randomness ($\chi$) is defined as the sum of Markovian P-matrix elements, $\chi=P_{A\bar{B}}+P_{BA}$, where A and B are comonomers or combination of comonomers (see reference Mass Spectrometry of Polymers, edited by G. Montaudo and R. P. Lattimer, CRC Press, Boca Raton, Fla., 2002, Chapter 2, p. 72 to 85). For an ideal random copolymer $\chi=1$. $\chi$ for this inventive polymer is usually between 0.7 to 1.4, preferably between 0.8 to 1.2, preferably between 0.9 and 1.1. The MS method is carried out as following. MS technique is based on a combination of field desorption mass spectrometry (FDMS) and Markovian statistics. In FDMS, samples are dissolved in methylene chloride with 0.1 to 10% (w/v) concentration. 1 to 5 µl of the solution is deposited on to the FD emitter. The emitter was inserted into the ion source of a mass spectrometer in $10^{-5}$ to $10^{-6}$ torr vacuum. A high electric voltage (10 to 13 kV) is applied between the emitter and a pair of extraction rod. A high field strength of $10^7$ to $10^8$ v/cm can be reached. One or more electrons were removed from the molecules via a quantum tunneling effect. Vibration excitation is minimal and thus intact molecular ions are formed, generating molecular ion mass spectra for the PAO oligomers. Markovian statistics were developed to calculate PAO oligomer distributions based on transition probability matrix (P-matrix). A theoretical mass spectrum was determined by summation of all oligomer distribution and was compared against the experimental mass spectrum in the molecular weight range between 10 to 10,000 g/mol, preferably between 100 to 5000 g/mol, preferably between 400 and 1000 g/mol. The P-matrix was adjusted in an iterative process to minimize the differences between the theoretical and experimental mass spectral data. The product composition and structure (degree of randomness) can then be calculated from the optimized P-matrix elements. Other parameters such as run length and feed reactivity ratio can also be deduced from the Markovian statistics. For product described in this invention, zero order Markovian (or Bernoullian random) distribution showed the best fit with experimental data with $\chi$ ranges from 0.93 to 1.05.

The NMR method to characterize the material is described below. Typically, proton NMR spectroscopy—because of its intrinsically limited spectral dispersion—provides decreasing utility for determining the composition of the polymers as the lengths of the comonomers increase. The greater resolution in the carbon spectra often provides multiple opportunities for determining the monomer composition. For example, in polymerizations of 1-butene with comonomers longer than or equal to $C_{10}$, we calculated the composition in two ways: the $1B_2$ (10.7 ppm) and $1B_{3+}$ (14.1 ppm) methyl resonances, and the backbone $S_{\alpha\alpha}$ methylenes between the branches. The methyl integral calculation is a direct measurement from the peak integrals, and may suffer from endgroup errors (e.g. initiating butenes would appear in the comonomer region). The $S_{\alpha\alpha}$ methylene region (41-39 ppm), while also susceptible to end group effects in low molecular weight materials, shows three $S_{\alpha\alpha}$ methylene peaks that were assigned to the $C_n$-$C_n$, $C_n$-$C_4$, and $C_4$-$C_4$ structures. The integrals of the three peaks were fit by least squares minimization to a Bernoullian model for monomer addition. The Bernoullian model defines the likelihood of finding a specific monomer at any position in the chain as proportional to the overall molar concentration of that monomer and independent of the identity of neighboring monomers. The excellent fit of the $S_{\alpha\alpha}$ methylene peak areas with Bernoullian distribution indicates very little deviation from random monomer addition. The adjustable parameter for the fits is the mole-percentage $C_4$, which can be converted to a weight-percentage. The fitting process is carried out by normalizing the sum of the $S_{\alpha\alpha}$ methylene integrals to 1.0. Least squares minimization seeks to minimize the square root of the sum of the squares (Diff) of the differences between the experimental dyad mole fractions (e.g. $[AA]_{exp}$) and the mole fractions predicted by the Bernoullian model (e.g. $[AA]_{Bern}$), where the two comonomers in the polymer are A and B. The formula for Diff is given below.

$$Diff = \sqrt{([AA]_{exp} - [AA]_{Bern})^2 + ([AB+BA]_{exp} - [AB+BA]_{Bern})^2 + ([BB]_{exp} - [BB]_{Bern})^2}$$

In cases where multiple LAOs are used, and signals from longer LAO's are not resolved, analysis can be performed with the non-resolved monomers lumped into an aggregate A and/or an aggregate B monomer, depending on where their resonances appear. The minimized Diff will then address the randomness of aggregate A versus aggregate B.

When the feed composition contains more than two alpha-olefins, the analytical method and mathematics to analyze the data become very complex for both the NMR method and the MS method. In this case, one may consider analyzing the polymer compositional randomness by lumping the feed olefins into two groups with averaged properties to simplify the compositional analysis. The conclusion should be within the scope of the two component analysis. Another method to deduce the randomness of the polymer composition is to analyze the rates of consumption of the starting alpha-olefins during polymerization. The relative ratio of the fastest reacting monomer should not be more than ~5 times faster than the slowest reacting monomer. A more preferred ratio is less than ~3, and the most preferred ratio is less than ~2. As a ratio of 1 usually indicates a random copolymer, another possible method for deducing the randomness of the polymer composition is to calculate the ratio of the amount of one alpha-olefin in the product to the same alpha-olefin in the feed. For the polymers in the present invention, this ratio is within 0.5 to 3, and preferably 0.8 to 2, with the ratio of 1 as a completely random polymer.

The gas chromatographic (GC) method can also be extended to analyzing the whole or partial polymer composition using an internal standard method. The gas chromatograph is a HP model equipped with a 60 meter DB1 capillary column. A 1 microliter sample was injected into the column at 70° C., held for 0 minutes, program-heated at 10° C. per minute to 300° C. and held for 15 minutes. The content of the dimer, trimer, tetramer of total carbon numbers less than ~50 can be analyzed quantitatively using the gc method. The distribution of the composition from dimer, trimer and tetramer and/or pentamer can be fit to a Bernoullian distribution and the randomness can be calculated from the difference between the GC analysis and best fit calculation.

In another embodiment, any of the polyalpha-olefins described herein have an $M_w$ (weight average molecular weight) of 100,000 or less, preferably between 200 and 80,000, more preferably between 250 and 60,000, more preferably between 280 and 50,000, and most preferably between 336 and 40,000 g/mol. (Preferred $M_w$'s include those from 224 to 55,100, preferably from 392 to 30,000, more preferably 800 to 24,000, and most preferably 2,000 to 37,5000 g/mol. Alternately preferred $M_w$'s include 224 to about 6790, and preferably 224 to about 2720).

In another embodiment, any of the alpha-olefins described herein preferably have a number average molecular weight ($M_n$) of 50,000 or less, more preferably between 200 and 40,000, more preferably between 250 and 30,000, or most preferably between 500 and 20,000 g/mol. More preferred $M_n$ ranges include 280 to 10,000, 280 to 4,000, 200 to 20,900, 280 to 10,000, 200 to 7000, 200 to 2000, 280 to 2900, 280 to 1700, and 200 to 500.

In another embodiment, any of the polyalpha-olefins described herein preferably have an $M_w/M_n$ or molecular weight dispersity (MWD) of greater than −1 and less than −5, preferably less than −4, more preferably less than −3, more preferably less than −2.5, and most preferably less than −2.

The $M_w$ and $M_n$ are measured by GPC method using polystyrene as calibration standard. The $M_n$ is correlated with the fluid viscosity according to a power equation $M_n = A \times (V)^B$, where V is kinematic viscosity measured at 100° C. according to the ASTM D 445 method, A and B are constants which vary slightly depending on the type of olefin feeds. For example, when a set PAO made from a mixed feed of 33 wt % $C_6$ and 67 wt % $C_{12}$ LAOs was analyzed by GPC, the relationship of $M_n$ versus 100° C. viscosity was as follows: $M_n = 344.96 \times (V)^{0.4921}$.

In a preferred embodiment of this invention, any PAO described herein may have a pour point of less than −10° C. (as measured by ASTM D 97). Pour point of any fluid is usually a function of fluid viscosity. Within a class of fluids, usually high viscosity fluids have high pour points, and low viscosity fluids have low pour points. The pour point of the PAOs of this invention have pour points of less than −10° C., preferably less than −0° C., more preferably less than −10° C., more preferably less than −20° C., more preferably less than −25° C., more preferably less than −30° C., more preferably less than −35° C., more preferably less than −50° C., and most preferably less than −70° C.

In a preferred embodiment of this invention, any PAO described herein may have a kinematic viscosity at 40° C. from about 4 to about 80,000 centi-Stokes (cSt) as measured by ASTM D 445 method, preferably from about 5 cSt to about 50,000 cSt at 40° C.

In another embodiment according to the present invention, any polyalpha-olefin described herein may have a kinematic viscosity at 100° C. from about 1.5 to about 5,000 centi-Stokes (cSt), preferably from about 2 cSt to about 3,000 cSt, more preferably from about 3 cSt to about 1,000 cSt, and yet more preferably from about 8 cSt to about 500 cSt. The PAOs have viscosities in the range of 2 to 500 cSt at 100° C. in one embodiment, and from 2 to 3000 cSt at 100° C. in another embodiment, and from 3.2 to 300 cS in another embodiment. (All viscosities are measured by ASTM D 445 method at 100° C., except when specified at other temperatures).

In another embodiment according to the present invention any polyalpha-olefin described herein may have a kinematic viscosity at 100° C. from 3 to 10 cSt and a flash point of 130° C. or more (as measured by the ASTM D 92 method).

The PAOs prepared herein, particularly those of low viscosity (such as those with a $KV_{100}$ of 10 cSt or less), are especially suitable as base stocks for high performance automotive engine oil formulation by themselves or by blending with other fluids, such as Group I, II, Group II+, Group III, Group III+ (Note: Group II+ and Group III+ are names often used in trade journals, and thus known to one of ordinary skill in the art; they usually denote base stocks that have properties better than Gr II or III, but can not fully meet the next level of specification; as used herein, each of the per se well know API classifications I through V will include their "+" basestock, if available, unless the "+" basestock is specifically recited; in the claims the "+" form is considered part of the API group denoted), or lube base stocks derived from hydroisomerization of wax fraction from Fischer-Tropsch hydrocarbon synthesis from $CO/H_2$ syn gas, or other Group IV or Group V base stocks. PAOs having $KV_{100}$'s from 3 cSt to 8 cSt are also preferred grades for high performance automotive engine oil or industrial oil formulations. The PAOs of 40 to 1000 cS made in this invention and especially some high $KV_{100}$ grades up to 5000 cSt are specially desirable for use as blend stock with Gr I, II, III, III+, IV, V, or GTL derived lube base stocks for use in industrial and automotive engine or gear oil. They are also suitable for use in personal care application, such as blends with soap, detergents, other emollients, for use in personal care cream, lotion, sticks, shampoo, detergents, etc. In another embodiment the PAOs have $KV_{100}$'s ranging from about 10 to about 3045 cSt. In another embodiment the PAOs have $KV_{100}$'s ranging from about 20 to about 1500 cSt.

In another embodiment according to the present invention any polyalpha-olefin described herein may have a viscosity index (VI) of from 80 to 400, alternatively from 100 to 380, alternatively from 100 to 300, alternatively from 140 to 380, alternatively from 180 to 306, alternatively from 252 to 306, alternatively the viscosity index is at least about 165, alternatively at least about 187, alternatively at least about 200, alternatively at least about 252. VI usually is a function of fluid viscosity. For many lower viscosity ($KV_{100}$ of 3 to 10 cSt) fluids made from 1-decene equivalent feeds, the preferred VI range is from 100 to 180. Other embodiments include ranges from 140 to 380, 120 to 380, and 100-400. Higher viscosity fluid usually have higher VI. Viscosity index is determined according to ASTM Method D 2270-93 [1998] and the VI is related to kinematic viscosities measured at 40° C. and 100° C. using ASTM Method D 445 method. All kinematic viscosity values reported for fluids herein are measured at 100° C. unless otherwise noted. Dynamic viscosity can then be obtained by multiplying the measured kinematic viscosity by the density of the liquid. The units for kinematic viscosity are $m^2/s$, commonly converted to cSt. or centistokes (1 cSt.=$10^{-6}$ $m^2/s$ or 1 cSt=1 $mm^2/sec$). Lube VI and pour point are dependent on lube viscosity. For the most valid comparison of VI and pour point, it is best to compare fluids with similar viscosities at the same temperature.

One embodiment according to the present invention is a new class of polyalpha-olefins having a unique chemical composition which is characterized by a high percentage of unique tail-to-tail connections at the end position of the polymer. The new poly-alpha-olefins after hydrogenation, when used by themselves or blended with another fluid, have unique lubrication properties. Or these new poly-alpha-olefins without hydrogenation can be further functionalized at the unsaturation position with other reagents, such as aromatics, maleic anhydride, etc. The term "tail-to-tail connection" refers to a connection formed in the PAO oligomer in which the linear alpha-olefins incorporated into an oligomer are connected to one another via the alpha carbon, i.e., the methylene vinyl carbon of a linear alpha-olefin. The polyalpha-olefins synthesized from the polymerization reaction contain unsaturation, which can be conveniently measured by bromine number (ASTM D 1159 or equivalent method) or NMR methods. Typically the bromine number will change as a function of the polymer molecular size or viscosity. The bromine number for the polymer will range from 70 to 0. When the bromine number is below 1 or 2, the product can be used as is, without further hydrogenation. In many cases, when there is a need to reduce to bromine number to below 2, or to below 0.3, or to tailor the tacticity of the polymer, the polymers are then further hydrogenated with a hydrogenation catalyst and a high pressure of hydrogen gas to reduce the unsaturation to give product with a bromine number less than −0.3

Another embodiment according to the present invention is a new class of hydrogenated polyalpha-olefins having a unique chemical composition which is characterized by a high percentage of unique tail-to-tail connection at the end position of the polymer and by a reduced degree of isotacticity compared to the product before hydrogenation.

The PAOs produced according to this invention are typically dimer, trimer, tetramer or higher oligomers of any two monomers from $C_3$ to $C_{30}$ linear alpha-olefins. Alternatively, an alpha-olefin with alkyl substituent at least 2 carbons away from the olefinic double bond, such as 4-methyl-1-pentene, can also be used or alpha-olefins containing aromatic substituents two carbons away from the olefins. Examples are 4-phenyl-1-butene or 6-phenyl-1-hexene, etc. Typically the PAOs produced herein are usually a mixture of many different oligomers. The smallest oligomers from these alpha-olefins have carbon numbers ranging from $C_6$ to $C_{20}$. These small oligomers are usually too light for most high performance fluids application. They are usually separated from the higher oligomers with carbon number of greater than $C_{20}$ (for example $C_{24}$ and higher are more preferred as high performance fluids). These separated $C_{10}$ to $C_{20}$ oligomer olefins or the corresponding paraffins after hydrogenation can be used in specialty applications, such as drilling fluids, solvents, paint thinner, etc., with excellent biodegradability, toxicity, viscosities, etc. The fraction of $C_{20}$ to $C_{60}$, or preferably $C_{24}$ to $C_{50}$, or more preferably $C_{28}$ to $C_{45}$, or most preferably $C_{30}$ to $C_{40}$ can be used as high performance fluids. Typically, they have superior performance attributes, making them beneficial for specific applications: such as lower viscosity for better fuel economy, better biodegradability, better low temperature flow properties, or lower volatility.

The higher viscosity products usually have much higher average degree of polymerization, and have very low amounts of $C_{24}$ and lower components. These high viscosity fluids are excellent blend stocks for lube application to improve the viscosity. Because of their usually narrow molecular weight distribution, they have superior shear stability. Because of their unique chemical composition, they have excellent viscometrics and unexpected low traction properties. These higher viscosity PAOs can be used as superior blend stocks. They can be blend stocks with any of the Group I, II, III, III+, GTL and Group V fluids, to give optimum viscometrics, solvency, high- and low-temperature lubricity, etc. When further blended with proper additives, including antioxidants, antiwear additives, friction modifiers, dispersants, detergents, corrosion inhibitors, defoamants, extreme pressure additives, seal swell additives, and optionally viscosity modifiers, etc., the finished formulated lubes can be used as automotive engine oils, gear oils, industrial oils, or grease. Description of typical additives and synthetic lubricants can be found in the book "Lubricant Additives" Chemistry and Applications, ed. L. R. Rudnick, Marcel Dekker, Inc., New York, 2003, and Synthetic Lubricants and High-Performance Functional Fluids, $2^{nd}$ ed. By L R. Rudnick and R. L. Shubkin, Marcel Dekker, Inc., New York, 1999.

EXPERIMENTAL

The following examples are meant to illustrate the present invention and provide a comparison with other methods and the products produced therefrom. Numerous modifications and variations are possible and it is to be understood that within the scope of the appended claims, the invention may be practiced otherwise than as specifically described herein.

The alpha-olefins used for all the experiments, either individually or pre-mixed, were purified by mixing 1 liter of un-treated raw material with 20 grams of activated 13× molecular sieve and 10 grams of de-oxygenation catalyst (a reduced copper catalyst) for at least two days inside a glove box. The molecular sieve and de-ox catalyst were then removed by filtration. This treated individual alpha-olefins were than combined to give the desirable composition. Similarly, this purification can be carried out by pumping a stream of the alpha-olefins, either alone or pre-mixed, through a bed of activated 13× molecular sieve alone, or through a bed of activated 13× molecular siever followed by a bed of de-oxygenated catalyst, prior to entering reactor. Sometimes for convenience, this purification can be carried out by pumping a stream of the alpha-olefins, either alone or pre-mixed, through a bed of activated 13× molecular sieve followed by a bed of activated alumina, prior to entering the reactor.

To test the flowability of the fluid after it is subjected to low temperature, a test was developed wherein a 10-30 ml liquid sample of polymer was soaked in crushed dry ice for at least two hours, followed by a slow warming to room temperature. Some materials may remain solid even after warming to room temperature, whereas others will become free-flowing liquids after warm-up to room temperature. This test is reproducible and provides a convenient method for comparing low-temperature behavior of the fluids.

Example 1

An olefin mixture containing 18.4% 1-hexene, 22.3% 1-octene, 21.6% 1-decene, 16.8% 1-dodecene, 10.4% 1-tetradecene, 6.4% 1-hexadecene and 4% 1-octadecene was used as feed. This composition is similar to the linear alpha-olefins produced from a typical LAO plant. 30 grams of this olefin mixture and 0.522 gram of a toluene solution containing 20 mg of triisobutylaluminum (TIBA)/g of toluene were charged into a reactor. A catalyst solution containing 11 grams toluene, 0.0133 grams TIBA stock solution, 0.30798 mg rac-dimethylsilylbis(tetrahydroindenyl) zirconium dichloride (A) and 0.5408 mg N,N-dimethylanilinium tetrakis(pentafluorophenyl)borate (B) was added to the reactor with stirring while maintaining a temperature of 30° C. After 19 hours reaction time, the reaction was terminated by addition of 3 ml isopropanol, followed by washing with 120 ml 5% sodium hydroxide solution in water. The isolated organic layer was distilled at 160° C./1 millitorr vacuum for two hours to remove light ends and to isolate the lube fraction. The total lube yield was 85%. The recovered lube properties are summarized in Table 1.

Example 2

Similar to Example 1, except a metallocene containing 70% meso- and 30% racemic-dimethylsilylbis(tetrahydroindenyl) zirconium dichloride (C) was used in the preparation.

Example 3

Similar to Example 1, except the reaction was carried out at 60° C.

Example 4

Similar to Example 2, except the reaction was carried out at 60° C.

Example 5

An olefin mixture containing 33.6 grams 1-octene, 42.0 grams 1-decene and 50.4 grams 1-dodecene was charged into a round bottom flask and heated to 70° C. under an $N_2$ atmosphere. A catalyst solution containing 2.34 grams 10 wt % MAO in toluene solution, 60 grams toluene and 3.7 mg of Catalyst A was added slowly to the olefin mixture while maintaining constant temperature. The reaction was continued for 4 hours. Gas chromatography showed that 94% of the starting olefins were converted. The reaction was quenched by addition of 3 ml isopropanol, followed by washing with 120 ml 5% sodium hydroxide solution in water. The isolated organic layer was distilled at 160° C./1 millitorr vacuum for two hours to remove any light ends. The lube properties are summarized in Table 1.

Example 6 is a Comparative Example

An identical reaction was carried out as Example 5, except a pure 1-decene was used as feed. The lube properties are summarized in Table 1. This fluid in the lab flowability test remained a solid after warming up to room temperature.

Examples 1-5 demonstrated that one can produce lube base stocks of wide viscosity ranges with superior VI and pour points from wide range of mixed alpha-olefins, ranging from $C_8$-$C_{12}$ to $C_6$-$C_{18}$. Compared with Example 6, the fluids made from mixed alpha-olefins as described in Example 1-5 had distinctly better flowability. These two examples demonstrated the advantages of using mixed alpha-olefins as feeds for this metallocene chemistry.

Example 7

An olefin mixture containing 7.1% 1-hexene, 9.5% 1-octene, 11.9% 1-decene, 14.3% 1-dodecene, 16.7% 1-tetradecene, 19.1% 1-hexadecene and 21.4% 1-octadecene was used as feed. 30 grams of this feed was charged into a reactor at 31° C. A catalyst solution containing 0.195 grams of 10 wt % MAO in toluene, 9.7 grams toluene, and 0.308 mg of catalyst A, was added to the reactor. After 3 days, the reaction was worked up in a manner similar to the previous example. The lube product properties are listed in Table 1.

Example 8

Similar to Example 1, except the feed composition was as described in Example 7.

Example 9

Similar to Example 7, except Catalyst C was used

Example 10

Similar to Example 1, except the feed composition was as described in Example 7, and the catalyst was Catalyst C.

Example 11

Similar to Example 7, except the reaction temperature was 60° C.

Example 12

Similar to Example 8, except the catalyst was catalyst C and the reaction temperature was 60° C.

Figure 2:
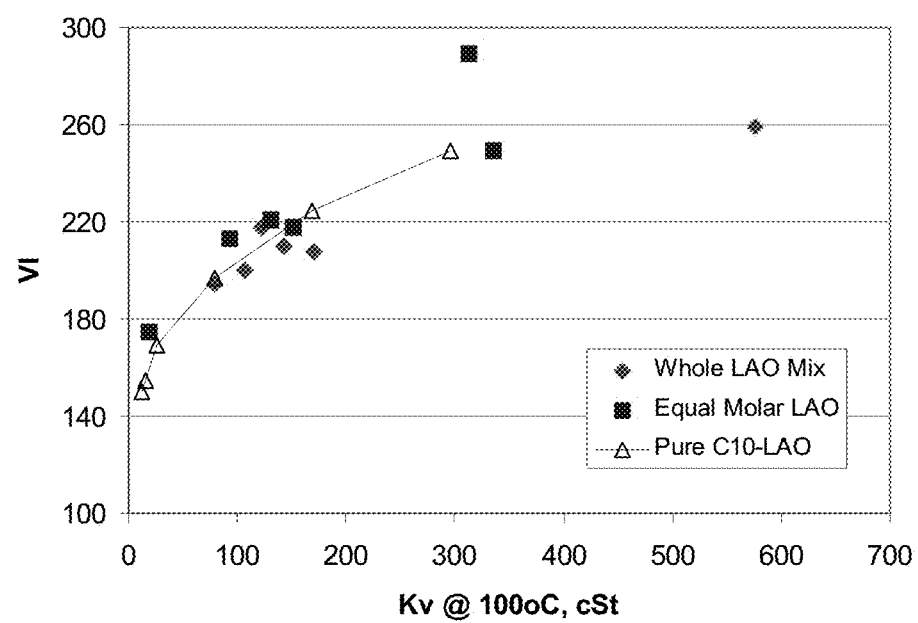
FIG. 2 illustrates the relationship of viscosity index (VI) versus kinematic viscosity for embodiments according to the present invention compared with a product produced using a pure $C_{10}$ feed.

FIGS. 1 and 2 compare the VI and pour points of the lubes made from mixed olefins with those made from 1-decene. This graph shows that the mixed-olefin lubes have VI and pour points similar to the 1-decene-derived lubes. The examples in Table 1 further demonstrate that these mixed-olefin-derived lube products demonstrated flowable behavior in the cooling/warming cycle test. These results are not expected from prior art. These fluids can be used as lubricant base stocks or as blend stocks with other lube base stocks to improve the properties of the latter.

In summary, the examples in this patent memo demonstrate that one can use a broad spectrum of LAOs as feeds to produce high quality lubricant base stocks using metallocene polymerization catalysts. This invention significantly broadens the options for feed sources for generating high quality synthetic fluids. Furthermore, these examples demonstrate that we can use the whole mixture of LAO from an ethylene growth process (Scheme 1). This process scheme may significantly improve the synthetic base stock process economics. These examples demonstrate that the lube products made from mixed LAO feeds have unexpected, superior, flow properties.

Scheme 1.

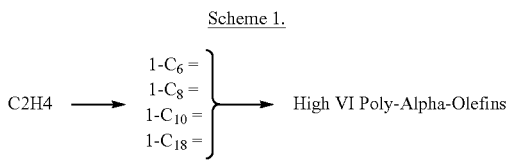

TABLE 1

| Lube Property Summary | | | | | | | | | | | | |
|---|---|---|---|---|---|---|---|---|---|---|---|---|
| | Example | | | | | | | | | | | |
| | 1 | 2 | 3 | 4 | 5 | 6 | 7 | 8 | 9 | 10 | 11 | 12 |
| Kv@100° C. (cSt) | 579.61 | 142.17 | 170.37 | 79.66 | 105.97 | 122.45 | 335.67 | 312.26 | 130.66 | 93.15 | 151.83 | 19.48 |
| Kv@40° C. (cSt) | 7266.0 | 1346.4 | 1777.9 | 672.6 | 961.7 | 1080.5 | 3435.8 | 2249.6 | 1087.6 | 723.8 | 1376.2 | 119.2 |
| VI | 259 | 210 | 208 | 195 | 200 | 218 | 249 | 289 | 221 | 213 | 218 | 175 |
| Pour Point, ° C. | −27 | −42 | −39 | −40 | −39 | −31 | −6 | −3 | −3 | −3 | 0 | −3 |
| Flow test | flow | flow | flow | flow | flow | No flow | flow | flow | flow | flow | flow | flow |

Example 13

Similar to Example 7, except 0.308 mg of a catalyst meso-ethylenebis(1-indenyl)zirconium dichloride (Catalyst D) was used and reaction was carried out at 30° C. The lube product properties were summarized in Table 2.

Example 14

Similar to Example 13, except the reaction was carried out at 60° C.

Example 15

Similar to Example 13, except 0.308 mg of a catalyst rac-ethylenebis(1-indenyl)zirconium dichloride (Catalyst E) was used.

Example 16

Similar to Example 15, except the reaction was carried out at 60° C.

Examples 13 to 16 demonstrated that other metallocene catalysts are just as effective for polymerization of mixed alpha-olefins to give high VI fluids.

TABLE 2

|  | Example 13 | Example 14 | Example 15 | Example 16 |
|---|---|---|---|---|
| Kv at 100° C., cSt | 804.16 | 917.13 | 727.84 | 648.15 |
| Kv at 100° C., cSt | 8292.3 | 9870.2 | 7878.9 | 7336.7 |
| VI | 302 | 306 | 290 | 278 |

Examples 17 to 21

Similar to Example 1 or Example 5, except a mixture of 1-hexene and 1-tetradecene was used as feed. By adjusting the reaction temperature, we obtained 12-15 cSt fluids. Their properties and process data are summarized in Table 3. Examples 17 to 20 are polymers from mixed linear alpha-olefins ($C_6$ and $C_{14}$), and have superior VI and pour points. The reaction conversions were high and selectivity to lube products were above 75%. All these lube products have much higher VI than lube Example 21 made from pure 1-hexene.

TABLE 3

|  | Example | | | | |
|---|---|---|---|---|---|
|  | 17 | 18 | 19 | 20 | 21 - comparative example |
| Catalyst Type | A + MAO | A + MAO | A + B | A + B | A + B |
| Wt % $C_6$ | 75.0 | 60.5 | 60.5 | 30.0 | 100.0 |
| Wt % $C_{14}$ | 25.0 | 39.5 | 39.5 | 70.0 | 0.0 |
| Average $C_x$ | 7 | 7.75 | 7.75 | 10 | 6 |
| Reaction Temp, ° C. | 140 | 140 | 100 | 100 | 120 |
| Kv 100° C., cSt | 14.62 | 14.96 | 14.04 | 13.52 | 12.02 |
| Kv 40° C., cSt | 110.18 | 107.89 | 99.62 | 85.67 | 96.66 |
| VI | 126 | 134 | 133 | 150 | 105 |
| Pour Point, ° C. | −48 | −36 | −36 | −18 | −43 |
| Conversion, wt % | 86.6 | 84.2 | 93.9 | 92.9 | na |
| Wt % Selectivity to lube | 76.6 | 81.6 | 82.0 | 91.4 | na |

In Table 4, Examples 23 to 25 used 1-hexene and 1-dodecene as feed. Example 26 used 1-hexene and 1-hexadecene as feed. In all cases, the product lubes have excellent VI and pour points, exceeding the VI obtained with pure 1-hexene feed.

TABLE 4

| Example | 23 | 24 | 25 | Example | 26 |
|---|---|---|---|---|---|
| Catalyst Type | A + MAO | A + B | A + B | Catalyst Type | A + B |
| Wt % $C_6$ | 60.0 | 40.4 | 20.0 | Wt % $C_6$ | 77.1 |
| Wt % $C_{12}$ | 40.0 | 59.6 | 80.0 | Wt % $C_{16}$ | 22.9 |
| Average $C_x$ | 7.5 | 8.55 | 10 | Average $C_x$ | 7 |
| Reaction Tem, ° C. | 140 | 100 | 100 | Reaction Tem, ° C. | 100 |
| Kv 100° C., cSt | 15.71 | 16.03 | 17.18 | Kv 100° C., cSt | 19.13 |
| Kv 40° C., cSt | 118.92 | 111 | 115.9 | Kv 40° C., cSt | 161.22 |
| VI | 130 | 144 | 152 | VI | 126 |
| Pour Point, ° C. | −57 | −54 | −39 | Pour Point, ° C. | −30 |
| Conversion, wt % | 87.4 | 84.5 | 91.2 | Conversion, wt % | 83.2 |
| Wt % Selectivity to lube | 74 | 91.1 | 94.3 | Wt % Selectivity to lube | 86.6 |

In Table 5, Examples 27 to 30 used 1-hexene, 1-dodecene and 1-tetradecene as feeds. Again, the products have superior VI and pour point properties, much better than comparative example 21 made from pure 1-hexene.

TABLE 5

| Example | 27 | 28 | 29 | 30 |
|---|---|---|---|---|
| Catalyst | A + B | A + B | A + B | A + MAO |
| Wt % $C_6$ | 64.9 | 30.4 | 24 | 40 |
| Wt % $C_{12}$ | 16.2 | 60.8 | 48 | 20 |
| Wt % $C_{14}$ | 18.9 | 8.8 | 28 | 40 |
| Average $C_x$ | 7.4 | 9.3 | 10 | 8.13 |
| Reaction Tem, ° C. | 100 | 100 | 100 | 140 |
| Kv 100° C., cSt | 17.48 | 15.46 | 13.21 | 11.44 |
| Kv 40° C., cSt | 135.94 | 106.05 | 87.17 | 69.58 |
| VI | 132 | 146 | 150 | 147 |
| Pour Point, ° C. | −55 | −42 | −33 | −24 |
| Conversion, wt % | 84.6 | 86.7 | 91.2 | na |
| Wt % selectivity to lube | 84.9 | 92.6 | 91.4 | na |

Similar runs using mixed olefins as feed produced high viscosity products with excellent VI and pour points. Results are summarized in Table 6.

TABLE 6

|  | Example no. | | | | | | | |
|---|---|---|---|---|---|---|---|---|
|  | 31 | 32 | 33 | 34 | 35 | 36 | 37 | 38 |
|  | A + MAO | A + B | A + MAO | A + B | A + B | A + B | A + B | A + B |
| Wt % $C_6$ | 60.0 | 60.0 | 60.5 | 30.0 | 41.7 | 60.5 | 100.0 | 100.0 |
| 1-$C_n$ olefin, n = | 12 | 12 | 14 | 14 | 14 | 14 | 0 | 0 |
| Wt % $C_n$ | 40.0 | 40.0 | 39.5 | 70.0 | 58.3 | 39.5 | 0.0 | 0.0 |
| Average $C_x$ | 7.5 | 7.5 | 7.75 | 10 | 9 | 7.75 | 6 | 6 |
| Rxn Temp, ° C. | 100 | 50 | 100 | 70 | 60 | 50 | 80 | 45 |
| Kv 100° C., cSt | 42.19 | 661.55 | 45.6 | 70.2 | 295.72 | 625.24 | 53.57 | 269.21 |
| Kv 40° C., cSt | 409.2 | 11288 | 454.3 | 667.5 | 3841.8 | 10424 | 661.4 | 4900.3 |
| VI | 147 | 235 | 148 | 174 | 215 | 234 | 132 | 176 |
| Pour Point, ° C. | −43 | −24 | −39 | −18 | −30 | −24 | −40 | −24 |
| $M_n$ | 1892 | na | 2025 | 3045 | 5875 | na | 1613 | na |
| MWD | 1.68 | na | 1.715 | 1.832 | 2.089 | na | 1.67 | na |
| % Conversion | 92.6 | 96.7 | 89.1 | 92.5 | 92.8 | 96 | 93.5 | na |
| % Lube Selectivity | 92.3 | 100 | 95 | 98.2 | 100 | 100 | 95 | na |

Example 39

To a 600 ml autoclave dried under nitrogen, was charged 16.7 grams of a mixture containing 60% 1-butene and 40% 2-butene and a solution containing 90 grams 1-dodecene, 0.262 gram triisobutyaluminum (TIBAL) and 1.72 mg catalyst A. The autoclave was heated to 60° C. A solution containing 20 gram toluene and 2.305 mg catalyst B was added into the autoclave. The reaction was continued for 6 hours and then quenched by addition of 1 ml isopropanol and 10 gram of activated alumina. The lube product was isolated by filtering and distillation under high vacuum to remove any light ends boiling below 150° C. at 0.1 millitorr. The final product weighed 88 grams and properties are summarized in Table 7.

Examples 40 to 42

Similar to Example 39, except different amounts of feeds were used.

Example 43

Similar to Example 39, except 1-tetradecene was used as feed.

Example 44

Similar to Example 39, except 76.2 grams 1-hexadecene and 40 grams of a butene mixture containing 60% 1-butene and 40% 2-butene were used as feed.

Example 45

Similar to Example 39, except 73.2 grams 1-octadecene and 44.7 grams of a butene mixture containing 60% 1-butene and 40% 2-butene were used as feed.

Examples 46 and 47

Similar to Examples 42 and 43, except different amounts of pure 1-dodecene or 1-tetradecene and pure 1-butene were used as feeds. Data from Examples 39 to 47 are summarized in Table 7. These data demonstrate several key points: 1. high quality fluids with high VI and superior point points were prepared by mixed feed from two LAOs, wherein one of them is an abundant 1-butene. 2. The mixed-olefin feeds can comprise LAO in and other internal olefins, such as Examples 39 to 45 demonstrate, that a mixed butene stream can be used just as well as a pure 1-butene (Examples 46 and 47). 3. The $^{13}$C and $^1$H NMR analysis of the product polymers demonstrated that the polymers are random copolymers with a random distribution index greater than −90%. 4. The product monomer compositions as calculated from $^1$H and $^{13}$C-NMR spectral data, and from the calculated Bernoullian compositions agree with each other, and with the feed olefin composition. Such polymers are said to possess a high degree of randomness in the monomer distribution. This randomness in a polyalpha-olefin is novel and contributes to the superior low temperature viscosity viscometrics. Conventional Ziegler or Ziegler-Natta or supported chromium oxide catalysts usually would not have such high degree of randomness. 5. Proton NMR analysis of these samples showed that a significant amount (10 to 20%) of the olefins are 1,2-disubstituted olefins. The formation of such olefins most likely stems from tail-to-tail termination of the growing polyalpha-olefins. This unusual termination creates a unique unsaturation which may be beneficial for subsequent functionalization reactions or for providing a less branched lube component (after hydrogenation) with more desirable lube properties.

TABLE 7

| | Example no. | | | | | | | | |
|---|---|---|---|---|---|---|---|---|---|
| | 39 | 40 | 41 | 42 | 43 | 44 | 45 | 46 | 47 |
| | 60% 1-Butene/40%2-butenes + LAO Feed | | | | | | | pure 1-C4 feed | |
| mole % C$_4$ in feed | 25.0 | 50.0 | 75.0 | 34.6 | 46.7 | 55.7 | 62.2 | 50.0 | 80.0 |
| 1-C$_n$ olefin, n = | 12 | 12 | 12 | 12 | 14 | 16 | 18 | 12 | 14 |
| Rxn Temp, ° C. | 60 | 60 | 60 | 60 | 60 | 60 | 60 | 60 | 60 |
| % Conversion | 89.3 | 93.2 | 95.4 | 91.1 | 89.4 | 94.9 | 88.1 | 92.1 | 94.6 |
| | Product Properties | | | | | | | | |
| Kv 100° C., cSt | 133.8 | 187.4 | 175.6 | 113.3 | 118.2 | 101.1 | 99.1 | 143.3 | 212.0 |
| Kv 40° C., cSt | 1664.9 | 2835.3 | 3297.1 | 1270.0 | 1429.0 | 1205.1 | 1177.9 | 1840.5 | 3733.3 |
| VI | 176 | 174 | 151 | 178 | 173 | 166 | 165 | 176 | 166 |
| Pour Point, ° C. | −36 | −27 | −24 | −39 | −15 | 3 | 9 | −33 | −24 |
| | End Group Vinylidene Distribution, mole % | | | | | | | | |
| C$_4$ | 49 | 60 | 77 | 40 | 50 | 62 | 67 | 49 | 71 |
| C$_n$ | 51 | 40 | 23 | 60 | 50 | 38 | 33 | 51 | 29 |
| | Product Composition, mole % by $^1$H NMR (CH$_3$ deconvolution) | | | | | | | | |
| C$_4$ | 47.3 | 61.0 | 74.0 | 40.4 | 51.1 | 65.6 | 65.7 | 54.1 | 71.8 |
| C$_n$ | 52.7 | 39.0 | 26.0 | 59.6 | 48.9 | 34.4 | 34.3 | 45.9 | 28.2 |
| | by $^{13}$C NMR (CH3 integration) | | | | | | | | |
| C$_4$ | 47.5 | 58.3 | 74.2 | 37.9 | 49.5 | 57.3 | 63.2 | 47.7 | 70.0 |
| C$_n$ | 52.5 | 41.7 | 25.8 | 62.1 | 50.5 | 42.7 | 36.8 | 52.3 | 30.0 |
| | by $^{13}$C NMR (S$_{\alpha\alpha}$ CH$_2$ Bernoulian fit) | | | | | | | | |
| C$_4$ | 53.6 | 63.6 | 77.9 | 45.0 | 57.2 | 64.6 | 71.2 | 55.3 | 75.3 |
| C$_n$ | 46.4 | 36.4 | 22.1 | 55.0 | 42.8 | 35.4 | 28.8 | 44.7 | 24.7 |
| Diff after Minimization | 0.01 | 0.012 | 0.005 | 0.023 | 0.02 | 0.006 | 0.008 | 0.024 | 0.013 |
| Ratio of av. Calculated C$_4$ in product to C$_4$ in feed | 1.98 | 1.22 | 1.01 | 1.18 | 1.13 | 1.12 | 1.07 | 1.05 | 0.91 |

TABLE 7-continued

| | Example no. | | | | | | | | |
|---|---|---|---|---|---|---|---|---|---|
| | 39 | 40 | 41 | 42 | 43 | 44 | 45 | 46 | 47 |
| | | | 60% 1-Butene/40%2-butenes + LAO Feed | | | | | pure 1-C4 feed | |
| | Olefin Distribution (mole %), olefins per 1000 Carbons | | | | | | | | |
| vinyl | 0 | 1 | 0.9 | 0.5 | 0.9 | 2.1 | 1.7 | 0.8 | 0.9 |
| 1,2-disub | 14.7 | 16.2 | 9.3 | 16.8 | 14.4 | 12.3 | 17.4 | 16.5 | 12.6 |
| trisub | 15.6 | 15.2 | 15.3 | 14.2 | 16.2 | 18.6 | 19.8 | 17.2 | 19.8 |
| vinylidene | 69.6 | 67.6 | 74.5 | 68.5 | 68.5 | 67.1 | 61.1 | 65.5 | 66.7 |

The smaller the Diff number (defined earlier in this text), the closer the lube polymer to an ideal Bernoullian random copolymer. These numbers are usually much less than −0.1 for the present invention, indicative of very random polymers. Furthermore, the amount of butene and alpha-olefins in the product compositions as analyzed by either $^{13}$C NMR, or by $^{1}$H NMR are very similar to the feed compositions, which again is indicative of a highly random polymer composition. This is confirmed by the ratio of 1-butene mole % in polymer to the 1-butene mole % in the feed ranging from 0.91 to 1.98.

Figure 3:
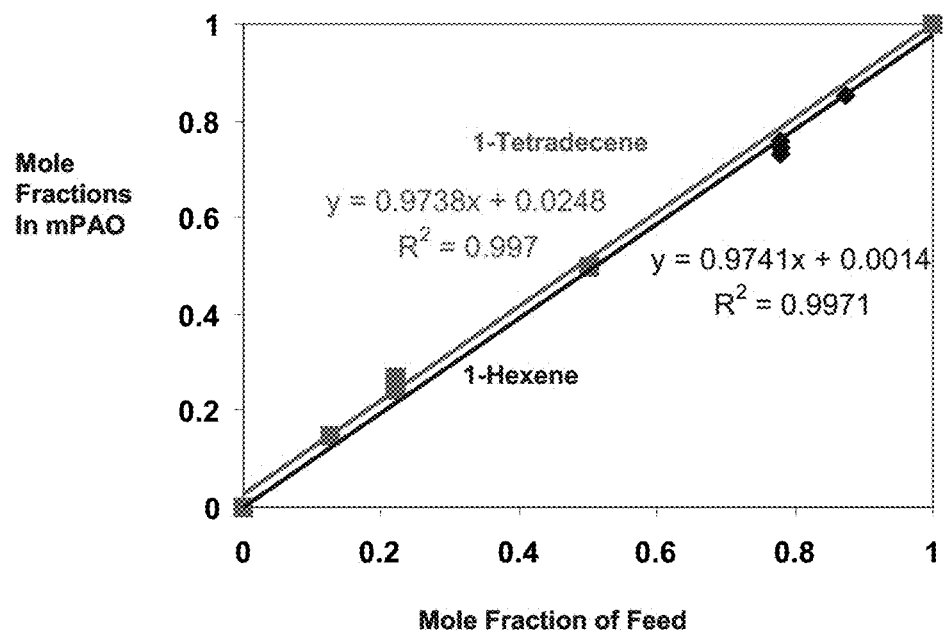

Furthermore, using Field-Desorption Mass Spectroscopy, we analyzed the lube samples from Examples 17, 18, 19, 20, 33 and 34 and found that the alpha-olefin content in the polymers is very similar to the feed composition, as shown in Table 8. Similarly, we calculated the random distribution index for this series of copolymers and found that they have very high degree of randomness, with the RD index ranging from 75% to 91%. Furthermore, the calculated mole fractions of 1-hexene and 1-tetradecene in polymer composition correlate closely with the mole fractions of 1-hexene and 1-tetradecene in the feeds, as shown in FIG. 3. This high degree of correlation is an excellent indication of high degree of randomness of the polymers.

TABLE 8

| | Example No. | | | | | |
|---|---|---|---|---|---|---|
| | 17 | 18 | 19 | 20 | 33 | 34 |
| Average $C_x$ | 7 | 7.75 | 7.75 | 10 | 7.75 | 10 |
| | Mole fraction of Feed | | | | | |
| 1-Hexene | 0.875 | 0.778 | 0.778 | 0.5 | 0.778 | 0.5 |
| 1-Tetradecene | 0.125 | 0.222 | 0.222 | 0.5 | 0.222 | 0.5 |
| | Calculated Mole fraction* | | | | | |
| 1-Hexene | 0.85 | 0.73 | 0.74 | 0.5 | 0.76 | 0.5 |
| 1-Tetradecene | 0.15 | 0.27 | 0.26 | 0.5 | 0.24 | 0.5 |
| | Calculated Best Fit P-Matrix* | | | | | |
| $P_{HH}$ | 0.85 | 0.75 | 0.73 | 0.48 | 0.77 | 0.53 |
| $P_{TT}$ | 0.13 | 0.32 | 0.22 | 0.48 | 0.28 | 0.53 |
| | Calculated Randomness factor* | | | | | |
| χ | 1.02 | 0.93 | 1.05 | 1.04 | 0.95 | 0.94 |

*Calculation was discussed in the detailed description of the invention

From the data in Table 8, it is clear that the polymers made in this invention have a degree of randomness, χ, very close to 1, ranging from 0.93 to 1.05.

In Examples 48 to 51, polyalpha-olefins of 40 to 90 cSt were made from 1-hexene and 1-dodecene. The reaction conditions and lube properties are summarized in Table 9. The 1-hexene and 1-dodecene contents in the polymer product were analyzed by $^{13}$C NMR, and the results are also summarized in Table 9. The mole fraction of 1-hexene in the products correlates very well with the mole fraction of 1-hexene in feed composition (FIG. 4). This high degree of correlation indicates that the polymers are highly random copolymers. These random copolymers have excellent VI and pour points.

TABLE 9

| Catalyst Type | A + MAO | A + B | A + B | A + B |
|---|---|---|---|---|
| Example | 48 | 49 | 50 | 51 |
| $C_n$, n = | 12 | 12 | 12 | 12 |
| Average $C_x$ | 7.5 | 9 | 10 | 10.5 |
| Wt % $C_6$ | 60.0 | 33.3 | 20.0 | 14.3 |
| mole % $C_6$ in feed | 75 | 50 | 33.3 | 25 |
| Kv 100° C., cSt | 42.19 | 85.68 | 77.73 | 91.17 |
| Kv 40° C., cSt | 409.2 | 851.1 | 701.3 | 845.1 |
| VI | 147 | 178 | 185 | 190 |
| Pour Point, ° C. | −43 | −42 | −39 | −27 |
| | by $^{13}$C NMR | | | |
| Mole % hexene in polymer | 66.7 | 49.6 | 32.6 | 26.3 |
| mole % dodecene in polymer | 33.3 | 50.4 | 67.4 | 73.7 |

Comparison with prior art examples. In these experiments, an alpha-olefin mixture of same composition as Example 1 was polymerized at 35, 50 and 70° C. in the same procedures as Example 1 to produce fluid with properties summarized in Example 52 to 54 in Table 10.

| Example No. | 52 | 53 | 54 |
|---|---|---|---|
| Reaction Temp, ° C. | 70 | 50 | 35 |
| Kv 100° C., cS | 88.79 | 515.59 | 688.59 |
| Kv 40° C., cS | 844.71 | 6123.36 | 8533.71 |
| VI | 185 | 258 | 271 |
| PP, ° C. | −45 | −30 | −27 |

Example 52 to 54 fluids were made from feed compositions similar to Example 21 A to D of prior art U.S. Pat. No. 4,827,073. FIG. 5 compares the pour points of the Example 52-54 fluids vs. prior art example 21 A to D. This graph shows that at the same viscosity, the fluids of this invention have much lower pour points. The prior art examples have at least 10° C. higher pour points. This is a clear indication that fluids made from this invention have more uniform monomer distribution and are advantageous than prior art samples.

Table 11 summarizes the wt % conversion of C6 to C18 alpha-olefins and the relative conversion to 1-hexene by different metallocene catalyst systems. This wt % conversion was calculated from the amount of unreacted alpha-olefins in crude mixture analyzed by gas chromograph equipped with a 60 meter boiling point capillary column. As these data demonstrated that the conversions of 1-C6 to 1-C18 olefin in each example were very similar to each other over a very wide range of conversions from 14% to 72% average conversion. The relative conversions rates of C6 to C18 alpha-olefins to 1-hexene range from 0.65 to 1.21 for all these catalyst systems over a wide range of conversions. This indicated that all the alpha-olefins, irrespective of their size, have similar reactivity. These data support our previous conclusion that the monomers are incorporated into the polymer at equal rates and that the monomers are distributed randomly in the polymers.

TABLE 11

|  | Example 7 | Example 8 | Example 9 | Example 10 | Example 13 | Example 15 |
|---|---|---|---|---|---|---|
| Reaction Time, Hours | 3.0 | 4.2 | 17.5 | 5.0 | 6.0 | 5.0 |
| Wt % Conversion of Each Individual Olefins | | | | | | |
| 1-C6 | 33.4 | 53.6 | 50.5 | 29.5 | 16.7 | 74.6 |
| 1-C8 | 29.1 | 44.9 | 47.1 | 30.9 | 15.5 | 72.6 |
| 1-C10 | 29.5 | 44.2 | 48.3 | 35.8 | 14.0 | 74.0 |
| 1-C12 | 27.6 | 41.9 | 47.6 | 35.2 | 13.6 | 71.6 |
| 1-C14 | 27.7 | 41.6 | 48.5 | 34.3 | 15.3 | 69.4 |
| 1-C16 | 27.6 | 43.8 | 50.7 | 32.8 | 12.1 | 72.1 |
| 1-C18 | 29.3 | 42.3 | 52.1 | 31.5 | 10.8 | 69.6 |
| Average Conversion | 29.2 | 44.6 | 49.3 | 32.9 | 14.0 | 72.0 |
| Relative Conversion to 1-Hexene | | | | | | |
| 1-C6 | 1.00 | 1.00 | 1.00 | 1.00 | 1.00 | 1.00 |
| 1-C8 | 0.87 | 0.84 | 0.93 | 1.05 | 0.93 | 0.97 |
| 1-C10 | 0.88 | 0.83 | 0.96 | 1.21 | 0.84 | 0.99 |
| 1-C12 | 0.83 | 0.78 | 0.94 | 1.19 | 0.82 | 0.96 |
| 1-C14 | 0.83 | 0.78 | 0.96 | 1.16 | 0.92 | 0.93 |
| 1-C16 | 0.83 | 0.82 | 1.00 | 1.11 | 0.73 | 0.97 |
| 1-C18 | 0.88 | 0.79 | 1.03 | 1.07 | 0.65 | 0.93 |
| Average Conversion | 0.87 | 0.83 | 0.97 | 1.11 | 0.84 | 0.96 |

Thus, numerous specific examples of the production of high performance PAO fluids from mixed feed olefins, including substantial amounts of olefins other than pure 1-decene or traditional decene-substitutes such as 1-octene and 1-dodecene, have been set forth above.

The advantages of using these mixed olefin feeds will be immediately apparent to one of ordinary skill in the art in possession of the present disclosure. Among other advantages, it significantly increases the availability and the range of feed stocks useful for the PAO production, so that PAO production is not exclusively dependent on 1-decene supply. Second, the use of wide-range mixed olefins as feeds with metallocene catalyst system allows production of a broad product slate, from PAO to HVI-PAO fluids. Third, the use of mixed olefins as feeds yields new fluids with superior properties as lubricant or functional fluids. In embodiments, the superior properties include one or more of: high VI, wide viscosity range, low pour points and other excellent low-temperature properties, low traction, superior oxidative stability, lubricant film-forming properties and superior shear stability, and the like. Surprisingly, some of these properties cannot even be achieved using fluids made from pure 1-decene. Furthermore, the fluids made from the mixed olefins are excellent base stocks for use as the major components (for example, greater than ~50%) in the formulation of automotive engine lubricants, transmission, and gear lubricants, industrial lubricants (including circulation lubricants, gear lubricants, hydraulic fluids, turbine oils, pump/compressor oils, refrigeration lubricants, metal-working fluids), aerospace lubricants and greases, etc.

The fluids made in this invention are also superior blend stocks (from 0.1 wt % to 95%, preferably 20 wt % to 80 wt %) with Group I to Group V fluids, and/or with GTL basestocks to give full-synthetic, semi-synthetic or part-synthetic lubricants for use in all possible lubricant applications, including automotive lubricants, industrial lubricants, and greases, as mentioned above. Because of their intrinsically superior properties, these inventive fluids can impart, sometimes synergistically, high performance properties to the finished blend product. Examples are the high shear stability, high VI, high film-forming properties, low-temperature viscosity, low traction, superior oxidative properties of the finished lubricants. The PAOs disclosed in this invention are used in formulating lubricant compositions and greases, as described above. Whether in minor or in major amounts, they are further combined with an effective concentration of additives selected from typical lubricant composition additives such as antioxidants, antiwear agents, rust inhibitors, extreme pressure agents, anti-foamants, dispersants and VI improvers. Greases are formulated by combining the base stock with a thickener such as a lithium soap or a polyurea compound and one or more grease additives selected from antioxidants, antiwear agents, extreme pressure agent and dispersants. More examples for formulations for products can be found in Lubricants and Lubrication, Ed. By T. Mang and W. Dresel, by Wiley-VCH GmbH, Weinheim 2001.

Trademarks used herein are indicated by a™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are incorporated in their entirety by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to, and can be readily made, by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A random liquid polyalpha-olefin made from at least two alpha-olefin monomers in contact with an activated metallocene catalyst, the polyalpha-olefin containing at least two types of branches with average branch length ranging from 2.1 to 12, having (a) randomness factor between 0.7 and 1.4 determined by mass spectrometry and/or (b) a minimized Diff factor of less than 0.3 for the Sαα methylene peak, determined by NMR, and further characterized by at least one of the parameters selected from
   (c) a number-average molecular weight ("$M_n$") in the range from 200 to 50,000 g/mol;
   (d) a weight-average molecular weight ("$M_w$") in the range from 200 to 50,000 g/mol;
   (e) a molecular weight distribution ("MWD", MWD=$M_w$/$M_n$) in the range from 1 to 5;
   (f) a pour point below 10° C.;
   (g) a kinematic viscosity at 100° C. ("KV100") in the range from 1.5 to 5,000 cSt; and
   (h) a viscosity index ("VI") greater than or equal to 100.

2. The random liquid polyalpha-olefin of claim 1, characterized by at least two of the parameters selected from (c) through (h).

3. The random liquid polyalpha-olefin of claim 1, characterized by at least three of the parameters selected from (c) through (h).

4. The random liquid polyalpha-olefin of claim 1, characterized by at least four of the parameters selected from (c) through (h).

5. The random liquid polyalpha-olefin of claim 1, characterized by at least five of the parameters selected from (c) through (h).

6. The random liquid polyalpha-olefin of claim 1, characterized by all of the parameters (c) through (h).

7. The random liquid polyalpha-olefin of claim 1, characterized by an average branch length of from 3 to 10.

8. A lubricant comprising 1 wt % to 95 wt % of at least one random liquid polyalpha-olefin according to claim 1.

9. The lubricant of claim 8, further comprising a second basestock selected from the group consisting of API Groups I, II, III, IV or V, or a Fischer-Tropsch hydrocarbon derived lubricant.

10. The lubricant of claim 9, characterized by a pour point of below −20° C.

11. The random liquid polyalpha-olefin of claim 1, characterized by a randomness factor between 0.8 and 1.2.

12. The random liquid polyalpha-olefin of claim 1, characterized by a randomness factor between 0.9 and 1.1.

13. The random liquid polyalpha-olefin of claim 1, characterized by a randomness factor from 0.93 to 1.05.

14. The random liquid polyalpha-olefin of claim 1, characterized by a weight average molecular weight from 800 to 24,000 g/mol.

15. The random liquid polyalpha-olefin of claim 1, characterized by a number average molecular weight from 250 to 30,000 g/mol.

16. The random liquid polyalpha-olefin of claim 1, characterized by a molecular weight distribution MWD in the range from 1 to less than 3.

17. The random liquid polyalpha-olefin of claim 1, characterized by a molecular weight distribution MWD in the range from 1 to less than 2.5.

18. The random liquid polyalpha-olefin of claim 1, characterized by a molecular weight distribution MWD in the range from 1 to less than 2.

19. The random liquid polyalpha-olefin of claim 1, characterized by a KV100 from 3 to 1,000 cSt.

20. The random liquid polyalpha-olefin of claim 1, characterized by a VI in the range from 140 to 380.

21. The random liquid polyalpha-olefin of claim 1, characterized by a pour point lower than −10° C.

22. The random liquid polyalpha-olefin of claim 1, characterized by a pour point lower than −50° C.

23. The random liquid polyalpha-olefin of claim 1, wherein the at least two types of branches have an average branch length ranging from 4 to 12.

24. The random liquid polyalpha-olefin of claim 23, wherein the at least two types of branches have an average branch length ranging from 5 to 12.

25. The random liquid polyalpha-olefin of claim 1, made from at least two alpha-olefin C6-C20 linear alpha-olefins.

26. The random liquid polyalpha-olefin of claim 1, made from at least two alpha-olefin C6-C14 linear alpha-olefins.

27. A random liquid polyalpha-olefin made from at least two alpha-olefin monomers in contact with an activated metallocene catalyst, the polyalpha-olefin containing at least two types of branches with average branch length ranging from 2.1 to 12, having (a) randomness factor between 0.7 and 1.4 determined by mass spectrometry and/or (b) a minimized Diff factor of less than 0.3 for the Sαα methylene peak, determined by NMR, and (c) a kinematic viscosity at 100° C. ("KV100") in the range from 1.5 to 500 cSt, and further characterized by at least one of the parameters selected from
   (d) a number-average molecular weight ("$M_n$") in the range from 200 to 50,000 g/mol;
   (e) a weight-average molecular weight ("$M_w$") in the range from 200 to 50,000 g/mol;
   (f) a molecular weight distribution ("MWD", MWD=$M_w$/$M_n$) in the range from 1 to 5;
   (g) a pour point below 10° C.; and
   (h) a viscosity index ("VI") greater than or equal to 100.

28. A random liquid polyalpha-olefin made from at least four alpha-olefin monomers in contact with an activated metallocene catalyst, the polyalpha-olefin containing at least two types of branches with average branch length ranging from 2.1 to 12, having (a) randomness factor between 0.7 and 1.4 determined by mass spectrometry and/or (b) a minimized Diff factor of less than 0.3 for the Sαα methylene peak, determined by NMR, and further characterized by at least one of the parameters selected from
   (c) a number-average molecular weight ("$M_n$") in the range from 200 to 50,000 g/mol;
   (d) a weight-average molecular weight ("$M_w$") in the range from 200 to 50,000 g/mol;
   (e) a molecular weight distribution ("MWD", MWD=$M_w$/$M_n$) in the range from 1 to 5;

(f) a pour point below 10° C.;
(g) a kinematic viscosity at 100° C. ("KV100") in the range from 1.5 to 5,000 cSt; and
(h) a viscosity index ("VI") greater than or equal to 100.

29. A random liquid polyalpha-olefin made from at least two alpha-olefin monomers in contact with an activated metallocene catalyst, wherein the at least two alpha-olefin monomers comprise from 0 wt. % to 20 wt. % decene, the polyalpha-olefin_containing at least two types of branches with average branch length ranging from 2.1 to 12, having (a) randomness factor between 0.7 and 1.4 determined by mass spectrometry and/or (b) a minimized Diff factor of less than 0.3 for the S$\alpha\alpha$ methylene peak, determined by NMR, and further characterized by at least one of the parameters selected from (c) a number-average molecular weight ("$M_n$") in the range from 200 to 50,000 g/mol;
(d) a weight-average molecular weight ("$M_w$") in the range from 200 to 50,000 g/mol;
(e) a molecular weight distribution ("MWD", MWD=$M_w$/$M_n$) in the range from 1 to 5;
(f) a pour point below 10° C.;
(g) a kinematic viscosity at 100° C. ("KV100") in the range from 1.5 to 5,000 cSt; and
(h) a viscosity index ("VI") greater than or equal to 100, and greater than or equal to 100.

* * * * *